(12) United States Patent
Eckes

(10) Patent No.: US 12,539,642 B1
(45) Date of Patent: Feb. 3, 2026

(54) TOOL AND SYSTEM FOR FORMING MULTIPLE WOODWORKING JOINTS

(71) Applicant: Luke Eckes, Eau Claire, WI (US)

(72) Inventor: Luke Eckes, Eau Claire, WI (US)

( * ) Notice: Subject to any disclaimer, the term of this patent is extended or adjusted under 35 U.S.C. 154(b) by 318 days.

(21) Appl. No.: 18/470,036

(22) Filed: Sep. 19, 2023

Related U.S. Application Data

(63) Continuation-in-part of application No. 16/689,485, filed on Nov. 20, 2019, now Pat. No. 11,780,111.

(51) Int. Cl.
*B27F 1/14* (2006.01)
*B25H 1/04* (2006.01)
*B25H 1/18* (2006.01)

(52) U.S. Cl.
CPC .............. *B27F 1/14* (2013.01); *B25H 1/04* (2013.01); *B25H 1/18* (2013.01)

(58) Field of Classification Search
CPC .... B27C 5/02; B27C 5/04; B27C 5/06; B27C 9/005; B27F 5/00; B27F 5/02; B27F 5/12; B27F 1/02; B27F 1/04; B27F 1/08; B27F 1/10; B27F 1/12; B27F 1/16
See application file for complete search history.

(56) References Cited

U.S. PATENT DOCUMENTS

| | | |
|---|---|---|
| 4,105,055 A | 8/1978 | Brenta |
| 4,479,523 A | 10/1984 | Peterson et al. |
| 4,595,040 A | 6/1986 | Glisman |
| 4,669,173 A | 6/1987 | Chaney, Sr. |
| 4,955,766 A | 9/1990 | Sommerfeld |
| 5,123,463 A | 6/1992 | Grisley |
| 5,193,596 A | 3/1993 | Patel |
| 5,203,389 A | 4/1993 | Goodwin |
| 5,240,052 A | 8/1993 | Davison |
| 5,398,740 A | 3/1995 | Miller |
| 5,458,171 A | 10/1995 | Ward |
| 5,647,420 A | 7/1997 | Michell |
| 5,647,707 A | 7/1997 | Poulin |
| 5,807,033 A | 9/1998 | Benway |
| 5,813,807 A | 9/1998 | Rogers |
| 5,816,300 A | 10/1998 | Rogers |
| 6,145,556 A | 11/2000 | Wood |
| 6,176,281 B1 | 1/2001 | Newman |
| 6,499,224 B1 | 12/2002 | Asick |
| 7,171,738 B2 | 2/2007 | Dick et al. |
| 7,819,146 B2 | 10/2010 | McDaniel |
| 7,997,312 B2 | 8/2011 | Van Valkenburg |
| 8,016,005 B1 | 9/2011 | Weinstein |
| 8,117,732 B2 | 2/2012 | Dick et al. |
| 8,176,610 B1 | 5/2012 | Arrington et al. |
| 8,376,333 B2 | 2/2013 | Zander |
| 8,660,442 B2 | 2/2014 | Spink et al. |
| 9,259,851 B2 | 2/2016 | Cardew |
| 9,498,868 B2 | 11/2016 | Quaiz |

(Continued)

*Primary Examiner* — Matthew Katcoff
(74) *Attorney, Agent, or Firm* — Dietz Law Office LLC

(57) ABSTRACT

An apparatus is described that is suitable for mounting in a variety of orientations and for forming a variety of woodworking joints at a high throughput. The apparatus is directed to a tool that couples with a power tool to either plunge into or cross feed through a workpiece. The apparatus is particularly well suited for forming biscuit dado, dado, mortise, tenon, floating tenon, dowel, bridle, half lap, tongue, and groove joints, without requiring significant tool changes.

20 Claims, 67 Drawing Sheets

(56) References Cited

U.S. PATENT DOCUMENTS

| | | |
|---|---|---|
| 9,669,538 B2 | 6/2017 | Iannelli |
| 10,363,643 B2 | 7/2019 | Grisley |
| 11,938,581 B2 * | 3/2024 | Chen ........................ B23Q 3/02 |
| 2005/0268446 A1 | 12/2005 | Chiu et al. |
| 2015/0314377 A1 | 11/2015 | Wise |
| 2016/0082583 A1 | 3/2016 | Sergyeyenko et al. |
| 2016/0185006 A1 | 6/2016 | Padget |

* cited by examiner

TOOL AND SYSTEM FOR FORMING MULTIPLE WOODWORKING JOINTS

CROSS-REFERENCE TO RELATED APPLICATIONS

This application claims the filing benefit and priority of U.S. Non-Provisional patent application Ser. No. 16/689,485 filed Nov. 20, 2019 the contents of which are incorporated herein by reference in their entireties.

FEDERALLY SPONSORED RESEARCH AND DEVELOPMENT

Not Applicable.

JOINT RESEARCH AGREEMENT

Not Applicable.

TECHNICAL FIELD

This invention pertains generally to a tool and system to create a variety of woodworking joints without the need for significant tool set up time or change. More particularly, the present invention is directed to a portable tool that couples with a router or other power tools to either plunge into or cross feed a work piece to create many woodworking joints including a biscuit dado, dado, mortise, tenon, floating tenon, dowel, bridle, half lap, tongue, groove or other woodworking joints. The tool of the present invention is particularly well suited to provide a system capable of precisely creating these various joints without requiring significant tool changes.

BACKGROUND

Over the years, various tools have been devised to remove material from a workpiece. By way of example, in the past vertical milling machines have been used to remove material in a controlled finite manner. The vertical milling machine includes a table that travels on ways and gibs. The amount the table is moved along the x, y, or z axis relative to a spindle head may be controlled accurately and repeatedly to within 0.001 inch or less. Ball screws or worm drives are coupled to the table such that a rotation of a linked handle will precisely move the table in an incremented fashion. A workpiece is clamped to the table and the handle is rotated to move the table and workpiece in a desired direction. The spindle is coupled to a motor to rotate an end mill that is able to chip or "cut" material as the end mill engages the material. Although the amount of material removed with an end mill is typically accurate and repeatable, the vertical mill machine is not intended to be portable, often weighing more than 1,500 pounds. Also, the throughput of controlled movement of a milling machine is significantly less than freehand use of a router, for example, to remove wood from a wooden work piece. Although a router may be moved over a workpiece more quickly than the table of a vertical mill may traverse, there is often a tradeoff between throughput speed and accuracy and repeatability.

In an attempt to increase the accuracy and repeatability when using a router, prior jigs and templates have been devised to plunge and cut a particular joint into a woodworking piece. Also, routers have been mounted to tables to allow the cross feed of a workpiece past the router. However, precisely orienting the workpiece relative to the rotational center of a router in an accurate and repeatable manner has proven difficult. The shortcomings of prior router jigs, templates, tables and fixtures may be overcome with the use of rigid attachments and worm drives to control linear motion, however, with these additions the desired throughput is compromised.

SUMMARY

Embodiments according to aspects of the invention provide an apparatus or tool to quickly and precisely orient and align a work piece relative to a center axis of rotation of a router or other power tool. The tool and system of the present invention is portable allowing for quick set up and take down. Further, the present invention includes bi-directional interchangeable templates that facilitate high throughput and processing of the workpiece. The apparatus according to aspects of the invention generally includes a rigid top plate and articulating bottom plate that couple together and may be mounted to a table, work bench or work space. The tool may be mounted in multiple orientations depending upon the particular joint to be routed into a workpiece. By way of example, the top plate or articulating bottom plate may be mounted to a top surface of a bench to provide stability to the tool and allow workpieces to be easily and efficiently fed through the tool of the present invention. Various methods of mounting the tool are further described in the detailed description of the invention.

The bottom plate is bifurcated and interconnected with a modified hinge pin joint. The bottom plate comprises a first half and second half, wherein the first half is rotationally joined to the second half and rotates between a planar position and a ninety degree angular position. The first half of the bottom plate has at least two parallel slots or rails formed into or extending from a top surface of the first half of the bottom plate. In certain embodiments a rail may be fitted within the slots. The slots or rails further extends from a joint end to a free end of the first half. The second half of the bottom plate has a grid of t-slots formed and extending into a top surface of the second half. The top plate may include parallel slots or rails formed in a bottom surface of the top plate that are oriented and adapted to receive and slide over corresponding rails or slots of the first half of the bottom plate. In this manner the top plate interlocks and slidingly engages with the first articulating half of the bottom plate. Additionally, the top plate has a router opening or cavity extending through the top plate. The inset interlocks with the router opening and may be quickly disengaged from the router opening with compressible locking guides.

According to other aspects of the invention the tool may further include a scale associated with the first half of the bottom plate. The scale is recessed from the top surface of the first half such that it doesn't interfere when the top plate slides over the first half of the bottom plate. The scales extend parallel with the rails or slots from the rotational end to the free end of the first half. The scales allow a user to accurately determine the precise position of the center of the router opening (and thus the center of a router bit) relative to the top surface of the bottom plate. The inset is bi-directional and interlocks within the router opening or pocket or cavity in multiple orientations. Further, the inset has a top pocket extending into the inset from a top surface and a bottom pocket extending into the inset from a bottom surface. A top template fits within the top pocket of the inset and is adaptable for receiving a router guide bushing. A transparent bottom template fits within the bottom pocket of the inset. The bottom template includes alignment markings associated with the transparent bottom template to allow a user to quickly align a workpiece with the true center of the inset and corresponding rotation axis of a router. A 90 degree fence or 45 degree fence may be coupled with the second half of the bottom plate. A toggle clamp may be coupled to either the 90 degree fence or 45 degree fence and may be utilized to force and hold in place a workpiece against the fence and second half of the base plate. An interchangeable pocket hole plate may be interchanged with the top plate. The pocket hole plate similarly engages with the first articulating half of the bottom plate. The pocket hole plate is utilized in conjunction with a power drill to quickly and accurately drill pocket holes into a desired work piece. The bottom plate joint may include a quick release fastener to fix the first half and second half at a desired angular orientation.

Another embodiment according to aspects of the invention generally includes a bottom plate, top plate, and inset. The bottom plate comprises a first half and second half. The first half is rotationally joined to the second half at a joint, wherein the first half and second half articulate between a planar position and a right angle position. The first half has at least two parallel slots or rails associated with a top surface of the first half. The rails or slots further extend from a joint end to a free end of the first half. The second half of the bottom plate has a grid of t-slots formed and extending into a top surface of the second half. The top plate interlocks and slidingly engages with the rails or slots of the first articulating half of the bottom plate. The top plate has an inset cavity extending through the top plate that is adapted to receive the inset. The router opening of the inset aligns with the second half of the bottom plate when the top plate is engaged to the first half of the bottom plate. The inset has compressible locking guides, wherein the inset interlocks with the inset pocket or cavity of the top plate. The inset is bi-directional and interlocks with the top plate within the inset pocket or cavity in multiple orientations. The inset also has a top pocket extending into the inset from a top surface and a bottom pocket extending into the inset from a bottom surface. A top template fits within the top pocket of the inset and is adaptable for receiving a router guide bushing. A transparent bottom template fits within the bottom pocket of the inset. The bottom template includes alignment markings associated with the transparent bottom template.

In accordance with other aspects of the invention this embodiment of the invention may include a scale associated with the first half of the bottom plate. The scale may be recessed from the top surface of the first half. Further, the scale may extend parallel with the rails or slots from a rotational end to a free end of the first half. Of course a partial scale that only partly extends between the rotational end and free end of the first half of the bottom plate may be incorporated without departing from the scope of the invention. the first and second halves of the bottom plate are interconnected with a locking joint that allows the top surface of the second plate to be oriented either planar or at any desired degree between 0 and 90 relative to a top surface of the first half of the bottom plate. The bottom plate joint may include a quick release lock to fix the first half and second half at a desired angular orientation. The grid of t-slots formed in the second half of the bottom plate are adapted for receiving t-inserts. The t-inserts may be used to fasten or couple a 90 degree fence or 45 degree fence to the second half of the bottom plate. A toggle clamp may be coupled or fastened to the 90 degree and 45 degree fences to allow the user to clamp a workpiece against the fence and top surface of the second half of the bottom plate.

Another embodiment of an apparatus for creating a variety of joints in a woodworking piece in accordance with aspects of the invention generally includes a top plate and an inset. The top plate has a perimeter defined by outer sides and ends. A router opening extends through the top plate from a top surface of the top plate to a bottom surface of the top plate. The router opening includes inner sidewalls extending between the top surface and bottom surface of the top plate and the sidewalls extend about a perimeter of the router opening. The top plate also includes spaced apart pockets extending into the top plate from the sidewalls of the router opening. The inset has outer sides and ends extending between a top surface and bottom surface of the inset and has protrusions extending outward from at least one of the sides and ends of the inset. The router opening of the top plate is adapted for receiving the inset within the router opening and the protrusions interlock within the spaced apart pockets formed in the top plate. The inset also includes a guide bushing router channel extending through the inset from the top surface to the bottom surface of the inset. The inset is bi-directional in 90 degree increments and interlocks with the router opening of the top plate in multiple orientations.

In accordance with other aspects of the invention this embodiment of the invention may include a rotational alignment member fixed to the inset in cooperation with the guide bushing router channel of the inset. A removable template may mount to the inset and adapt for rotation within the guide bushing router channel. The removable template includes an alignment segment that interlocks with the rotational alignment member fixed to the inset. The removeable template may also have a guide bushing router aperture extending through the removeable template, wherein the guide bushing router aperture is adapted for receiving interlocking rings having varying inner and outer diameters. Alternatively, the removeable template may have a bore extending through the removable template wherein slide rails are fixed within the bore and a guide bushing router member is slidingly coupled to the rails. The alignment segment interlocks with the rotational alignment member in adjustable increments in relation to 360 degrees. The apparatus may further include a guide fence adapter couplable to at least one of the perimeter sides and ends of the top plate. Alternatively, a circle cut adapter may couple to an end of the top plate. In an alternate embodiment the inset may include compressible locking guides that interlock within the router opening of the top plate.

Additionally, another embodiment according to aspects of the invention generally includes a top plate, a removeable inset and a removeable template. The top plate has a perimeter defined by outer sides and ends and has a router opening extending through the top plate from a top surface of the top plate to a bottom surface of the top plate. The router opening includes inner sidewalls extending between the top surface and bottom surface of the top plate. The inner sidewalls also extend about a perimeter of the router opening. The top plate also includes spaced apart pockets that extend into the top plate from the sidewalls of the router opening. The inset has outer sides and ends extending between a top surface and bottom surface of the inset. The inset also has protrusions extending outward from at least one of the sides and ends of the inset, wherein the router opening of the top plate is adapted for receiving the inset within the router opening, and wherein the protrusions interlock within the spaced apart pockets formed in the top plate. The inset also includes a guide bushing router channel extending through the inset from the top surface to the bottom surface of the inset. The inset also includes a rotational alignment member fixed to the inset in cooperation with the guide bushing router channel of the inset. The removable template mounts to the inset and is adapted for rotation within the guide bushing router channel, wherein the removable template includes an alignment segment that interlocks with the rotational alignment member fixed to the inset.

In accordance with other aspects of the invention of this embodiment the inset may be bi-directional in 90 degree increments and may interlock with the router opening of the top plate in multiple orientations. The removeable template has a guide bushing router aperture extending through the removeable template, wherein the guide bushing router aperture is adapted for receiving interlocking rings having varying inner and outer diameters. Alternatively, the removeable template may have a bore extending through the removeable template wherein slide rails are fixed within the bore and a guide bushing router member is slidingly coupled to the rails. The alignment segment of the inset interlocks with the rotational alignment member in adjustable increments in relation to 360 degrees. A guide fence adapter may be coupled to at least one of the perimeter sides and ends of the top plate. Alternatively, a circle cut adapter may be coupled to an end of the top plate.

In use, the tool and system may be utilized to form a variety of woodworking joints. The bottom plate includes threaded mounting holes in the first half of the bottom plate to assist a user with mounting the bottom plate near an edge of a table or bench. The articulating joint between the two halves of the bottom plate is aligned with an edge of the table or bench such that the second half of the bottom plate extends out from the table or bench and may freely rotate between a planar position and a 90 degree angle relative to the top surface of the first half of the bottom plate. Further, threaded apertures extend into a top surface of the top plate in an orientation that allows a user to clamp a router to the top plate such that the center rotational axis of the router is axially aligned with the center of the router opening in the top plate. In this manner, a user is able quickly and precisely align a cutting edge of a router bit with a workpiece clamped to the bottom plate. The insert templates and adapter template include many configurations that are designed to allow a user to use various sized and shaped bits and to cut a variety of shapes into an underlying workpiece. In this manner, the tool is particularly portable and may be utilized to cut multiple woodworking joints into workpieces in a production run style or one-off setting.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
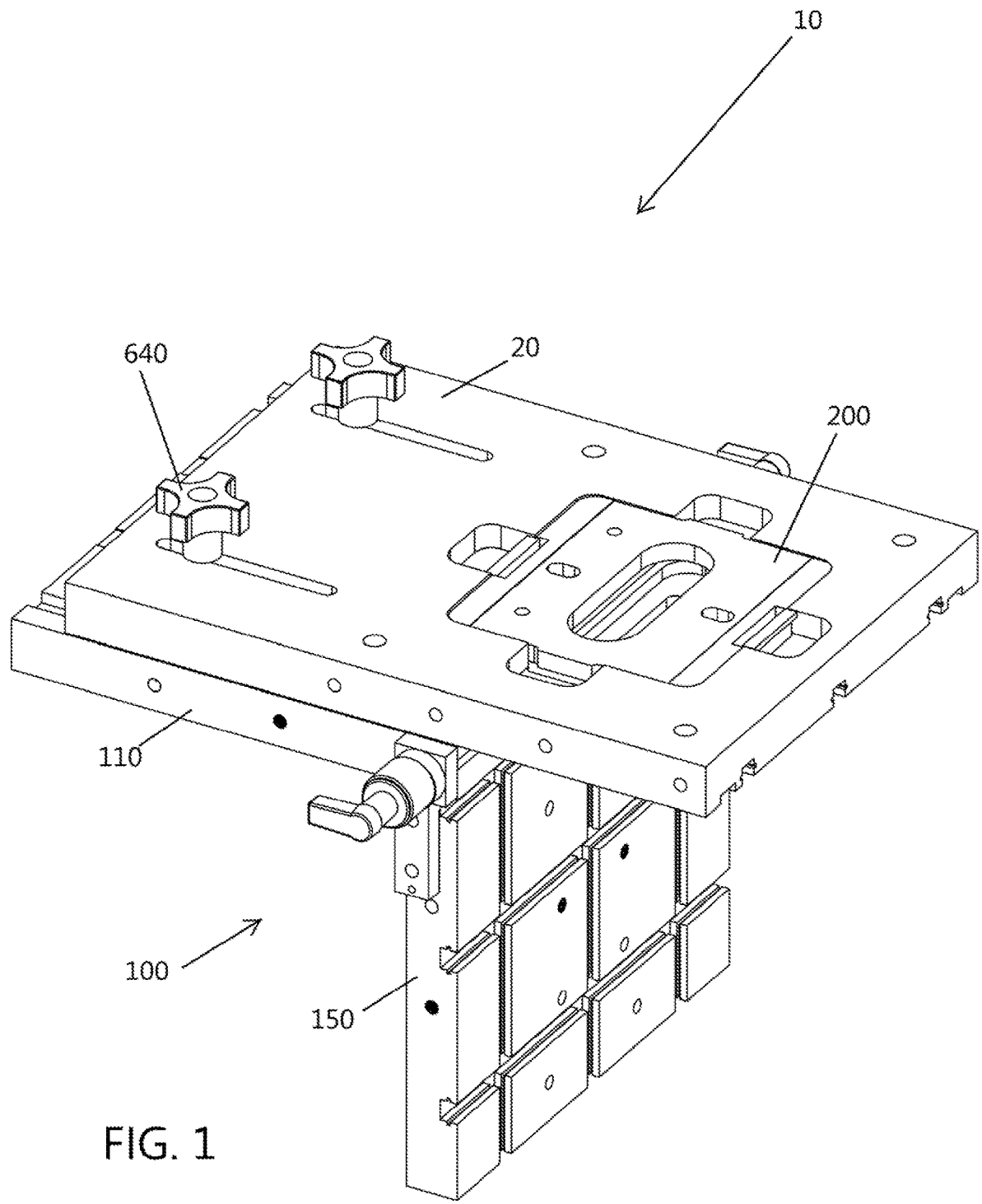
FIG. 1 is a front right upper perspective view of an embodiment of the woodworking tool of the present invention.
Figure 2:
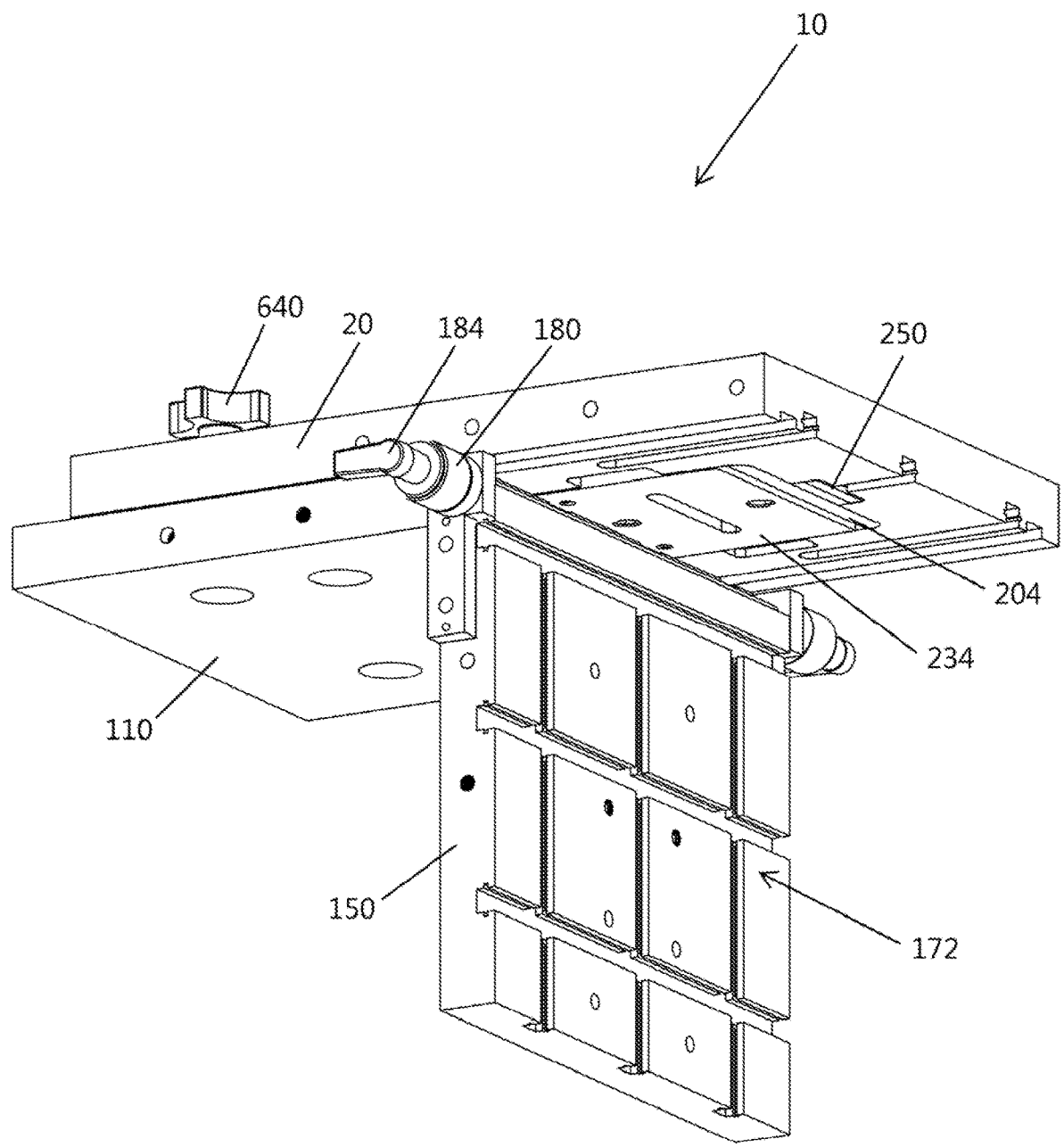
FIG. 2 is a front right lower perspective view of an embodiment of the woodworking tool of the present invention.
Figure 3:
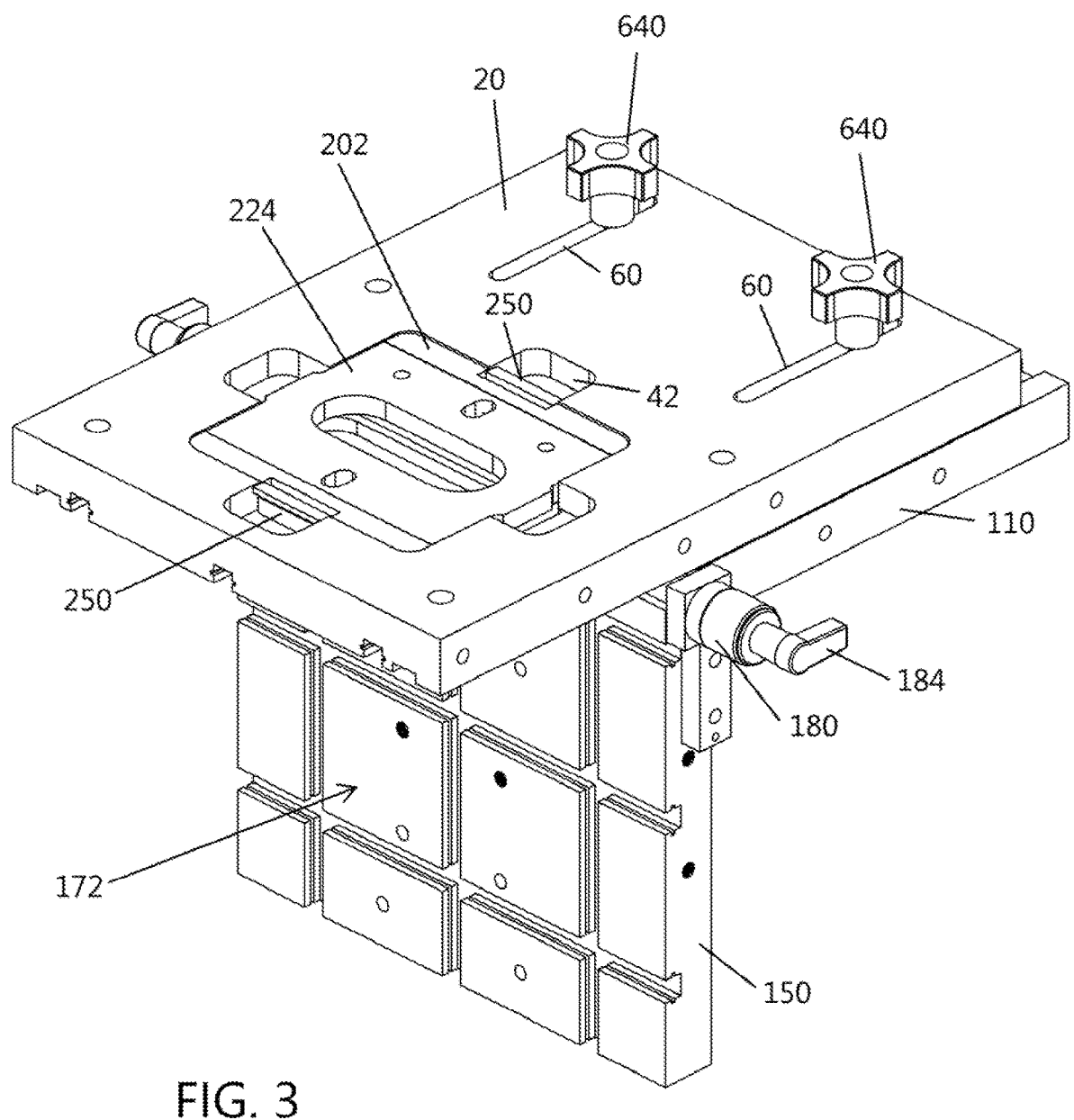
FIG. 3 is a back right upper perspective view of an embodiment of a the woodworking tool of the present invention.
Figure 4:
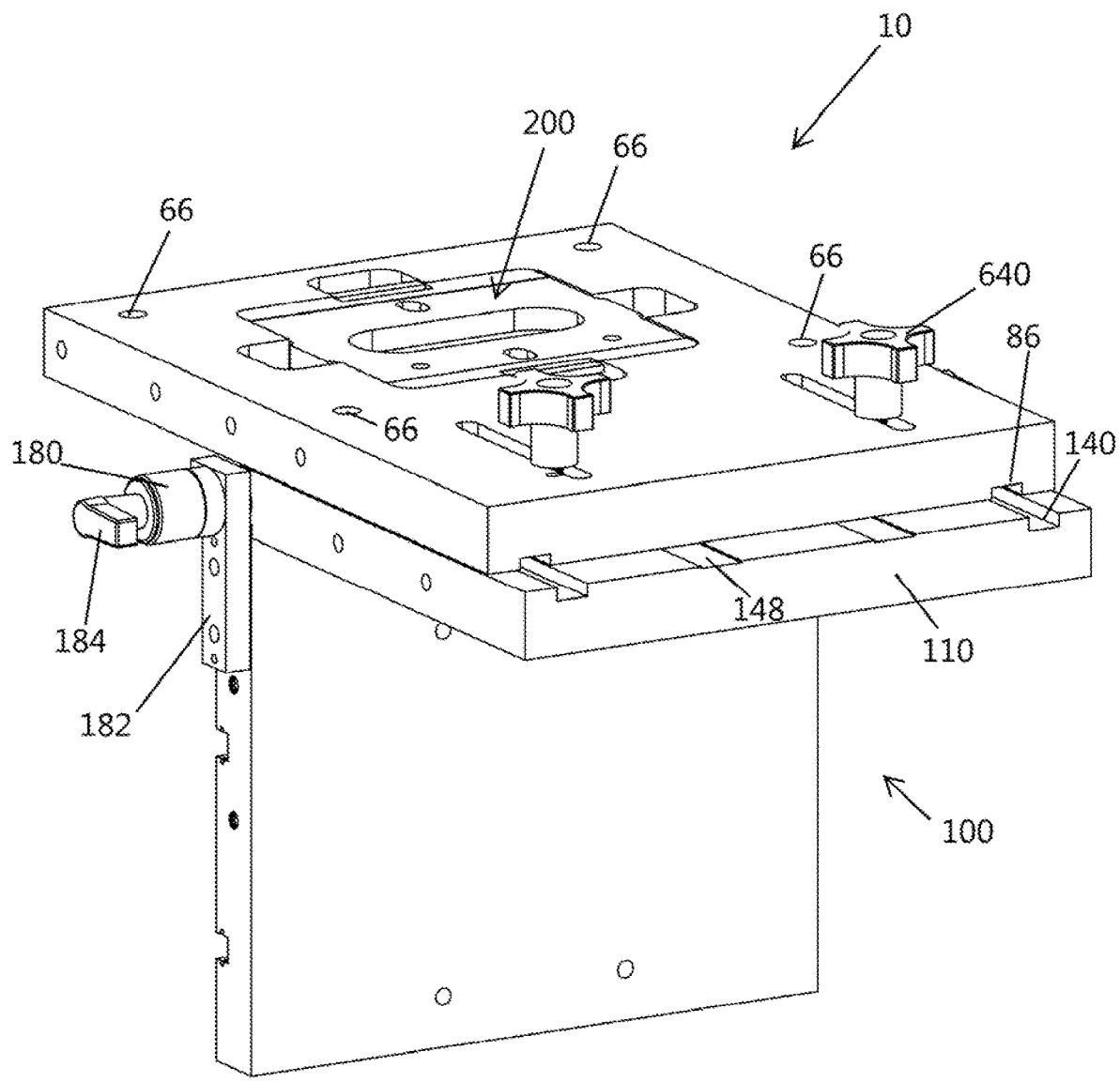
FIG. 4 is a back left upper perspective view of an embodiment of a woodworking tool of the present invention.
Figure 5:
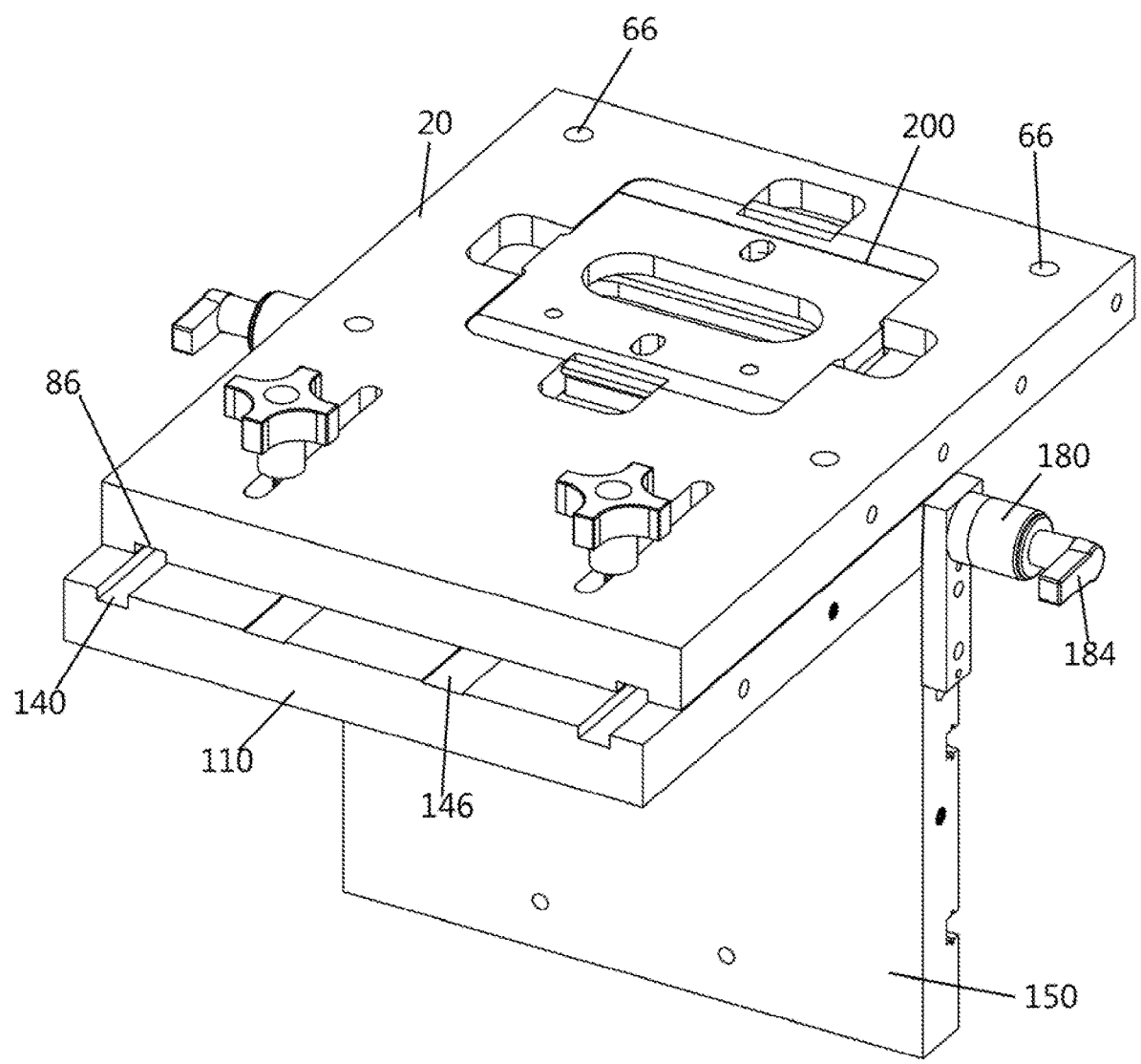
FIG. 5 is a front left upper perspective view of an embodiment of a woodworking tool of the present invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The tool and system 10 for forming multiple woodworking joints of the present invention includes interlocking top and bottom plates 20 and 100 and an inset 200 with compressible locking guides 250. Alternatively, the tool and system 10 may include an interlocking pocket hole top plate 500 in combination with bottom plate 100. Alternatively, the tool and system 10 may include top plate 20, an embodiment of inset 200 and a combination of one or more of embodiments of guide fence adapter 550, circle cut adapter 650, removeable boring template 700, and removeable slot template 750. The system 10 may further include ninety degree fence 300 and forty-five degree fence 400. A router may be mounted in a fixed position to the top plate 20 and a workpiece may be fed past the bit of the router or, alternatively, the workpiece may be clamped to the top or bottom plate and the router actuated within a template of inset 200.

Although those skilled in the art will appreciate that other mounting methods are possible, four possible orientations are described. First, the top plate may be fixed or mounted to the bench with half of the bottom plate overhanging a side of the bench. In this orientation a router may be either fixed to the top plate or may float freely over the surface of the top plate. The router bit would be aligned in a vertical orientation. Second, half of the bottom plate may be mounted to a top or side of the bench. In one embodiment, a second half 150 of bottom plate 100 is mounted to a side of the bench and the first half 110 of bottom plate 100 is articulated to 90 degrees relative to the second half plate 150. Top plate 20 engages and slides over the first half 110 of the bottom plate 100, such that the router pocket is aligned over the bench. A router bit would be aligned in a vertical orientation. The second half 150 of the bottom plate may be used as a fence and a work piece may be slid under the router bit. In another embodiment the second half 150 is mounted to a top surface of the bench and the first half 110 and top plate 20 overhang from a side of the bench. In this orientation the router bit would be oriented horizontally and a bottom surface of the top plate 20 may be utilized as a fence such that a workpiece is slid past the horizontally oriented bit. The first plate 110 may be adjusted at an angle less than ninety degrees towards the bench so that an angle may be cut along an edge of a workpiece as it is fed past the horizontal bit. Alternatively, the first plate 110 may be mounted to a side of the bench and the second plate 150 may articulate between zero and ninety degrees. In this orientation angled slots, for example, may be formed in a workpiece that is fed past the router bit. Thirdly, the top plate 20 may be flipped upside down such that a router bit faces vertically upward. The top plate may be recesses in a top surface of the bench so that the bottom of the top plate and the bench surface form a continuous plane for a workpiece to slide over. The bottom plate 100 may be mounted to the top plate to act as an adjustable fence for a workpiece being fed past the upwardly extending router bit. Fourth, the top plate may be mounted to a work bench, float over a workpiece or mount to a guide rail (of known suitable construction known to those skilled in the art) while utilizing an embodiment of inset 200 and a combination of one or more of embodiments of guide fence adapter 550, circle cut adapter 650, removeable boring template 700, and removeable slot template 750. Thos skilled in the art will appreciate the many complex woodworking cut possibilities with the use of these combinations. By way of example, slots may be cut about a defined arc, while at the same time the angles of each slot about the arc may be adjusted through 360 degrees and the angle of the depth of the slot may be adjusted through 90 degrees along multiple axis.

The woodworking tool and system of the present invention is particularly well suited for creating a variety of joints including a biscuit dado, dado, mortise, tenon, floating tenon, dowel, bridle, half lap, tongue, groove and other woodworking joints. For purposes of clarity and without limitation each of these joints will be briefly described. Typically, a biscuit joint includes a wooden piece (the biscuit, square or oval) that's glued into a dado or crescent shaped slot cut into each workpiece to be joined. The slot is cut larger than the biscuit to allow for adjustment and adhesive. Alternatively, a common dado joint includes a slot that is cut into a first workpiece wherein the slot has an approximately equal thickness as a portion of a second workpiece that is intended to be inserted into the slot. By way of example, bookshelves have used dados to secure the shelving into the inner sides of the bookshelf.

A mortise and tenon joint is a common and traditional joint in woodworking because it provides a rigid and secure joint. A tenon or stub is formed into an end of a workpiece by cutting around the end to a certain predetermined depth and length. The tenon is sized to fit within a hole commonly referred to as the mortise. The mortise mirrors the shape of the tenon and is cut into a surface of a workpiece at a desired location. The hole or mortise is oftentimes rectangular in shape. A loose mortise and tenon joint (also known as a floating tenon joint) refers to a joint that includes a mortise in both work pieces and a small insert that is shaped and sized to fit within the two mortises when the two work pieces are aligned and brought together. This joint is similar to the biscuit joint. Glue or other adhesive is used to secure the small insert in each mortise to thereby secure the two workpieces together.

A dowel joint butts the end of a workpiece into another workpiece and is reinforced or fixed in place with dowel pins, making the connection very strong once glued. The dowel joint may be quickly created in a production line. A bridle joint requires cutting a shape into a workpiece in a shape similar to a fork. The end of the joining workpiece is cut into a tenon or "necked joint" that has a shape to mirror and fit within the fork shape of the other workpiece. A joint having common traits with the bridle joint is a dovetail joint. The dovetail joint typically cuts multiple angled tabs that fit snuggly into shape mirroring slots. The tabs and slots have trapezoidal shapes and are known for creating a joint that is very difficult to separate. A half lap joint requires overlapping two workpieces. When making a half lap joint an end of one workpiece is overlapped and connected to another workpiece. Half of the end material is dadoed out of each end of the workpiece so that when the two workpieces are joined together a continuous flat surface is formed. A joint similar to the half lap is a tongue and groove joint, however the tongue and groove joint often runs lengthwise along an edge of each woodworking piece. One piece has a groove cut along an entire edge. The joining workpiece has a thin protrusion or ridge (the tongue) along its entire edge. The tongue is aligned along the edge and sized to fit snuggly into the groove.

Turning attention now to the Figures, embodiments according to aspects of the invention will now be described in conjunction with the variety of woodworking joints capable of being made with the invention. Referring first to FIGS. 1-5, the tool and system 10 generally includes interlocking top and bottom plates 20 and 100 and an inset 200 with compressible locking guides 250. Top plate 20 includes an interlocking inset 200 contained within a pocket. Knob 640 includes a threaded shaft that slides within slots 60. When the knob is turned (in a predefined direction dependent upon the direction of the threading on the threaded shaft), the top plate presses against the first half 110 of the bottom plate 100 and is held firmly in place. Threaded apertures 66 extend into the top plate and are aligned around the insert pocket. The threaded apertures 66 may be utilized to clamp or otherwise secure a router (not shown) to the top plate 20. Rail slots 86 are formed in the bottom of the top plate 20 and are aligned with rail slots 140 formed in a top surface of the first half 110 of the bottom plate 100. An insert may be affixed within the slot 86 or slot 140 to form a rail into which the opposing slot may ride. The slots and rails allow the top plate 20 to be slid over the first half of the bottom plate 100 in a precise direction and controlled increments. The top side of the first half 110 of the bottom plate 100 includes a slot 146 that is adapted to receive a scale or ruler 148. As the top plate slides over the first half of the bottom plate an end 30 of the top plate may be used in conjunction with the scale 148 to precisely (within 0.010 inches) determine the position of the top plate 20 in relation to the bottom plate 100.

Bottom plate 100 includes first half 110 and second half 150. Rotation cylinder 130 is fixed to end 120 of the first plate 110. A concave recess is formed in end 162 that mates and rotates about fixed cylinder 130. Mounting or rotation bracket 182 is fixed to the sides of the second half 150 of the bottom plate 100. The bracket 182 aligns and is adjacent the concave recess. The second half 150 rotates about the cylinder of the first plate 110. A quick release lock 180 and lever 184 fix the second half at a desired angle relative to the first plate 110. For example, the plates may be aligned so that they form a single planar bottom plate 100 or the second plate may be rotated through ninety degrees and locked in place at any desired angle between zero to ninety degrees. A grid 172 of t-slots 170 are formed in the top surface 152 of the second half 150 of the bottom plate 100. The t-slots 170 are adapted for receiving t-slot insert 630 of toggle clamp 600.

Inset 200 includes a top surface 202 and bottom surface 204 and a compressible locking guide 250 that allows a user to lock the insert 200 within the inset pocket 40 of the top plate 20. Finger reliefs 42 are formed in the top plate 20 that allows a user to more easily grip and compress the lock guides 250. The inset 200 further includes removable top template 224 and bottom template 234. As will be described in greater detail below, the bottom template 234 includes hash marks that allows a user to precisely position the top plate over a workpiece clamped to the second half 150 of the bottom plate 100. The top template 224 includes a router channel 226. The user may insert the router bit into the router channel. The user may slide the router over the top plate 20 while the guide bushing of the router abuts the sidewall of the router channel to define the outer path or confines of the router bit. The router channel may have different lengths, widths and shapes to define different tool paths of the router bit. Many interchangeable top templates 224 having different sized and shaped router channels may be incorporated into the inset 200.

Figure 6:
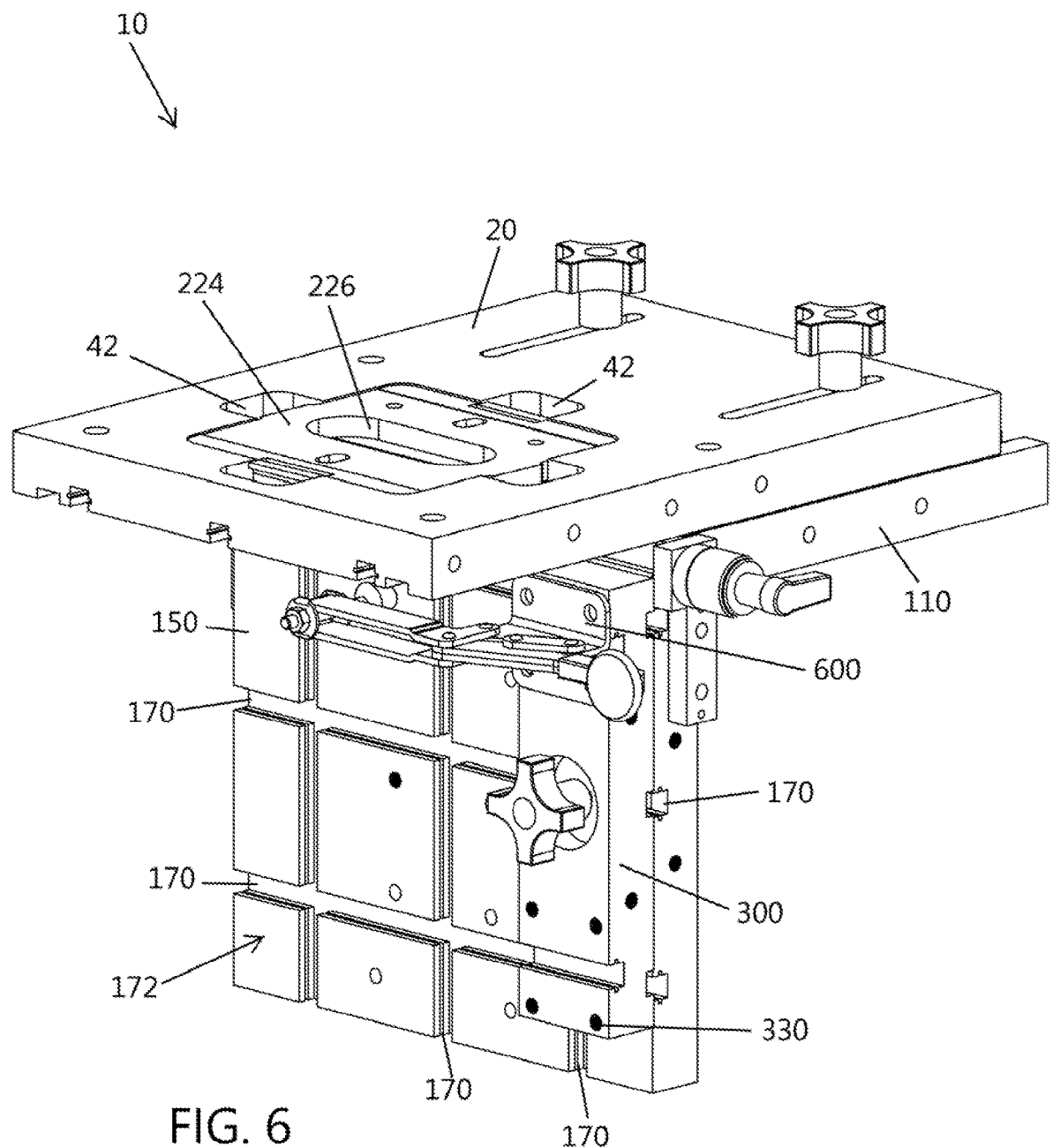
FIG. 6 is a back right upper perspective view of an embodiment of a woodworking tool of the present invention, showing a toggle clamp and 90 degree fence coupled to a second half of the bottom plate.
Figure 7:
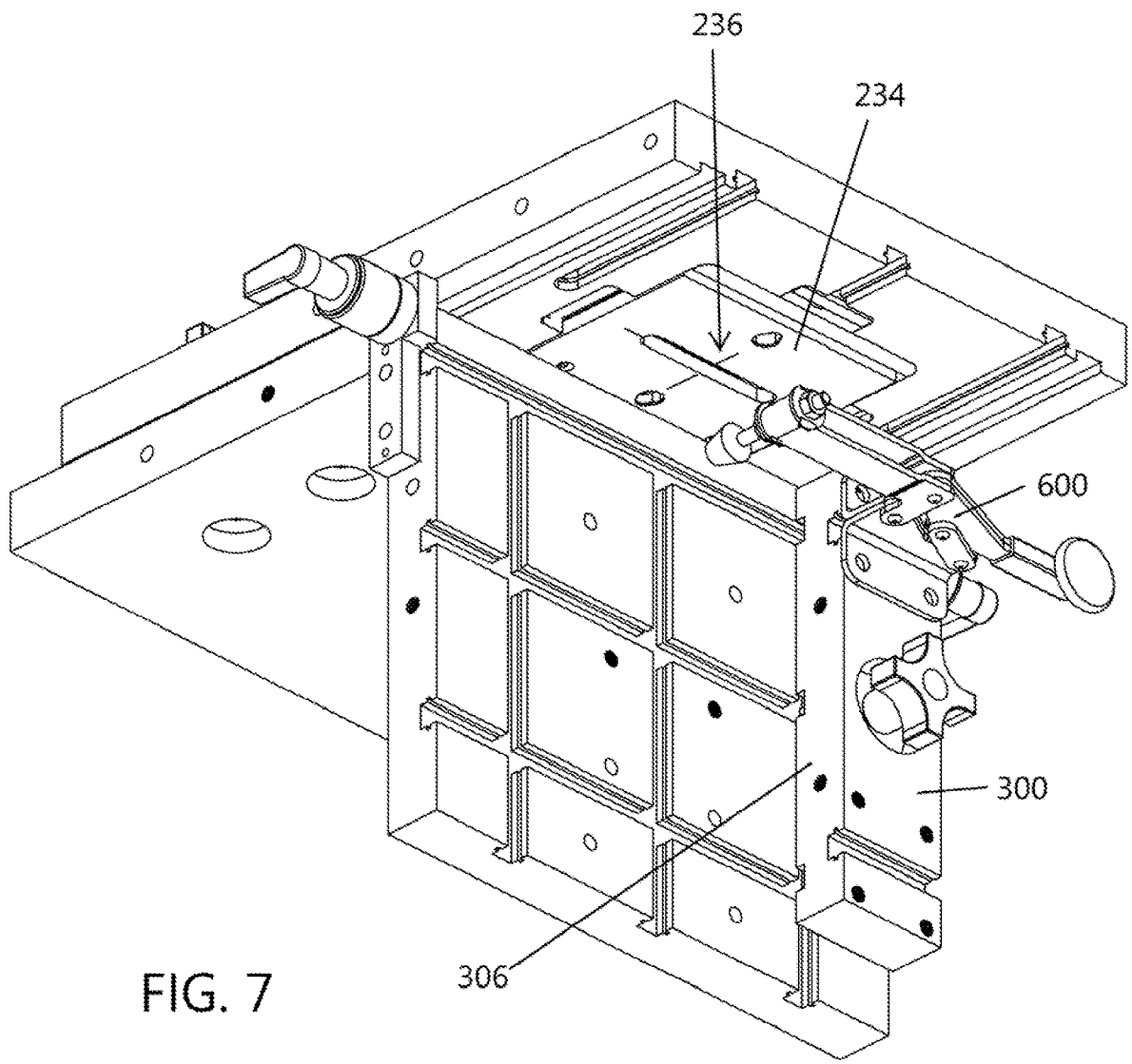
FIG. 7 is a front right lower perspective view of an embodiment of the woodworking tool of the present invention, showing a toggle clamp and 90 degree fence coupled to a second half of the bottom plate.
Figure 8:
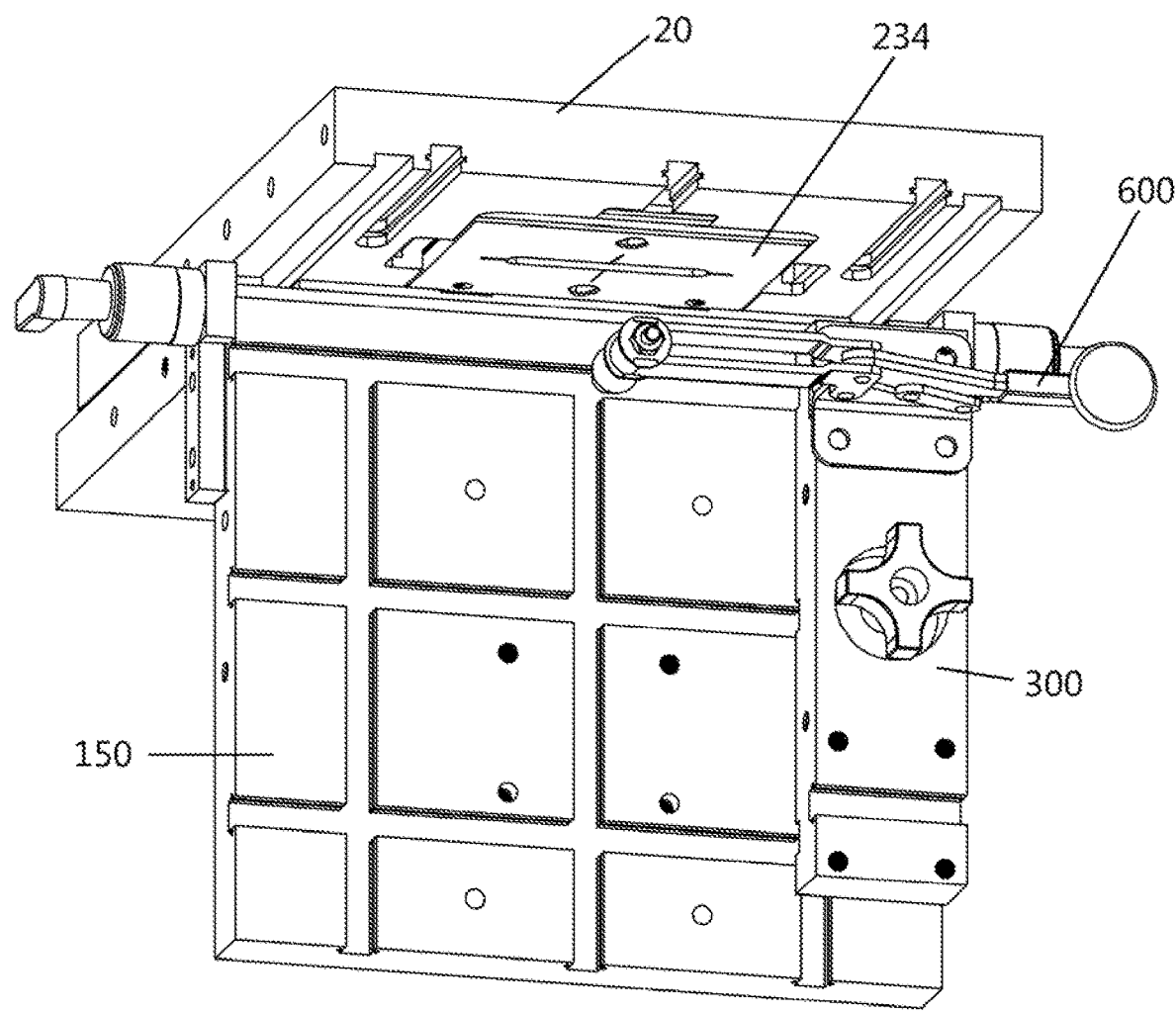
FIG. 8 is a lower right end perspective view of an embodiment of the woodworking tool of the present invention, showing a toggle clamp and 90 degree fence coupled to a second half of the bottom plate.

Referring next to FIGS. 6-8, toggle clamp 600 is shown engaged to the second half 150 of bottom plate 100. Top plate 20 is mounted to the first half 110 of bottom plate 100. Finger reliefs 42 allow for the easy insertion and removal of inset 200. Various templates 224 may be used so that the router channel 226 is aligned over the desired cutting or routing area of the workpiece. Bottom template 234 and alignment markings 236 may be used to precisely position the workpiece in a desired alignment with the router channel 226. Toggle clamp 600 is mounted to the ninety degree fence 300 via threaded holes 330 extending into the fence 300. A t-slot insert 630 is positioned within a t-slot 170 of the mounting grid 172 and knob 640 is used to tighten the fence 300 against the flat surface of the second half 150 of the bottom plate 100. The location of the toggle clamp 600 is chosen so the desired surface of the workpiece to be routed is aligned with patterned router channel 226.

Toggle clamp 600 is used to press and secure a workpiece against the flat surface of the second half 150 of bottom plate 100 when the workpiece is aligned in the desire position. An edge of the workpiece is pressed flush against an edge 306 of the fence 300 so that the user knows that the length axes of the router bit is parallel with the edge of the workpiece. Various templates 224 and alignment of the workpiece with the router channel 226 provides a setup to quickly interchange multiple workpieces requiring the same cut or routing. Those skilled in the art will appreciate that alignment of the second half 150 of the bottom plate 100 in conjunction with use of the toggle clamp 600 is particularly well suited for quick interchanges and formation of biscuit joints, mortise and tenon, portions of a dowel joint, bridle joints, dovetails, half laps and tongue and groove. Some of these joint may require reorienting the fence 300 so that the workpiece may be fed under and through the router bit.

Figure 9:
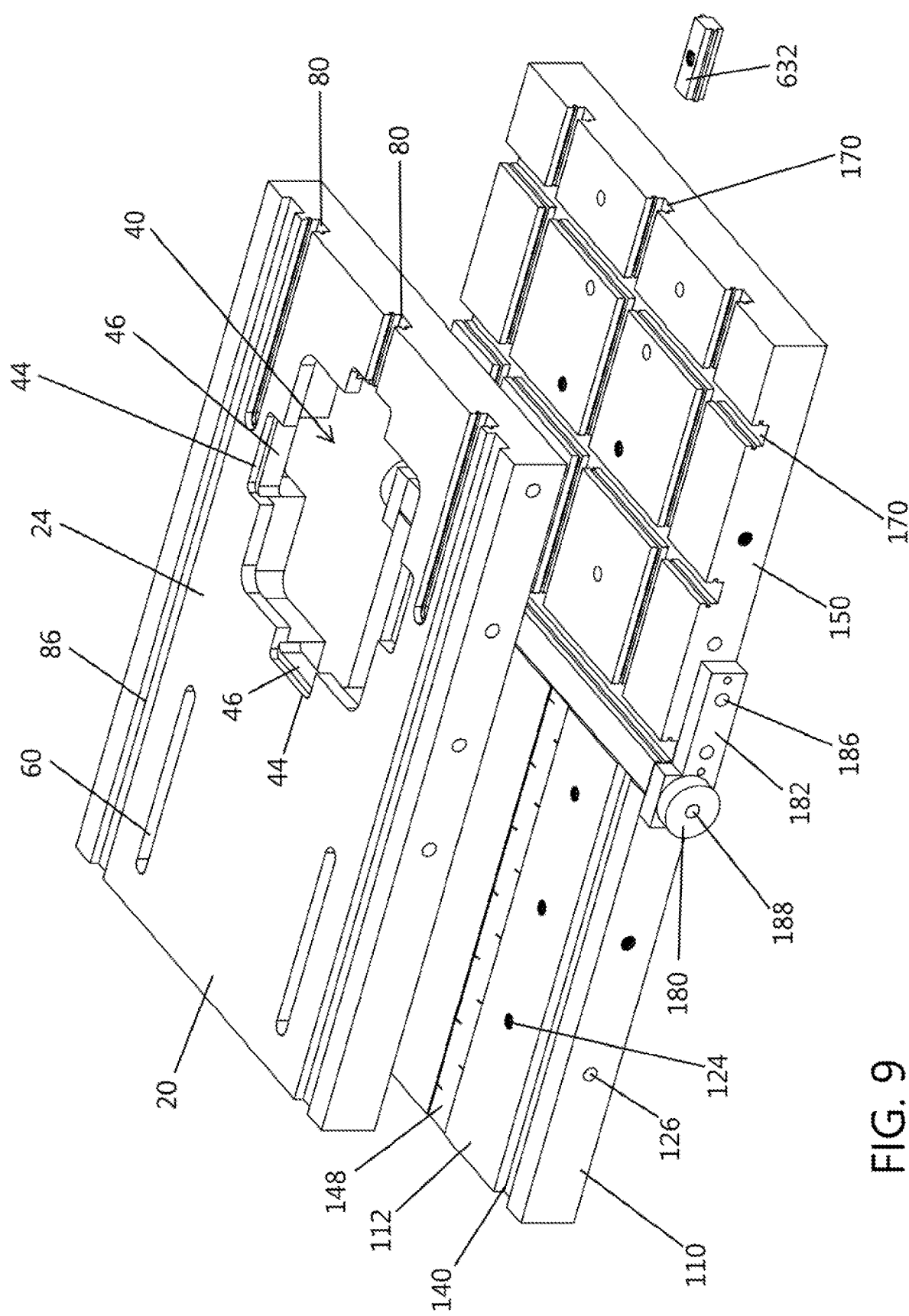
FIG. 9 is a front elevated perspective view of the top plate and bottom plate of the woodworking tool of the present invention showing the inset removed from the top plate.

FIG. 9 illustrates a partially assembled top plate 20 elevated above partially assembled bottom plate 100. The top plate 20 is flipped over 180 degrees about the lengthwise axis to reveal the bottom surface 24 of top plate 20. Rail slots 86 are formed in the bottom 24 of top plate 20 and align with rails 140 formed in the top surface 112 first half 110 of the bottom plate 100. Additionally, t-slots 80 are formed at the template end 30 of the top plate 20. Slots 80 may be used in conjunction with t-slot inserts 630 to engage ninety degree fence 300 or forty five degree fence 400 to the bottom 24 of top plate 20. Toggle 600 may be attached to the fence to provide a clamping against the workpiece in a desired position. A horizontal style toggle clamp may be used to clamp the work piece to the top plate 20. Alternatively, a push pull style toggle clamp may be mounted to the top plate and press the work piece against the second half 150 of the bottom plate 100.

Inset pocket or router opening 40 is formed through top plate 20 and is adapted to receive inset 200. The pocket 40 includes recesses 46 and undercuts 44 that receive and interlock with the insert 200 compressible lock guides 250. The bottom plate 100 is shown having the first half 110 and second half 150 oriented flat or at one hundred eighty degrees. The angle at which the first half 110 is aligned relative to the second half 150 is quickly adjusted with the quick release lock 180. Rotation bracket 182 is fixed to the second half 150 of the bottom plate through mounting holes 186 (mounting bolts are not illustrated). The lever 184 (illustrated in other figures) includes a threaded shaft that extends through the rotation bracket 182 along the rotation axes 188. The threaded shaft engages the rotation cylinder 130 fixed to the first half 110 of the bottom plate 100. Mount holes 124 are utilized to mount the top plate 20 to the first half 110 of the bottom plate 100 through slots 60. Mount holes 126 are provided to mount the bottom plate to a table or other surface utilizing L brackets of known suitable construction.

Figure 10:
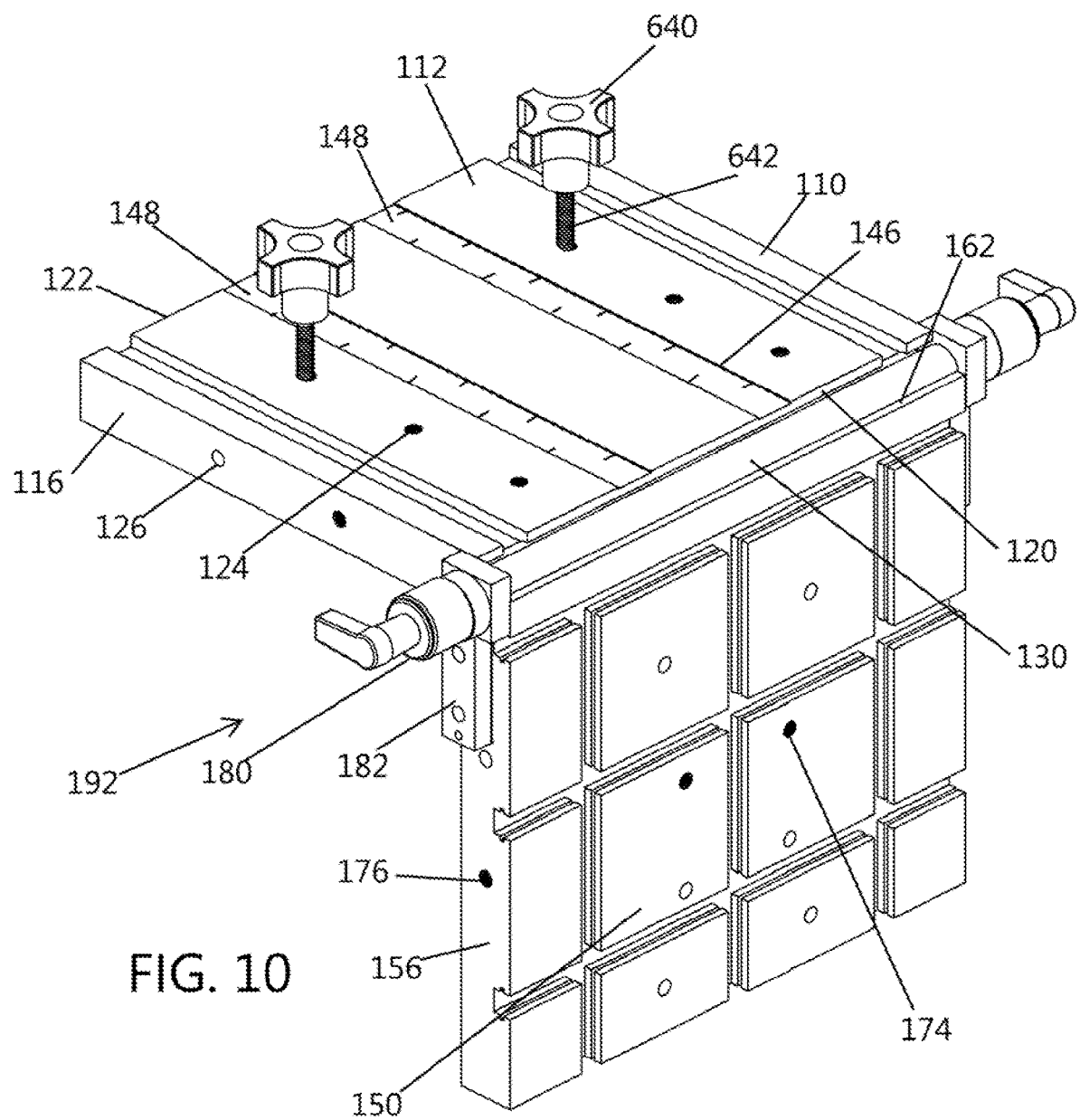
FIG. 10 is a front upper perspective view of the bottom plate of a woodworking tool of the present invention.
Figure 11:
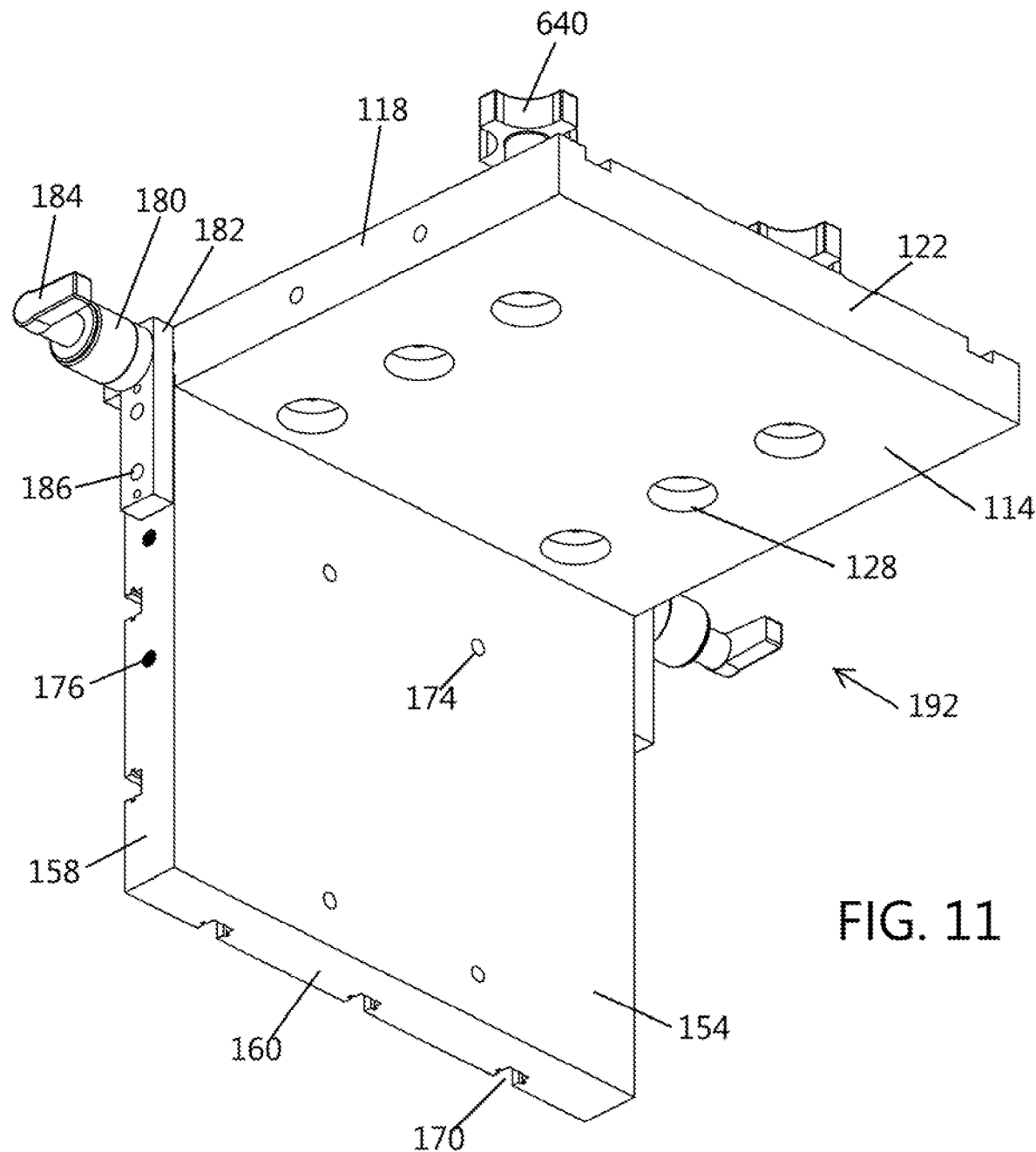
FIG. 11 is a back lower left perspective view of the bottom plate of the type shown in FIG. 10.
Figure 12:
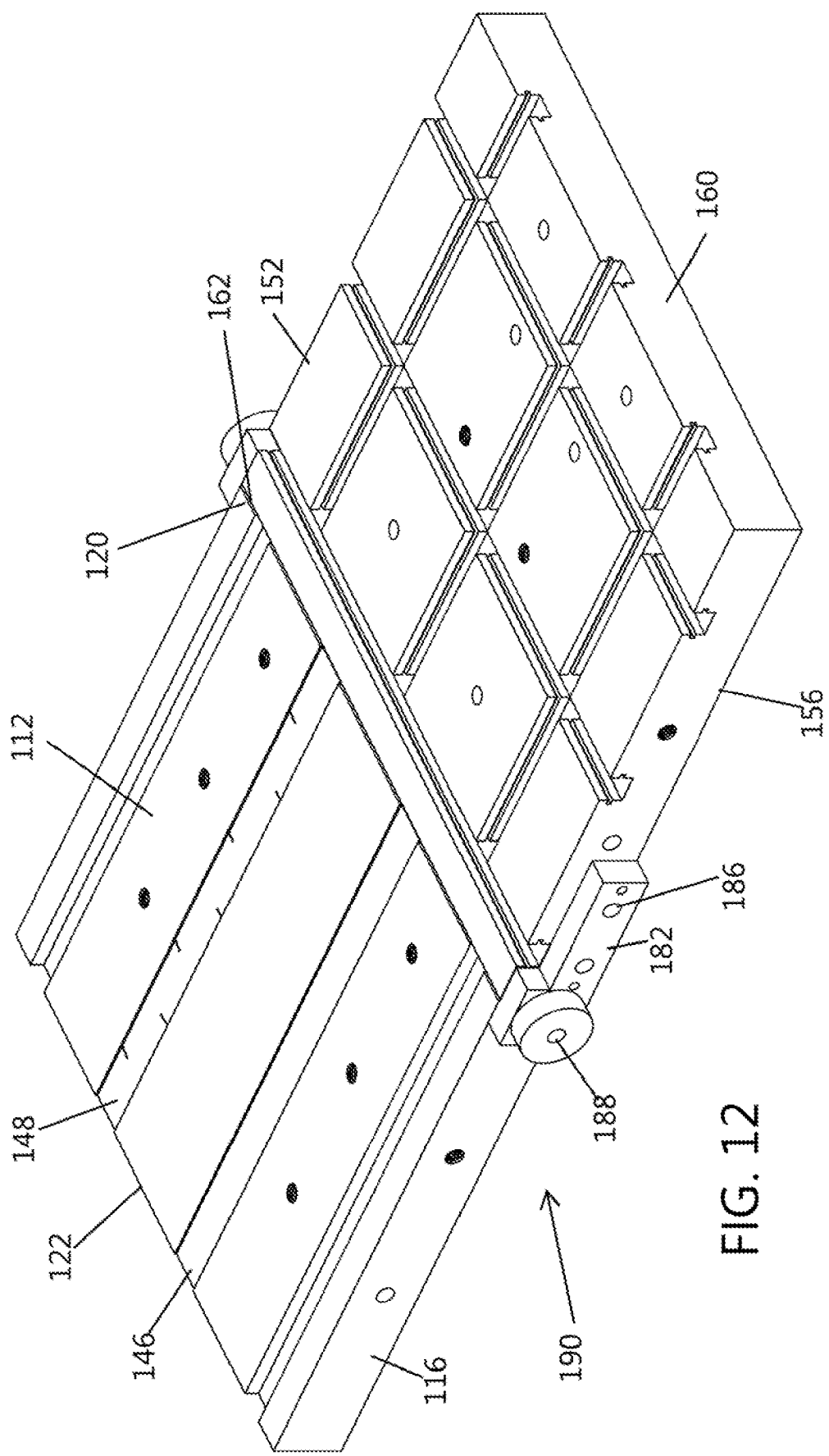
FIG. 12 is a partial assembled front upper right perspective view of a bottom plate of a woodworking tool in accordance with the present invention.
Figure 13:
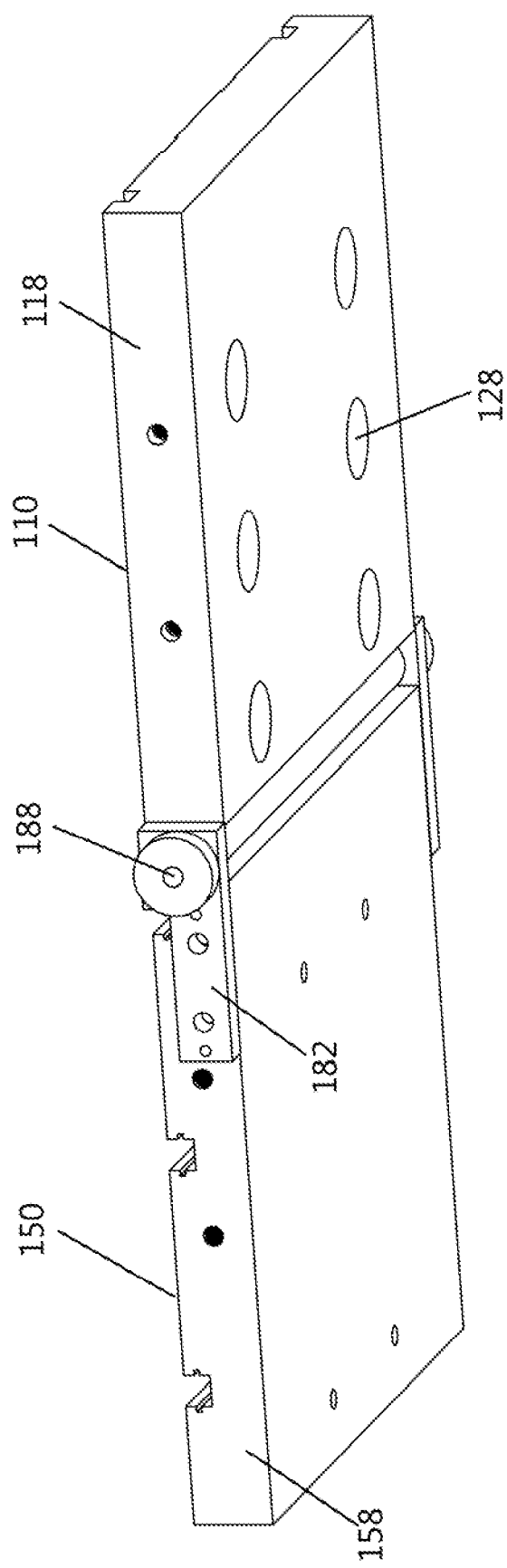
FIG. 13 is a partial assembled front lower perspective view of a bottom plate of a woodworking tool in accordance with the present invention.
Figure 14:
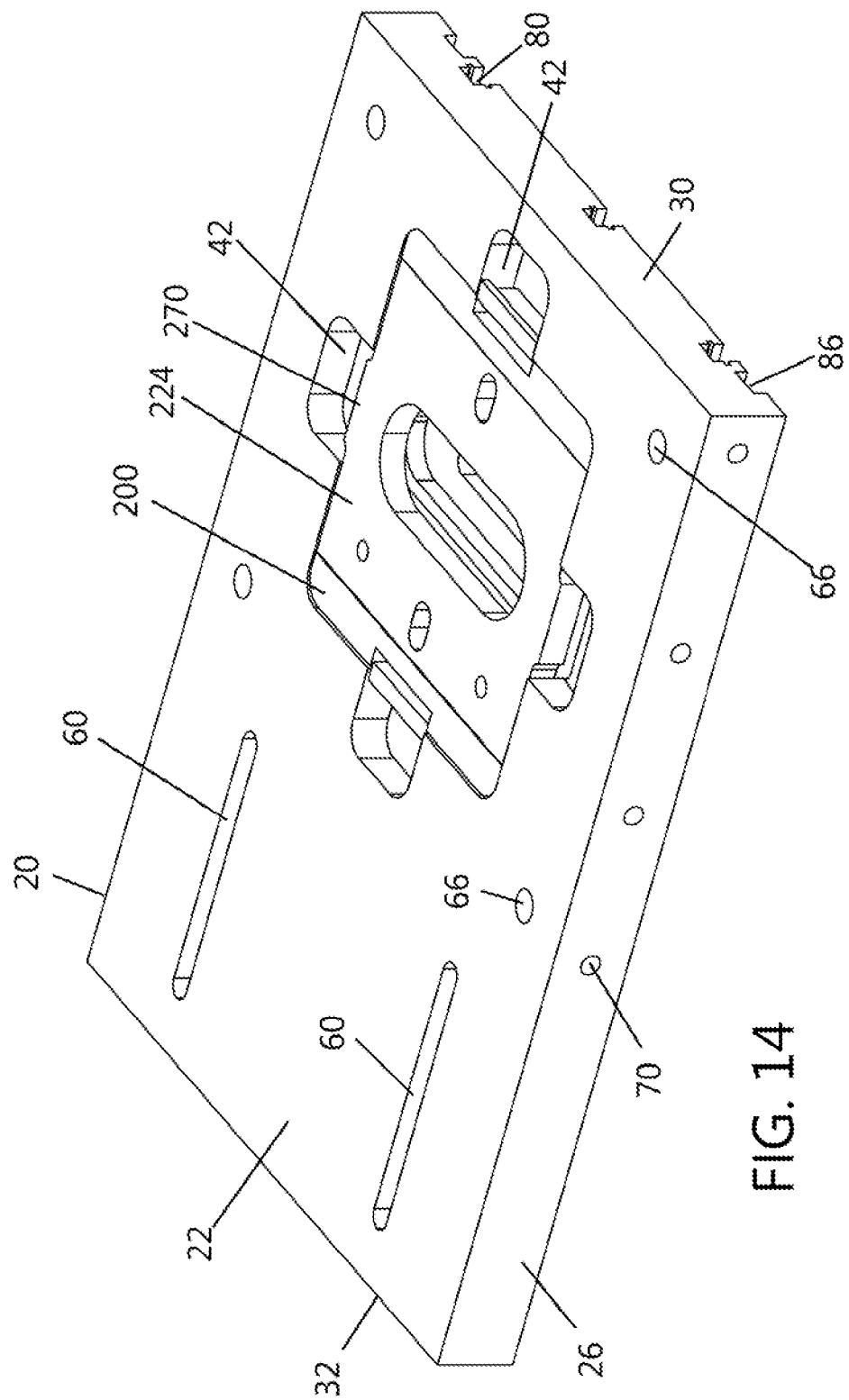
FIG. 14 is a front right upper perspective view of an embodiment of the top plate of the woodworking tool of the present invention with the inset locked in the cavity of the top plate.
Figure 15:
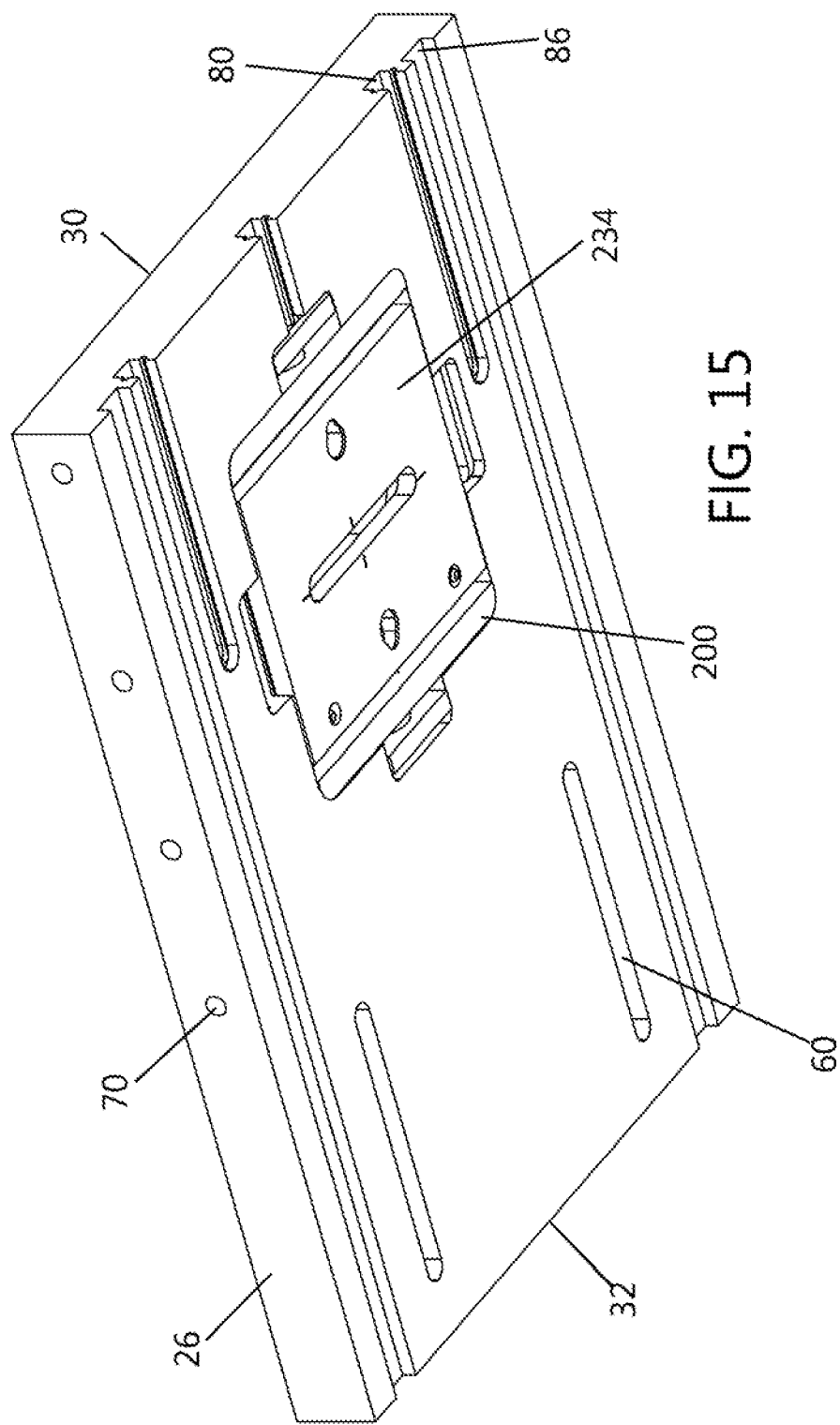
FIG. 15 is a front right bottom perspective view of the top plate of the type shown in FIG. 14.
Figure 16:
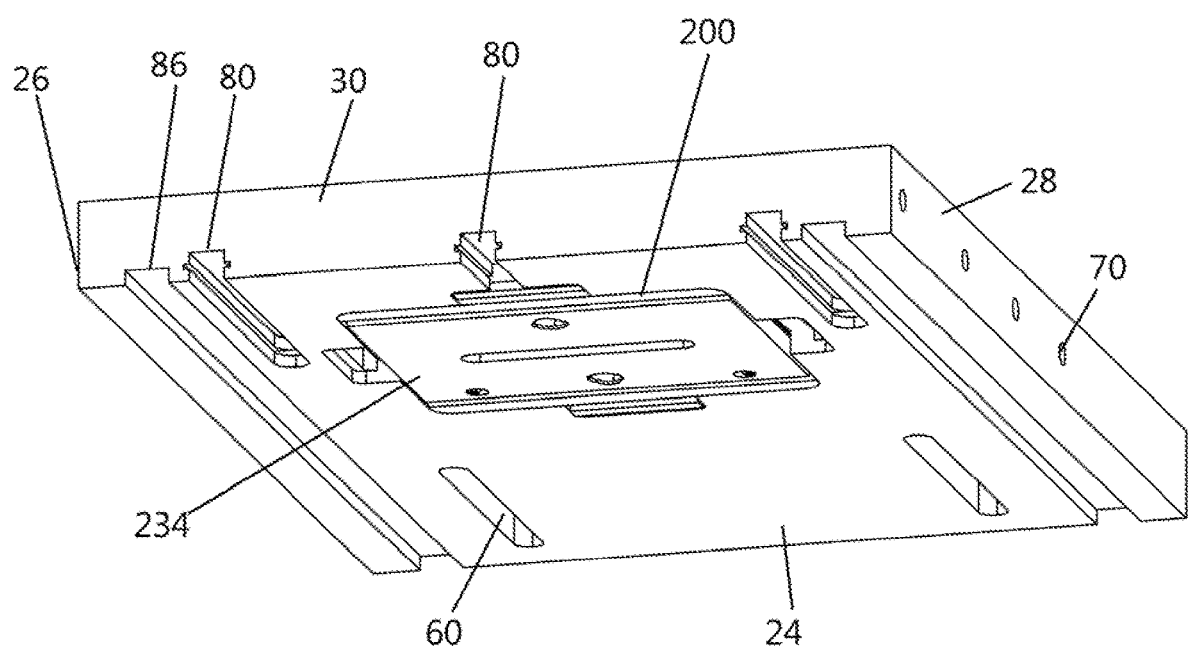
FIG. 16 is a right end bottom perspective view of the top plate of the woodworking tool of the present invention.
Figure 17:
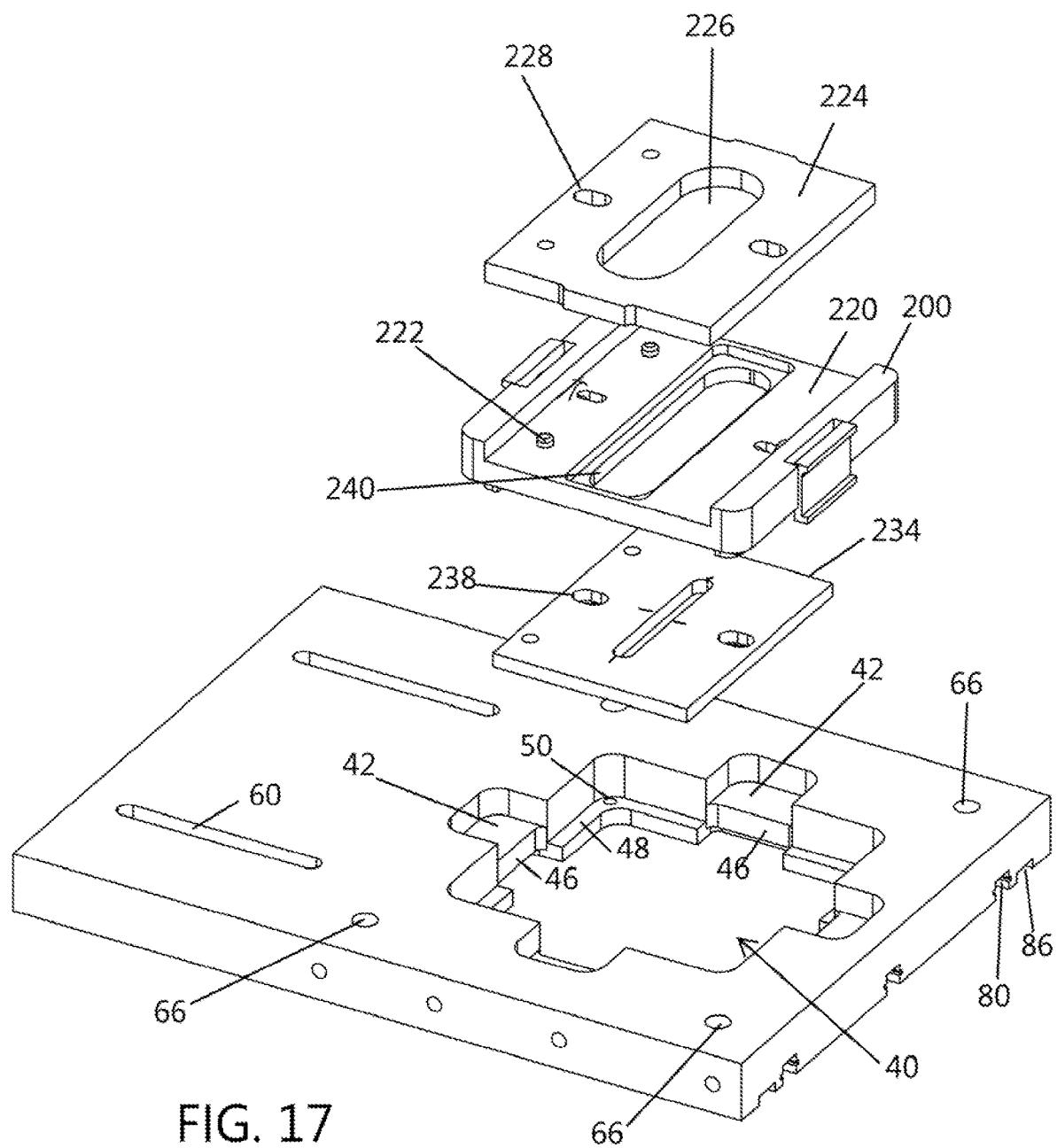
FIG. 17 is a perspective view of a top plate portion with inset templates and inset elevated above a router opening of the top plate.
Figure 18:
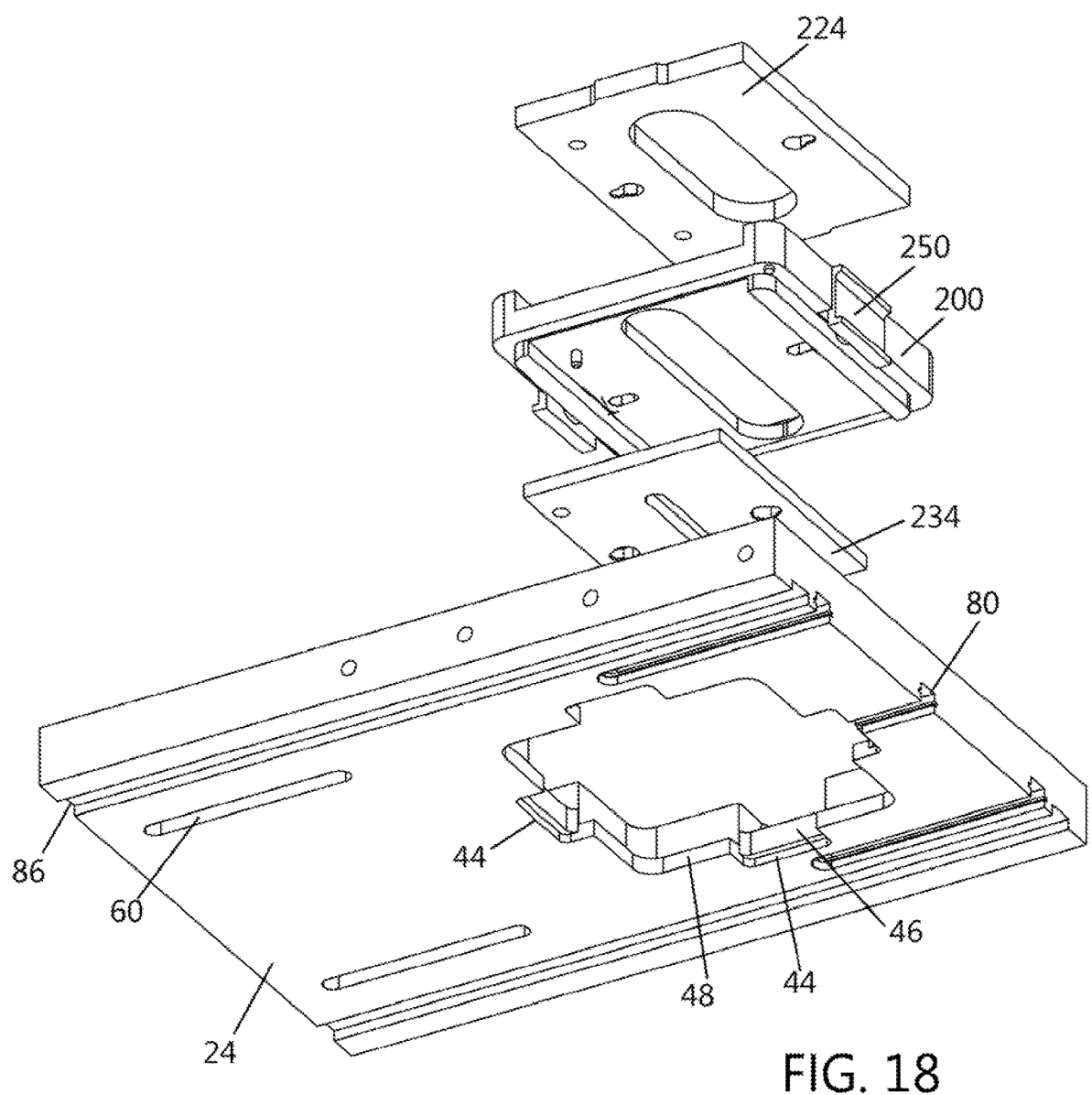
FIG. 18 is a bottom perspective view of the top plate, templates and inset of the type shown in FIG. 17.
Figure 19:
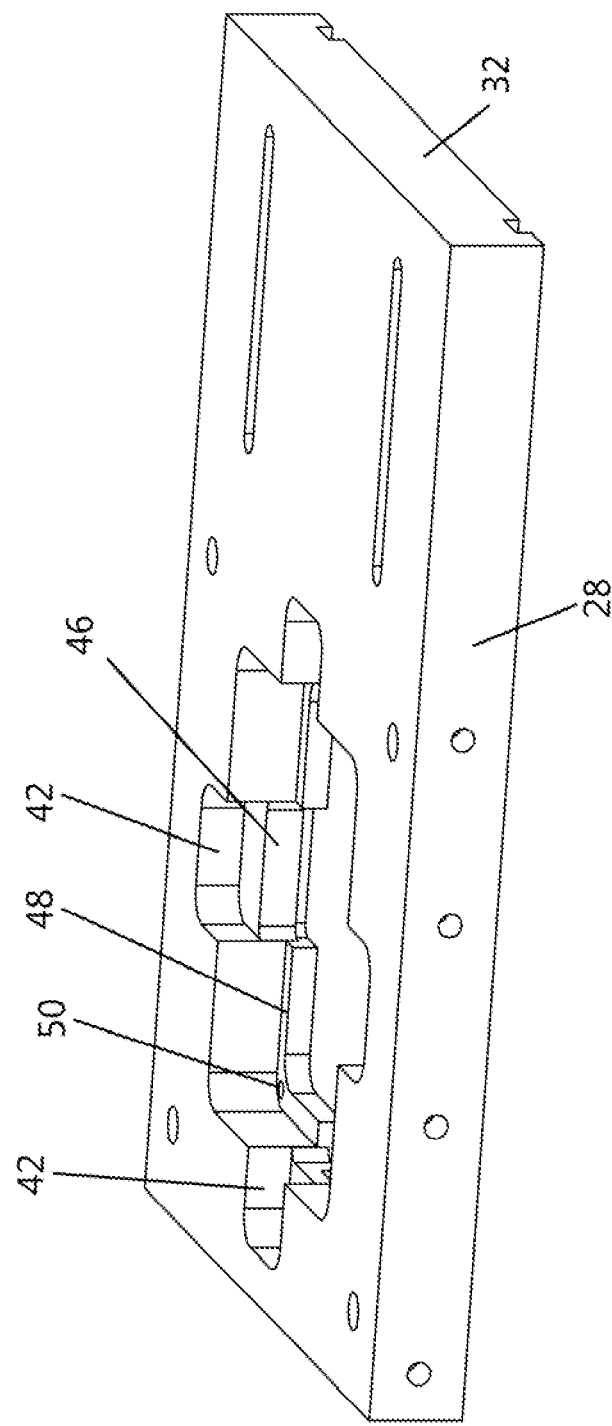
FIG. 19 is a back upper perspective view of a top plate of the tool and system of the present invention.
Figure 20:
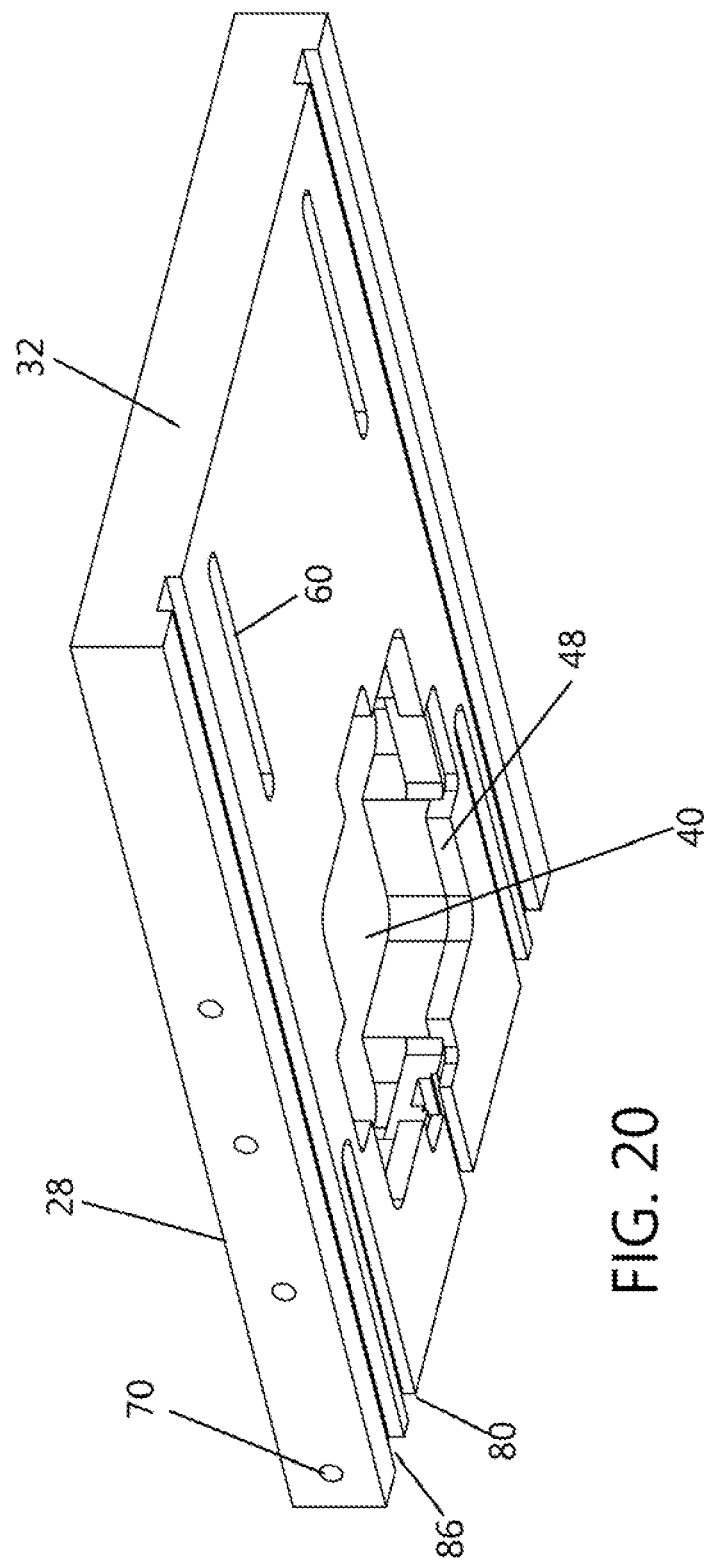
FIG. 20 is a back bottom perspective view of the top plate of the type shown in FIG. 19.

FIGS. 10-13 further illustrates the features of bottom plate 100. The bottom plate is comprised of a first half 110 and second half 150 that are coupled together with a rotation joint. Those skilled in the art will appreciate that a variety of joints may be utilized to fix the first half plate 110 and second half plate 150 together in order to connect the two plates and provide a central rotation axes. By way of example and without limitation intended the rotation joint may comprise a rotation cylinder 130 fixed to end 120 of the first plate 110. A concave recess is formed in end 162 that mates and rotates about fixed cylinder 130 and rotation axes 188. Mounting or rotation bracket 182 is fixed to the sides of the second half 150 of the bottom plate 100. The bracket 182 aligns and is adjacent the concave recess. The second half 150 rotates about the cylinder of the first plate 110. A quick release lock 180 and lever 184 fix the second half at a desired angle relative to the first plate 110. For example, the plates may be aligned so that they form a single planar orientation 190 (see FIG. 12) or the second plate may be rotated through ninety degrees and locked in place at any desired angle between zero to ninety degrees or ninety to 180 degrees depending upon the angle being measured. FIG. 10 illustrates a ninety degree orientation 192.

The first half 110 includes a top surface 112, bottom surface 114, first side 116, second side 118, first end 120 and second end 122. Similarly, the second half plate 150 includes top surface 152, bottom surface 154, a first side 156, a second side 158, a first end 160 and a second end 162. A grid 172 of t-slots 170 are formed in the top surface 152 of the second half 150 of the bottom plate 100. The t-slots 170 are adapted for receiving t-slot insert 630 of toggle clamp 600. Mounting holes 174 and 176 are provided on the top surface 152 and sides 156 and 158 of the second half plate 150. Mounting holes 174 may extend through the plate or may extend through a portion of the plate. The first half plate 110 includes slots 146 that are adapted to receive scales or rulers 148. The scale may be scaled in inches or metric with closely spaced markings to allow for precise positioning of the top plate 20 relative to the first half plate 110. By way of example the scale may include markings spaced apart every 0.010 inches. The first half plate further includes mounting holes 124 and 126 extending into the top surface 112 and sides 116 and 118 of the first half plate 110. Mounting holes 124 may be threaded and extend through the plate. The mounting holes 124 may be threaded and counter bored 128 to allow for fasteners such as nuts to be utilized while allowing the first half plate 110 rest flat on a table or other planar surface. Knob 640 includes threaded shaft 642 that may screw into the mounting holes 124.

FIGS. 14-20 further illustrates the features of top plate 20. The top plate is defined by a top surface 22, bottom surface 24, sides 26 and 28, and ends 30 and 32. The top plate 20 includes an interlocking inset 200 contained within the router opening or pocket 40. The inset pocket or cavity 40 extends through the top plate from the top surface 22 to the bottom surface 24. The pocket 40 includes finger reliefs 42 extending outward into the top plate, inset ledge 48, pocket recesses or cavity sides 46, and undercuts 44. When the inset 200 is inserted into the pocket, the inset rests on inset ledge 48. A positive location pin or hole 50 formed along the ledge 48 interacts with positive locators 248 formed on a bottom surface 204 of the inset 200. Tabs 252 and slots 254 of the inset 200 engage the undercuts 44 and cavity sides 46 of the inset pocket or cavity 40. In this manner the inset 200 locks in place within the cavity 40

Knobs 640 include a threaded shaft 642 that slides within slots 60 extending through the top plate 20. When the knob is turned (in a predefined direction dependent upon the direction of the threading on the threaded shaft), a bottom of the knob engages the top plate and causes the top plate to press against the first half 110 of the bottom plate 100 thereby holding the top plate 20 firmly in place. Threaded apertures 66 extend into the top plate and are aligned around the insert pocket 40. The threaded apertures 66 may be utilized to clamp or otherwise secure a router (not shown) to the top plate 20. Rail slots 86 are formed in the bottom 24 of the top plate 20 and are aligned with rail slots 140 formed in a top surface 112 of the first half 110 of the bottom plate 100. An insert may be affixed within the slot 86 or slot 140 to form a rail into which the opposing slot may ride. The rail may be constructed from a durable polymer such as Polytetrafluoroethylene (PTFE), Polyether Ether Ketone (PEEK), nylon or fiber filled nylons, a polypropylene or other known suitable polymer. The slots and rails allow the top plate 20 to be slid over the first half of the bottom plate 100 with minimal effort and in a precise direction and controlled increments.

The mounting holes 70 extending into sides 26 and 28 may be threaded and utilized to mount brackets, fences or guides to a side or sides of the top plate 20. Slots 80 may be used in conjunction with t-slot inserts 630 to mount either fence 300 or fence 400 to the bottom 24 of top plate 20. Either fence may be used alone or in conjunction with the bottom plate 100. A horizontal style or push pull style toggle clamp 600 may be attached to either fence 300 or 400 to provide a clamping against the workpiece in a desired position. When used alone, the fence may be used as a guide along the edge of a workpiece to push or pull the top plate 20 and router over the workpiece. Use of the top plate and fence is particularly useful when cutting dados, grooves or ornamental edging into a workpiece.

Figure 21:
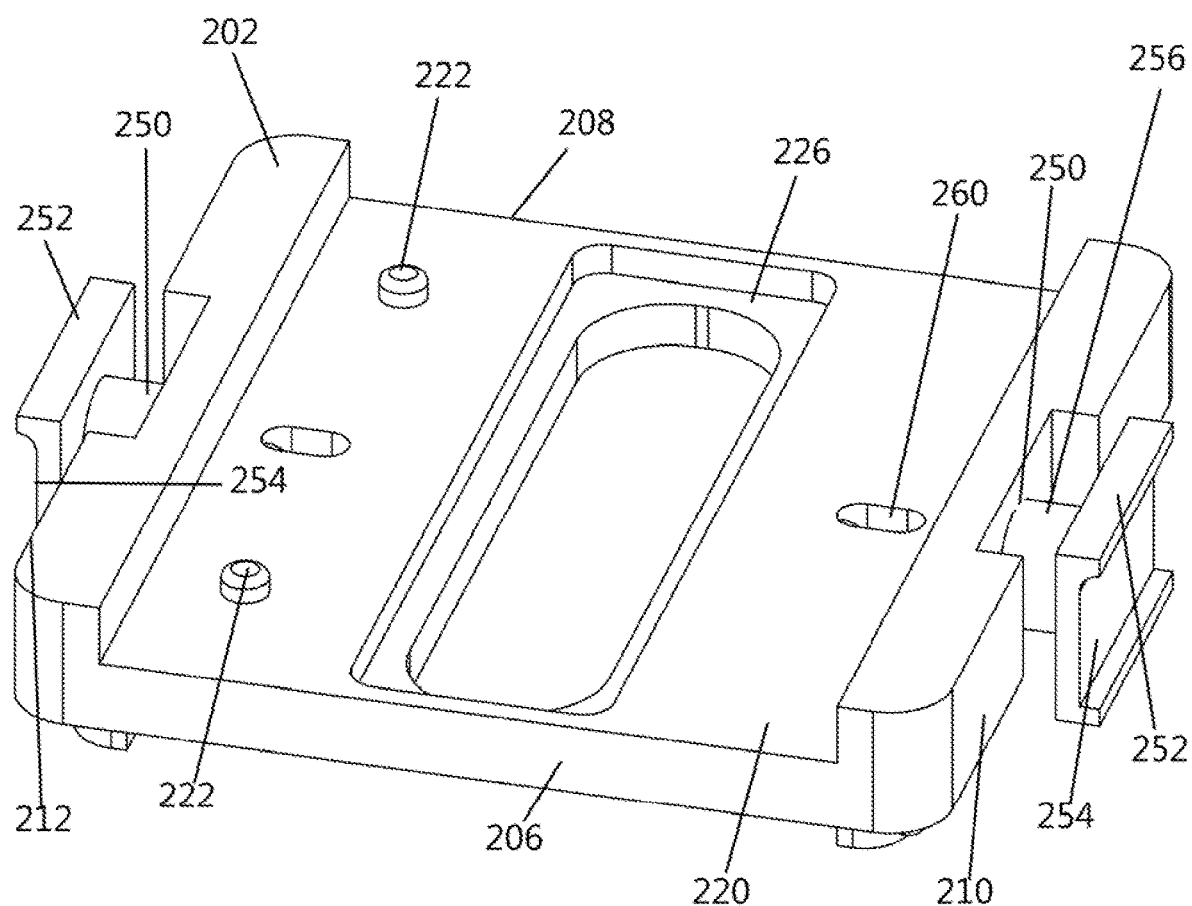
FIG. 21 is an upper perspective view of an inset of the tool and system of the present invention.
Figure 22:
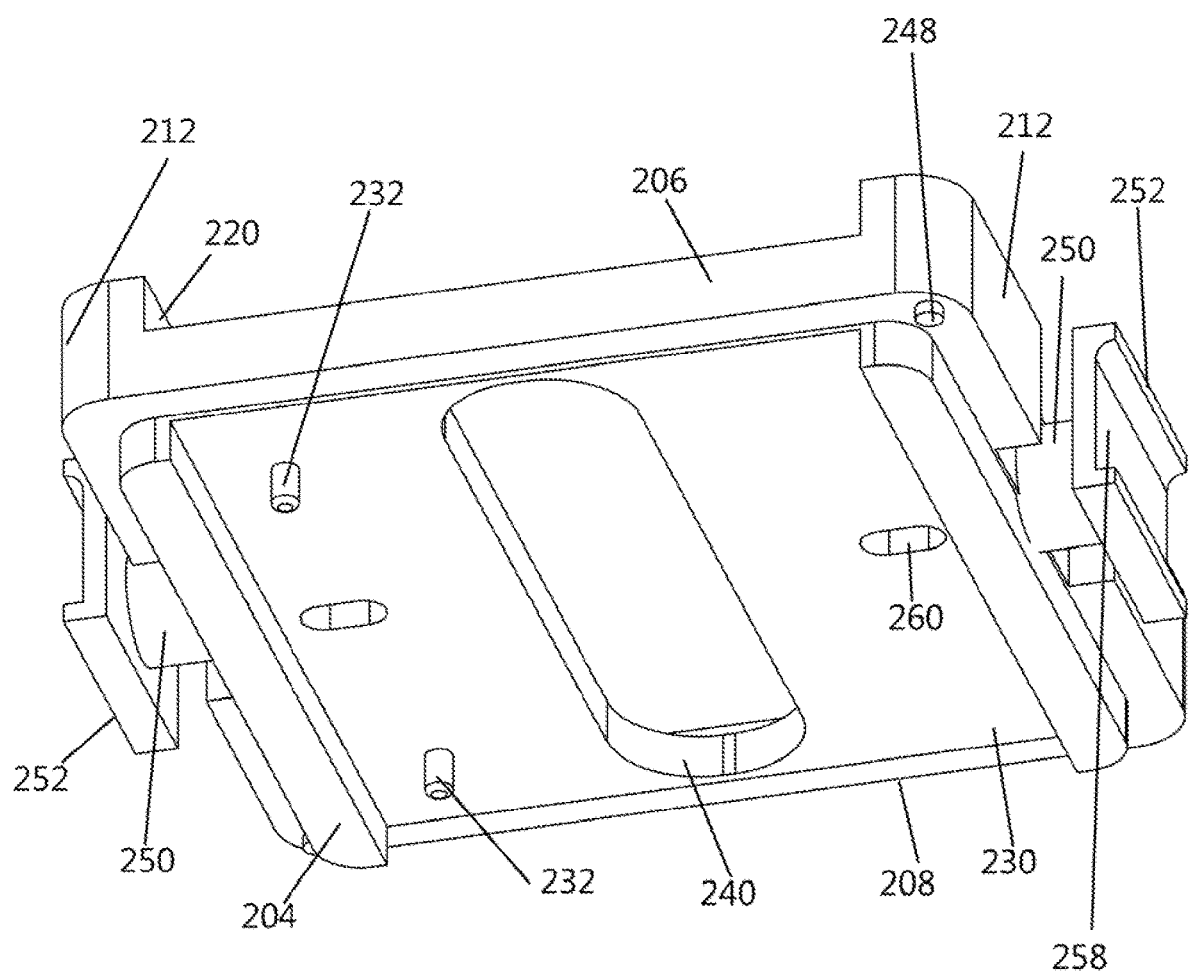
FIG. 22 is a lower perspective view of the inset of the type shown in FIG. 21.

FIGS. 21-22 further illustrates the features of inset 200. The inset includes a top surface 202, bottom surface 204, sides 206 and 208, and ends 210 and 212. A top template pocket or slot 220 is formed into the top surface 202 of the inset 200. Orientation or alignment pins 222 extend outward from the surface of the top template pocket 220 and are designed to engage top template 224. A bottom template pocket or slot 230 extends into the inset from the bottom surface 204. The bottom slot 234 includes orientation or alignment pins 232 that extend outward from the surface of the bottom template pocket 230 and are designed to engage bottom template 234. Opposing compressible lock guides 250 extend outward from ends 210 and 212. Guides 250 include finger holds 258 having slots 254 extending inward and tabs 252 extending outward that interlock with the inner sides 46 and undercut 44 of the cavity 40 of the top plate 20. The compressible guides further includes a shaft 256 that extends into a hole formed in the ends. A spring is positioned within the hole and compresses when the guides are pressed inwards. Screw or other fittings (not illustrated) are attached to the shaft and extends through the aperture or key lock 260 formed through the insert 200. The screws restrict the guides from being pushed out of the hole by the compression springs. The screw also engage keyholes formed in the templates 224 and 234.

Figure 23:
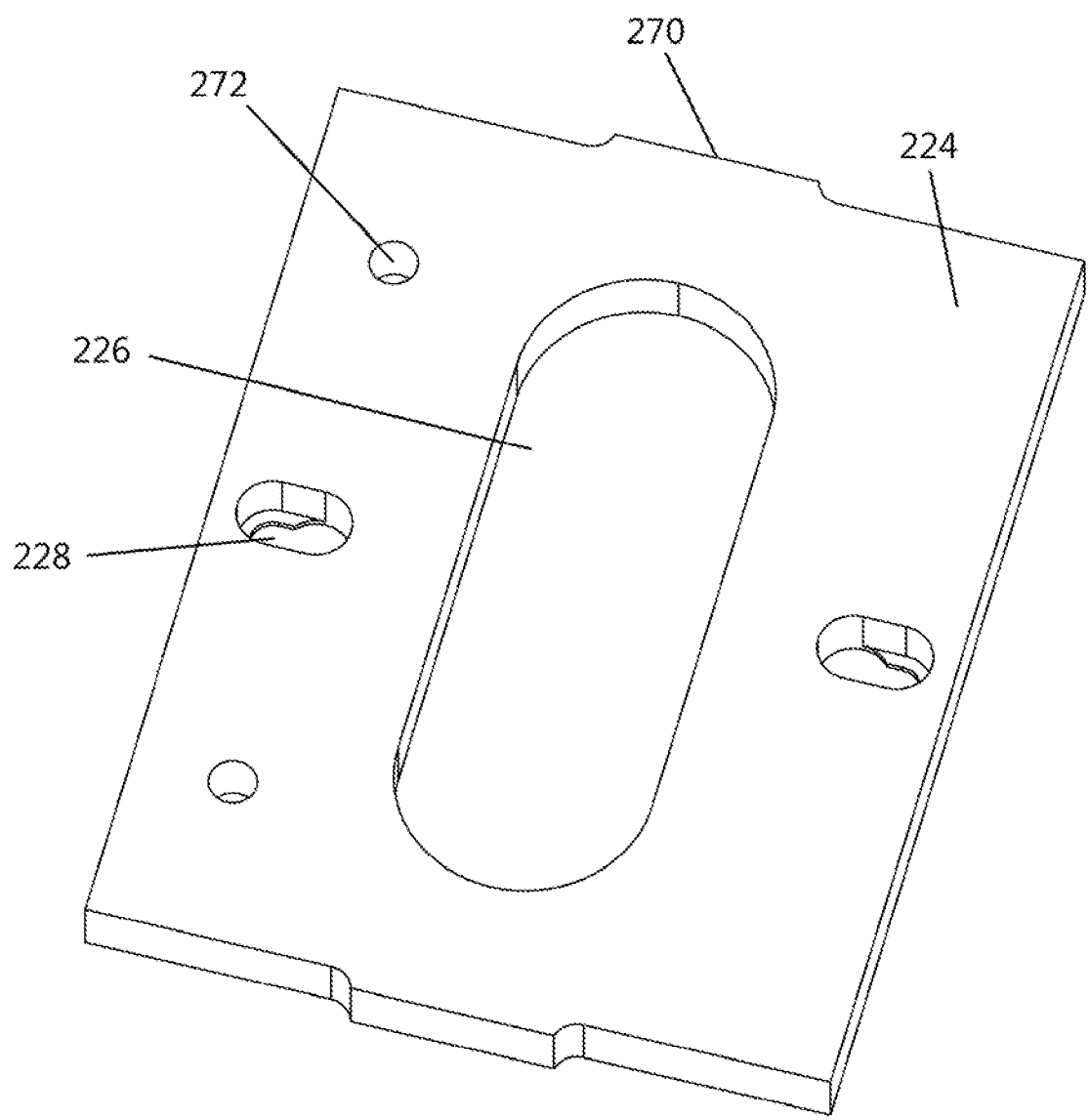
FIG. 23 is an upper perspective view of a top inset template of the tool and system of the present invention.
Figure 24:
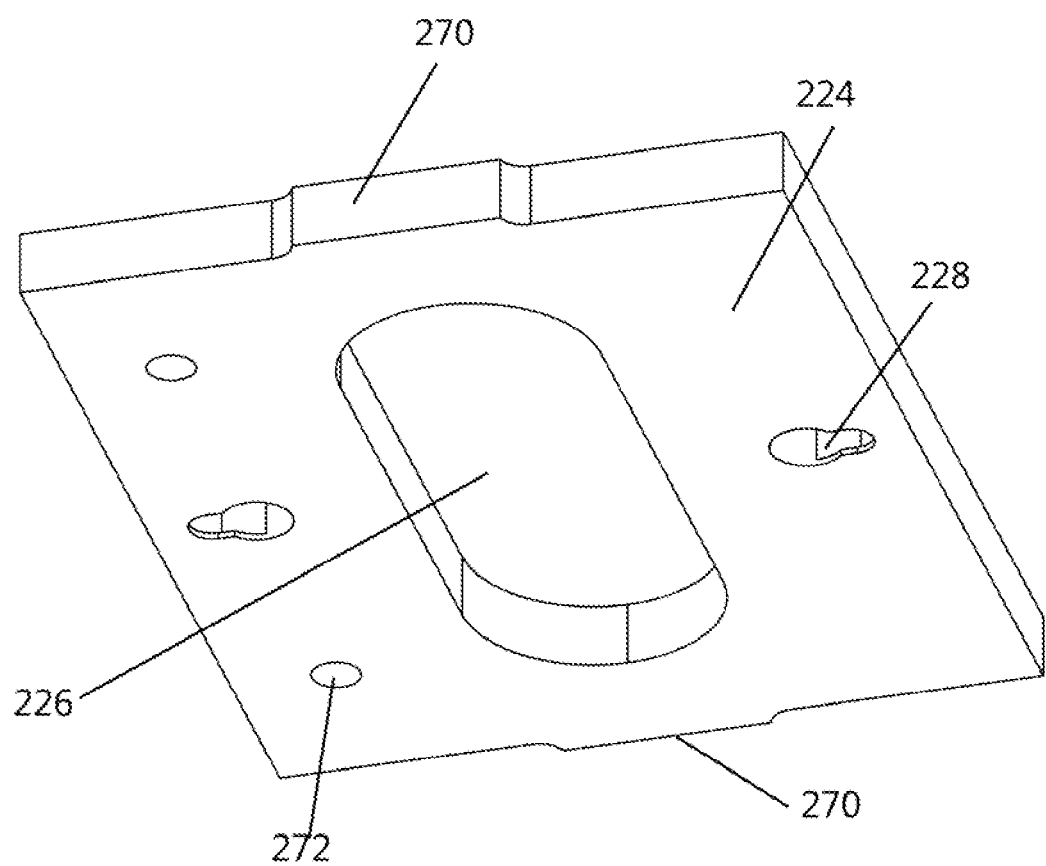
FIG. 24 is a lower perspective view of the top inset template of the type shown in FIG. 23.

FIGS. 23-24 further illustrates the features of top template 224. The template includes a router channel 226 and keyholes 228 extending through the template. The router channel 226 has an outline or shape that the router guide bushing may be pressed against and follow to cut a correspond shape out of the workpiece. The key 228 engages the fitting extending from the shaft 256 of the lock guides 250 and fixes the template 224 within the template slot 220. Ends of the template further include tabs 270 extending from the ends that align and engage with finger reliefs 42 of the top plate 20. The tabs 270 further align the inset 200 within the inset pocket 40 of the top plate 20. Orientation or alignment holes 272 extend through the template 224 and engage with orientation pins 222.

Figure 25:
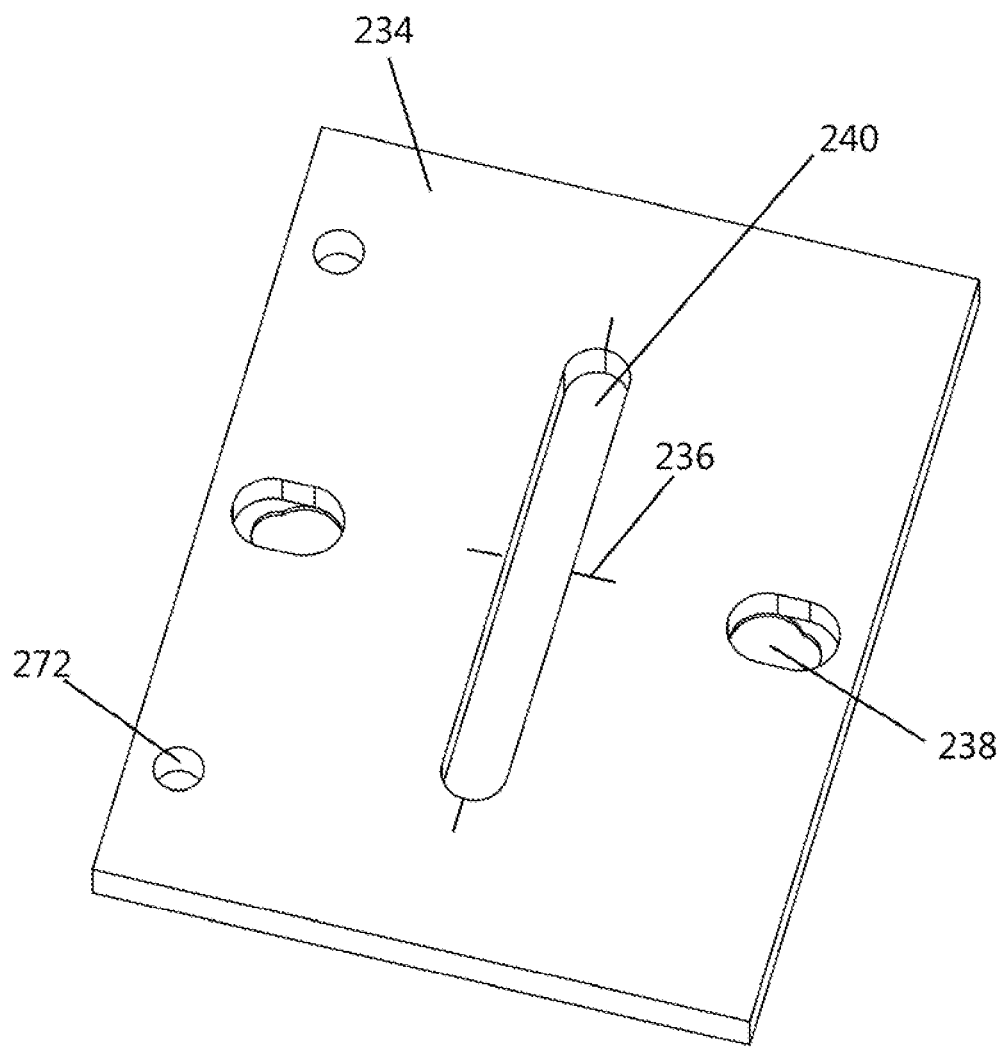
FIG. 25 is an upper perspective view of a bottom inset template of the tool and system of the present invention.
Figure 26:
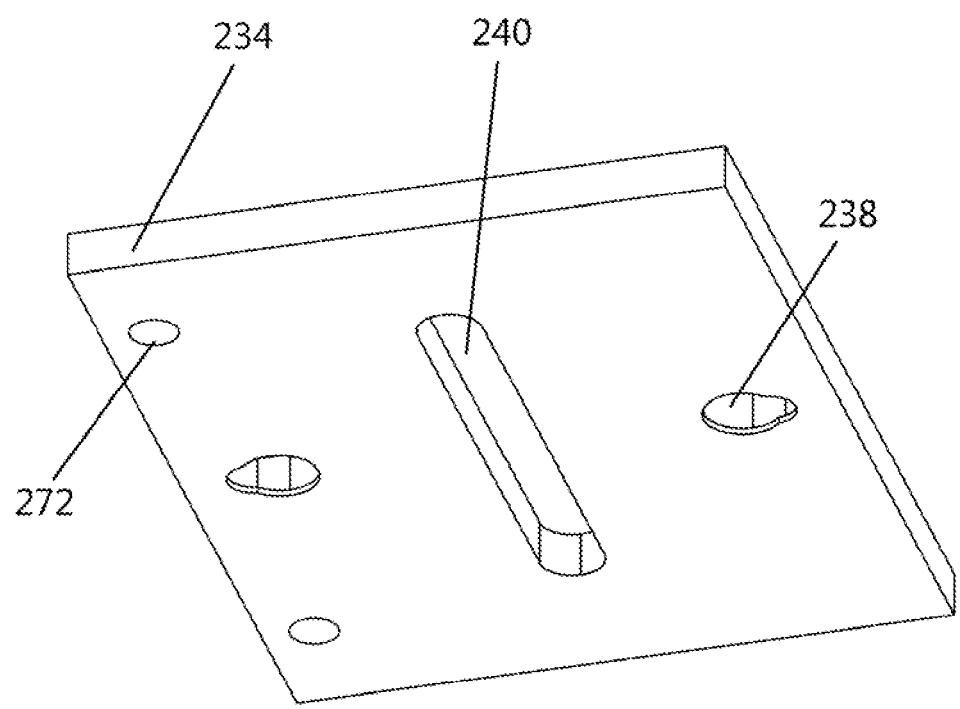
FIG. 26 is a bottom perspective view of a bottom inset template of the type shown in FIG. 25.
Figure 27:
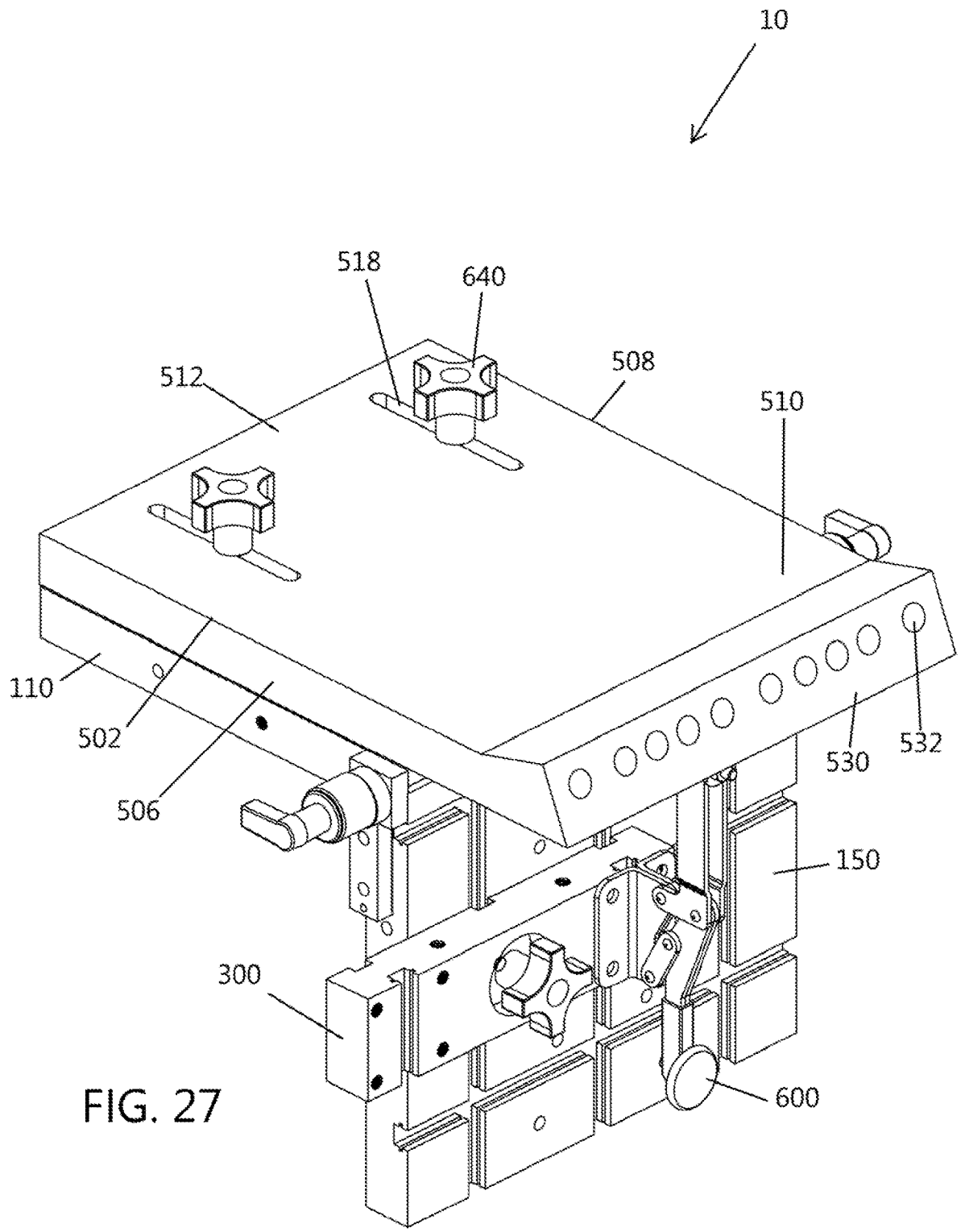
FIG. 27 is a front right upper perspective view of an embodiment of the woodworking tool of the present invention showing an interchangeable pocket hole top plate mounted to the bottom plate.
Figure 28:
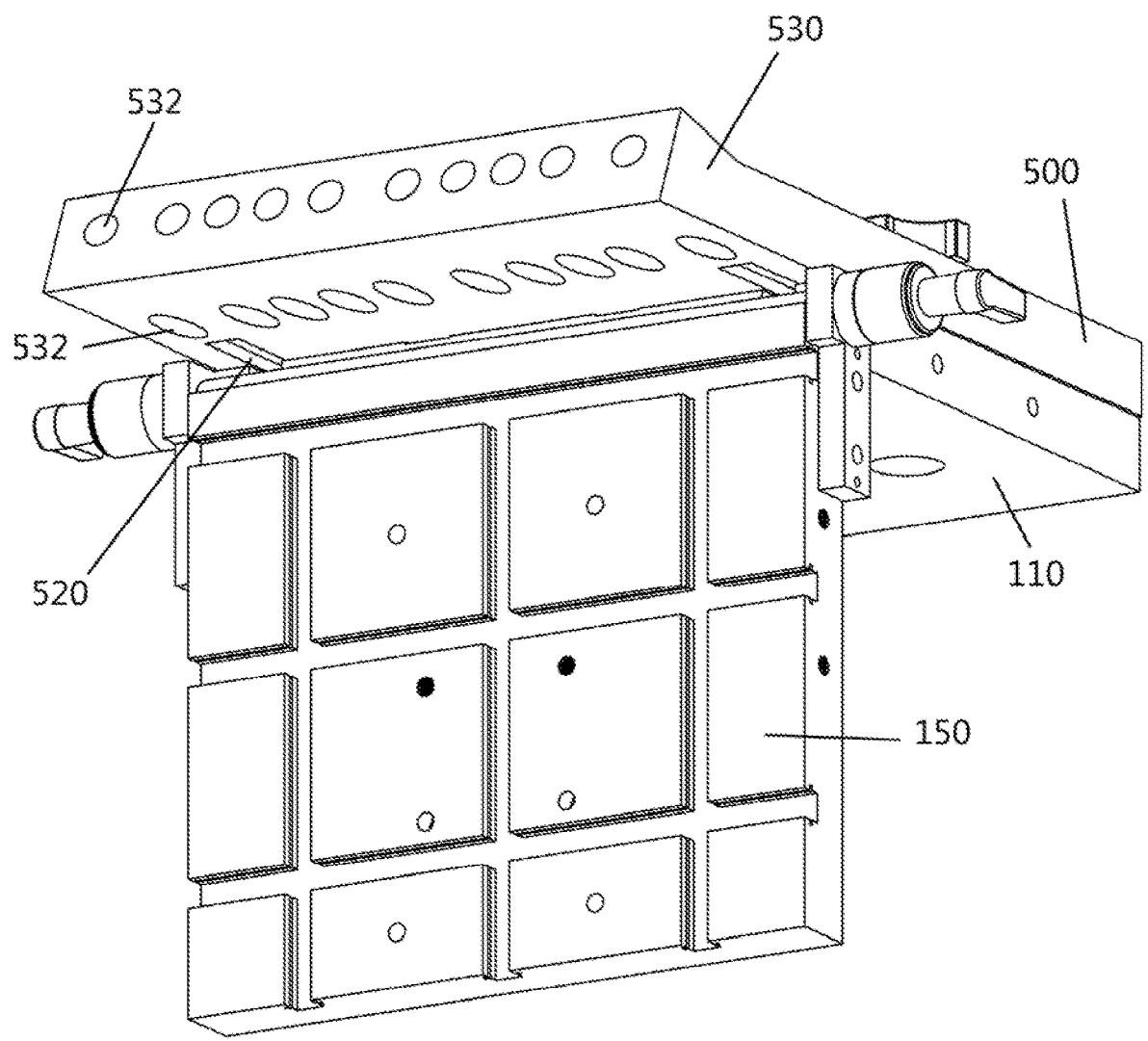
FIG. 28 is an end bottom perspective view of the embodiment of the woodworking tool of the type shown in FIG. 27 with the toggle clamp removed.
Figure 29:
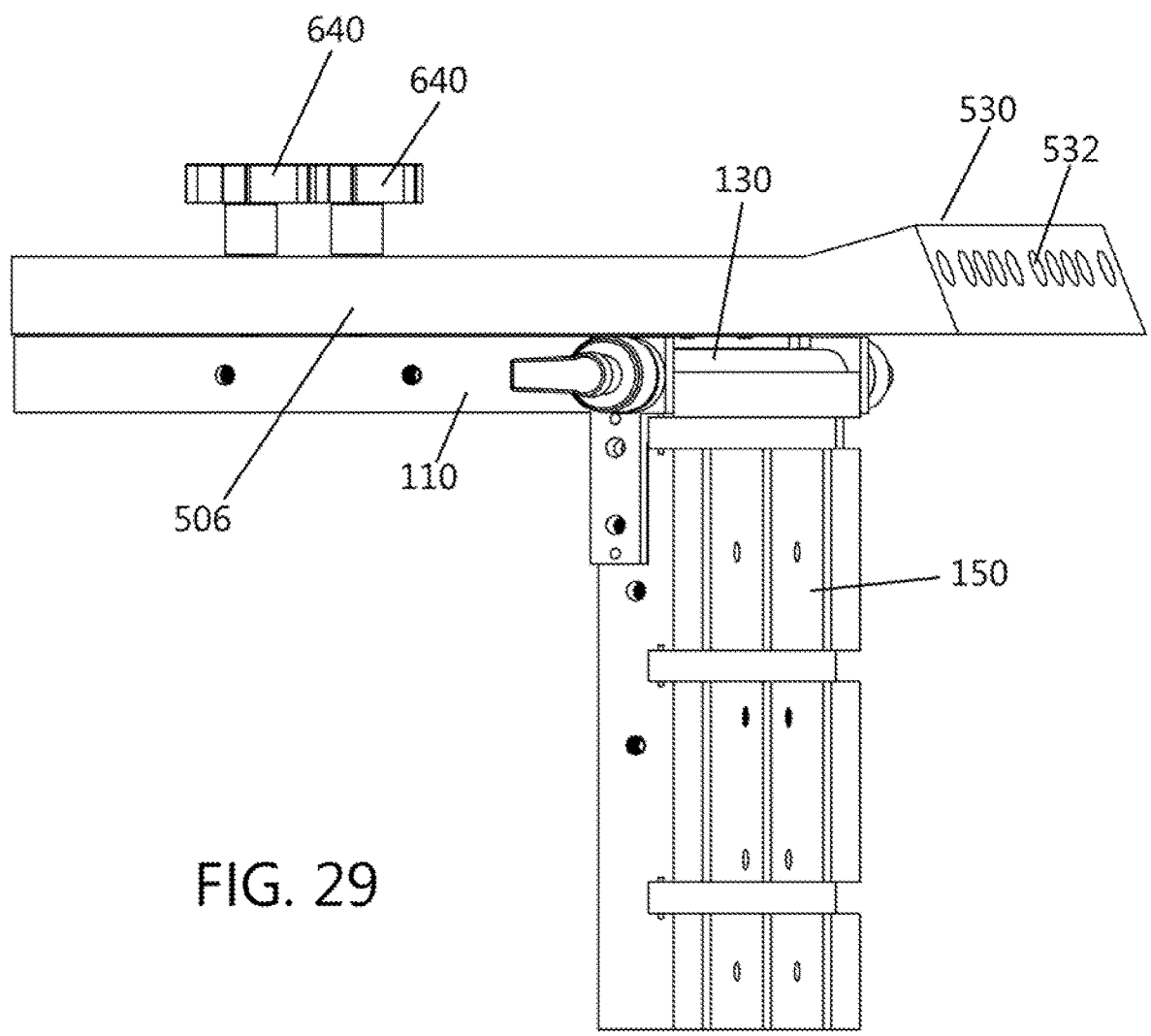
FIG. 29 is a partial side perspective view of the embodiment of the woodworking tool of the type shown in FIG. 28.
Figure 30:
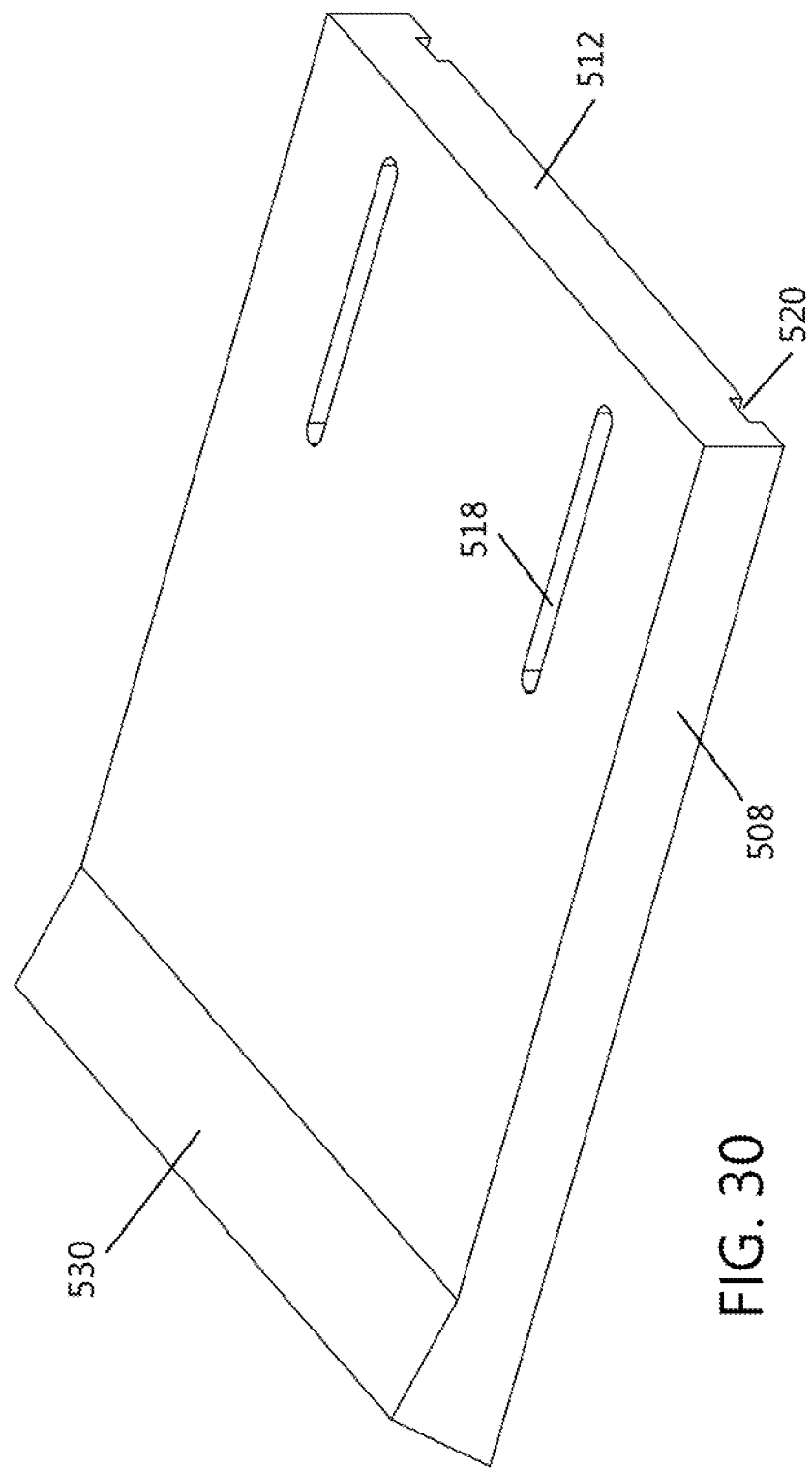
FIG. 30 is a back upper perspective view of a pocket hole top plate of an embodiment of the woodworking tool of the present invention.
Figure 31:
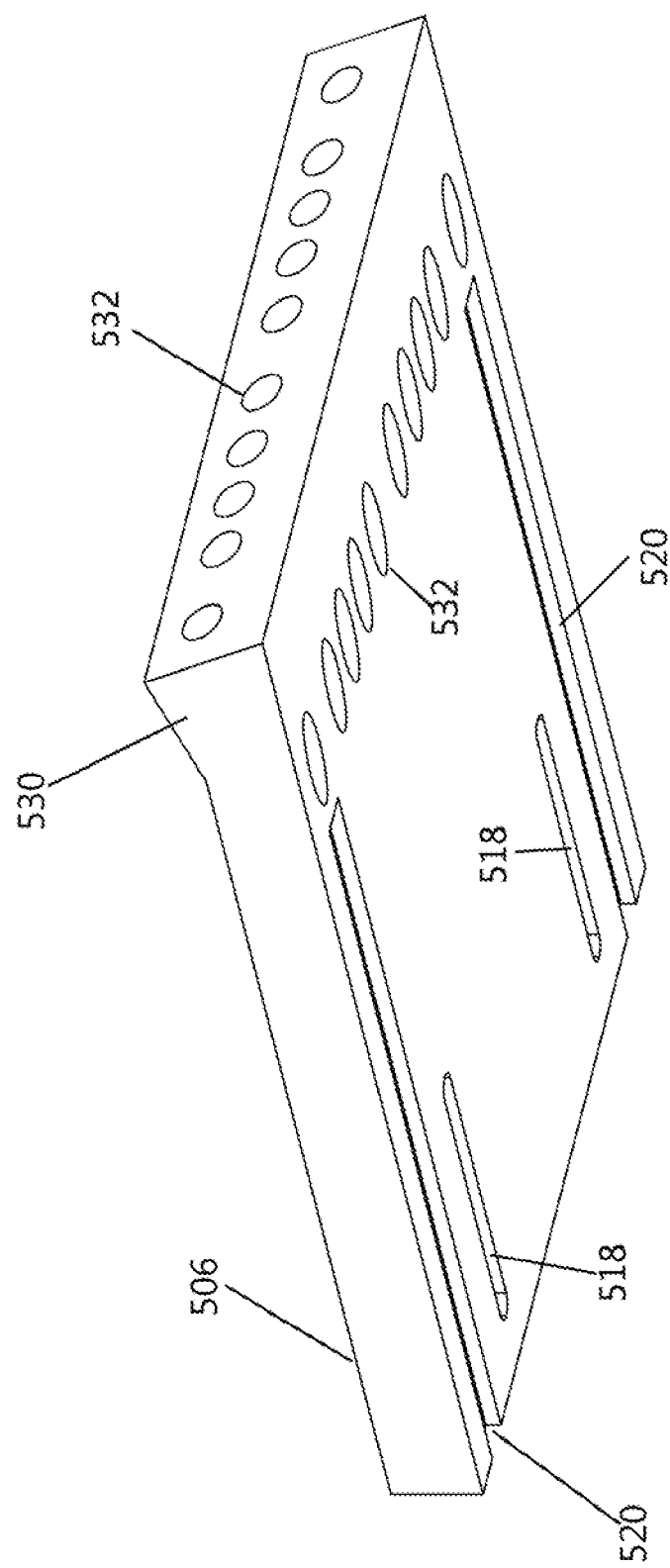
FIG. 31 is a front bottom perspective view of a pocket hole top plate of an embodiment of the woodworking tool of the present invention.

FIGS. 25-26 further illustrates the features of bottom template 234. The bottom template includes a guide bushing router channel 240 and keyholes 238 extending through the template. The guide bushing channel 240 may be utilized to center the center of the router relative to the center of the inset pocket 40. In this manner the position of the center of the router relative to the top plate 20 is known. The keyholes 238 engage the fitting extending from the shaft 256 of the lock guides 250 and fixes the template 234 within the template slot 230. Orientation or alignment holes 272 extend through the template 234 and engage with orientation pins 232.

With reference to FIGS. 27-31 a pocket hole top plate 500 is further described. The pocket hole top plate 500 includes a top surface 502, bottom surface 504, sides 506 and 508, and ends 510 and 512. An angled head 530 extends from end 510. The angled head 530 include angled apertures 532 that extend through the angled head and out the bottom 504 of the pocket hole top plate. The apertures are spaced a known distance apart and are positioned relative to the center line of the angled head 530. Slots 518 extend through the pocket hole plate 500 from the top surface 502 to the bottom surface 504 of the plate 500. The slots 518 are adapted to receive threaded shaft 642 of knob 640. Rail slots 520 are formed in the bottom 504 of the pocket hole plate 500 and are aligned with rail slots 140 formed in a top surface of the first half 110 of the bottom plate 100. Knobs 640 are turned to tighten the pocket hole plate 500 against the first half 110 of the bottom plate 100. The bottom plate 100 is shown having the first half 110 and second half 150 oriented at ninety degrees. As described previously, the angle at which the first half 110 is aligned relative to the second half 150 is quickly adjusted with the quick release lock. Toggle clamp 600 is used to press and secure a workpiece against the flat surface of the second half 150 of bottom plate 100 when the workpiece is aligned in the desire position. An edge of the workpiece is pressed flush against an edge 306 of the fence 300 so that the user knows that the length axes of the workpiece is aligned at ninety degrees relative to the bottom surface 504 of the pocket hole plate 500. A drill and drill bit may be used in conjunction with pocket hole apertures 532 to drill holes into the workpiece at desire locations and a desired angle through the workpiece.

Figure 32:
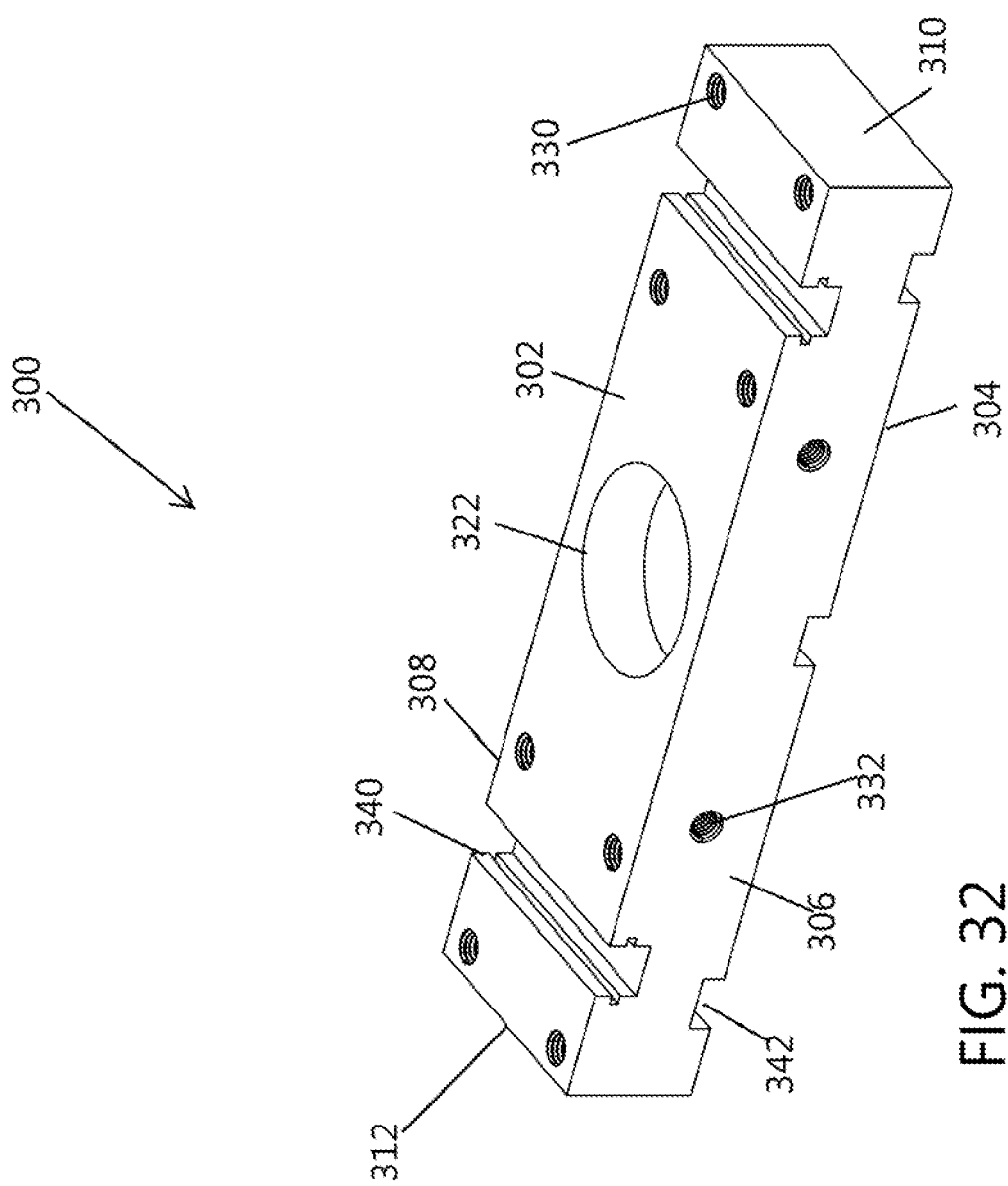
FIG. 32 is a front upper perspective view of a 90 degree fence of the an embodiment of the woodworking tool of the present invention.
Figure 33:
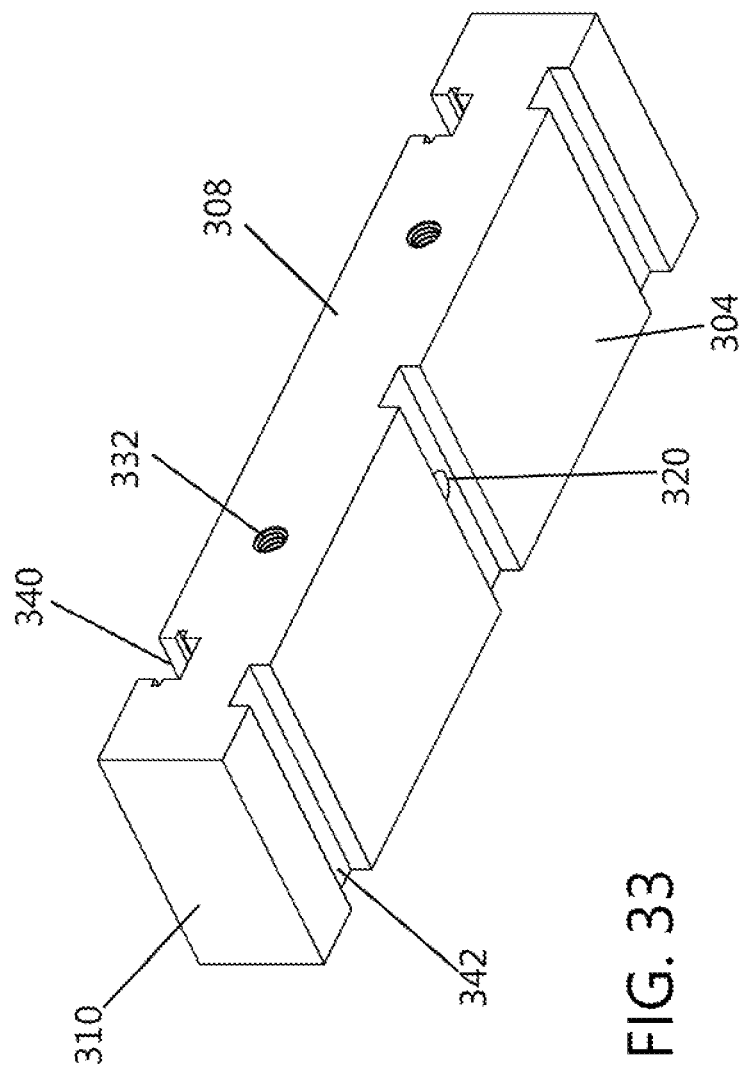
FIG. 33 is a lower back perspective view of the 90 degree fence of the type shown in FIG. 32.

FIGS. 32 and 33 further illustrates the features of 90 degree fence 300. The fence includes top surface 302, bottom surface 304, sides 306 and 308, and ends 310 and 312. Mounting hole 320 extends through the fence 300 from the top surface 302 to the bottom surface 304. The hole may be counter bored 322 to keep the knob 640 low profile as it extends from the fence. Threaded toggle clamp mount holes 330 and side mount holes 332 are formed in the fence. T-slots 340 extend through the fence from a top surface and slots or rails 342 are formed into the bottom surface 304 of the fence. A bottom portion of the t-slot insert 630 engages within t-slot 340 and a top portion of the t-slot insert slides within rail or slot 342. The t-slot insert may be utilized to mount the fence in a known and fixed orientation to the t-slot 170 of the second half 150 of the bottom plate 100. Additional rails may be mounted to slots 342 and engage the slots 170 of the second half plate 150 to further fix the fence position relative to the bottom plate.

Figure 34:
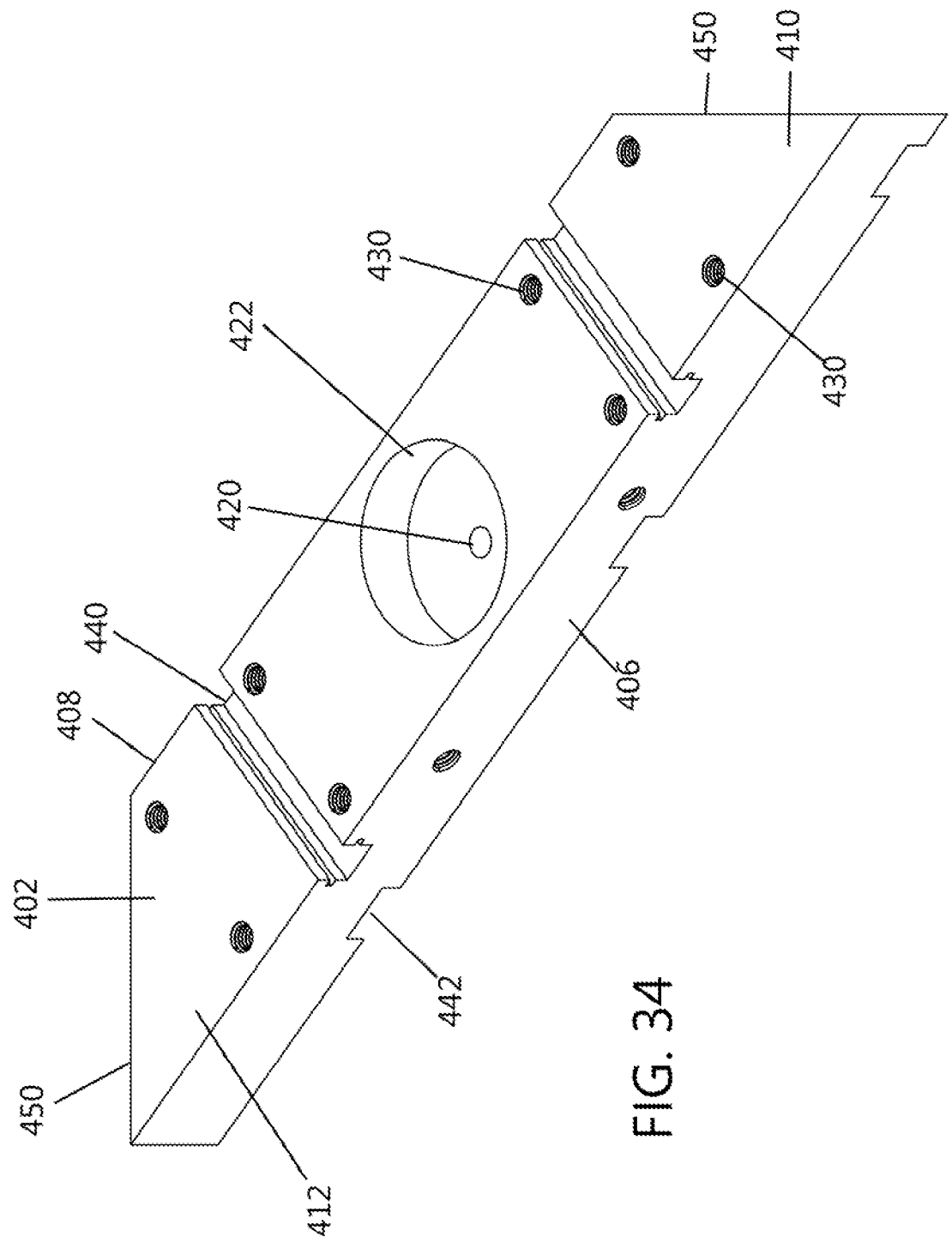
FIG. 34 is a front upper perspective view of a 45 degree fence of the an embodiment of the woodworking tool of the present invention.
Figure 35:
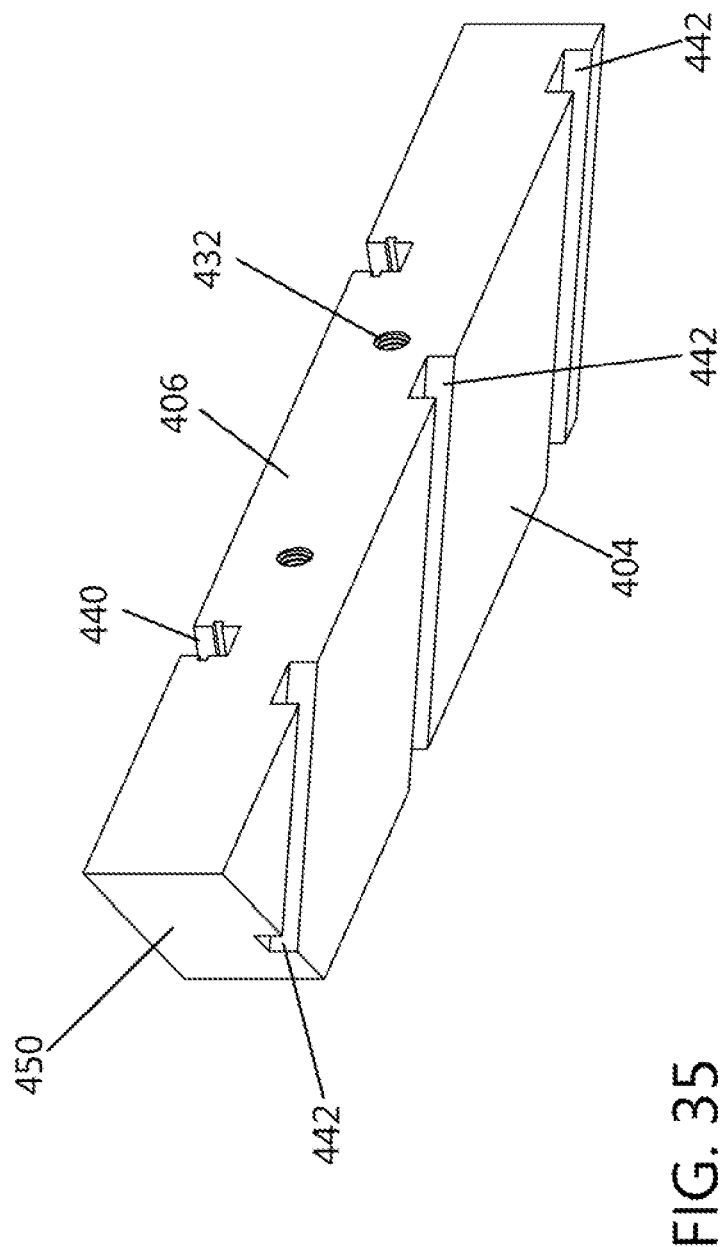
FIG. 35 is a lower back perspective view of the 45 degree fence of the type shown in FIG. 34.

FIGS. 34 and 35 further illustrates the features of a 45 degree fence 400. The fence includes top surface 402, bottom surface 404, sides 406 and 408, and ends 410 and 412. Mounting hole 420 extends through the fence 400 from the top surface 402 to the bottom surface 404. The hole may be counter bored 422 to keep the knob 640 low profile as it extends from the fence. Threaded toggle clamp mount holes 430 and side mount holes 432 are formed in the fence. T-slots 440 extend through the fence from a top surface and angled slots or rails 442 are formed into the bottom surface 404 of the fence. The angled slots 442 are aligned parallel with angled ends 450 of the fence 400. A bottom portion of the t-slot insert 630 engages within t-slot 440 and a top portion of the t-slot insert slides within rail or slot 442. The t-slot insert may be utilized to mount the fence in a known and fixed orientation to the t-slot 170 of the second half 150 of the bottom plate 100. Additional rails may be mounted to slots 442 and engage the slots 170 of the second half plate 150 to further fix the fence position relative to the bottom plate. Since the slots 442 extend at an angle through the fence, when the fence is mounted to the bottom plate, the fence is mounted at an angle relative to the grid 172 of the second half plate 150 of the bottom plate.

Figure 36:
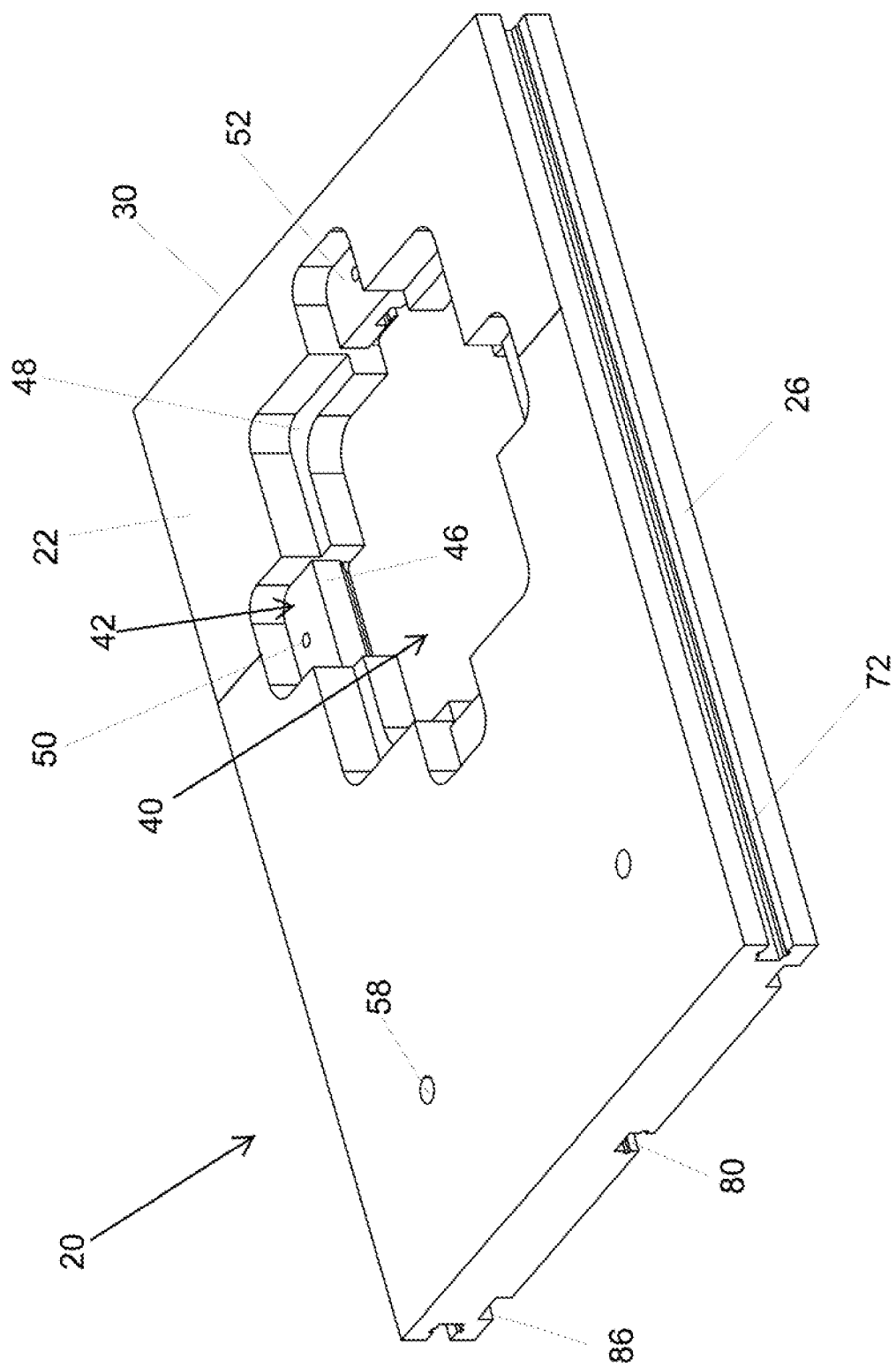
FIG. 36 is a top perspective view of an embodiment of a top plate in accordance with aspects of the invention.
Figure 37:
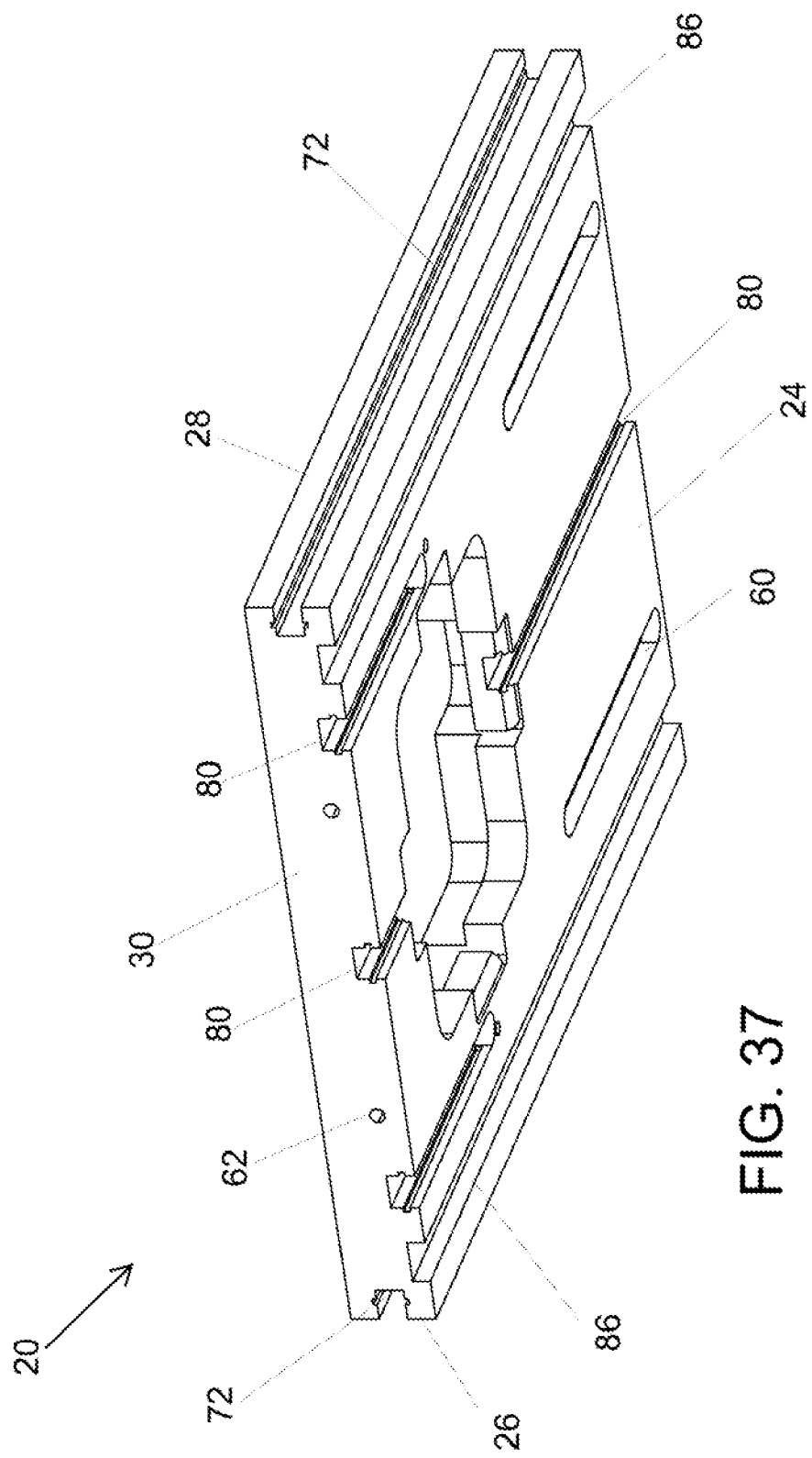
FIG. 37 is a bottom perspective view of an embodiment of a top plate in accordance with aspects of the invention.
Figure 38:
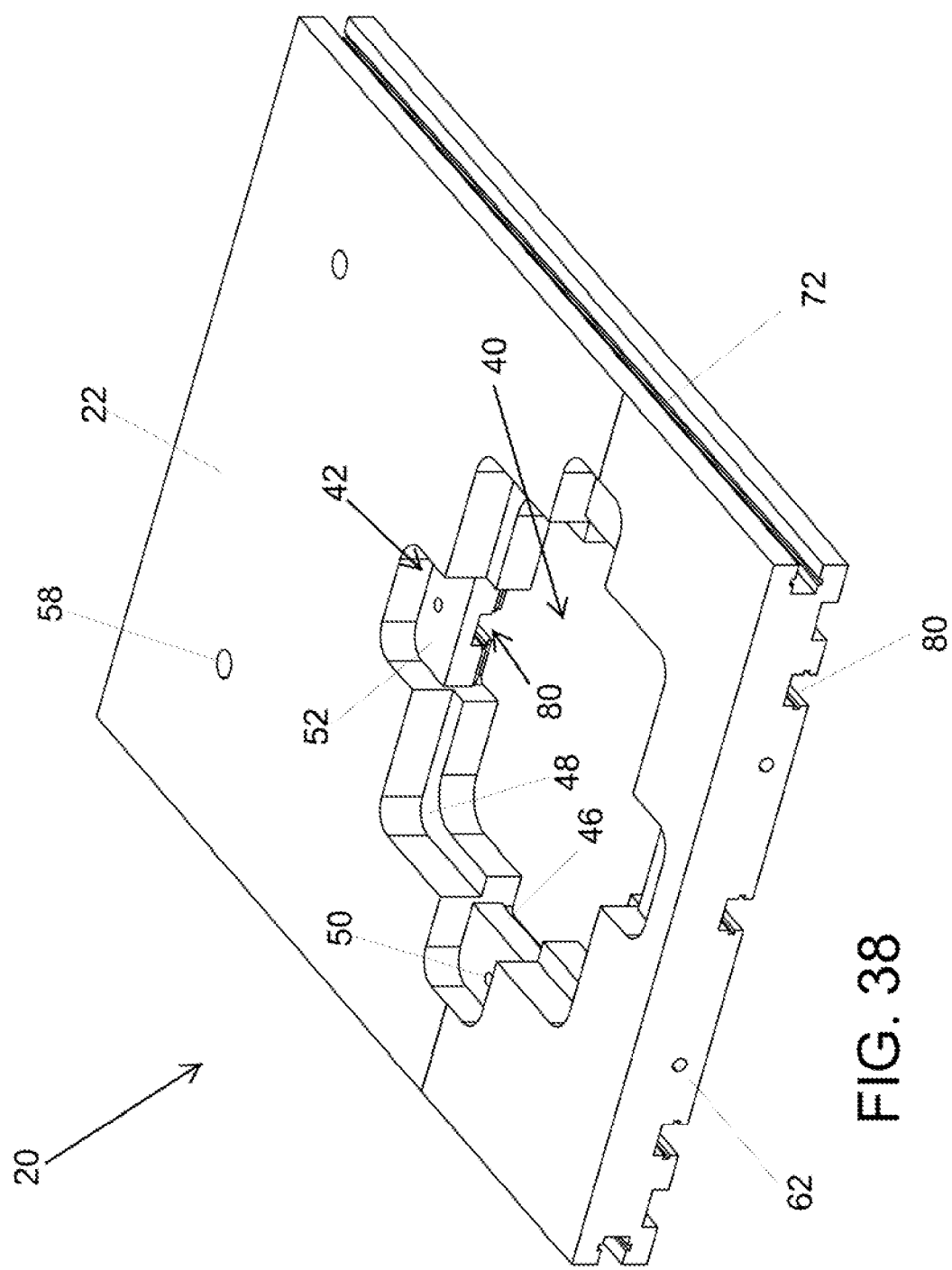
FIG. 38 is a top end perspective view of an embodiment of a top plate in accordance with aspects of the invention.

FIG. 36 through FIG. 38 further illustrates an alternate embodiment of top plate 20. Top plate 20 includes top surface 22, bottom surface 24, sides 26 and 28 and ends 30 and 32. Inset pocket or router opening 40 extends through the top plate 20 from the top surface 22 to the bottom surface 24. Sidewalls extending between the top surface and bottom surface define the perimeter of the router opening extending from the top surface to the bottom surface. Finger reliefs or alignment pockets 42 are formed into the top plate from the top surface and extending from the sidewalls into the top plate 20. Ledge 52 in each alignment pocket is adapted for receiving tab portions of the insert 200 as further described below. Mounting holes 58 extending through the top plate 20 which may be used to secure the top plate. Mounting t-slots are formed into the sides 26 and 28 and may be used to couple the top plate 20 to guide fence adapter 550 as further described below. The t-slots 80 and rails 86 are formed in the top plate 20 and function as described above.

Figure 39:
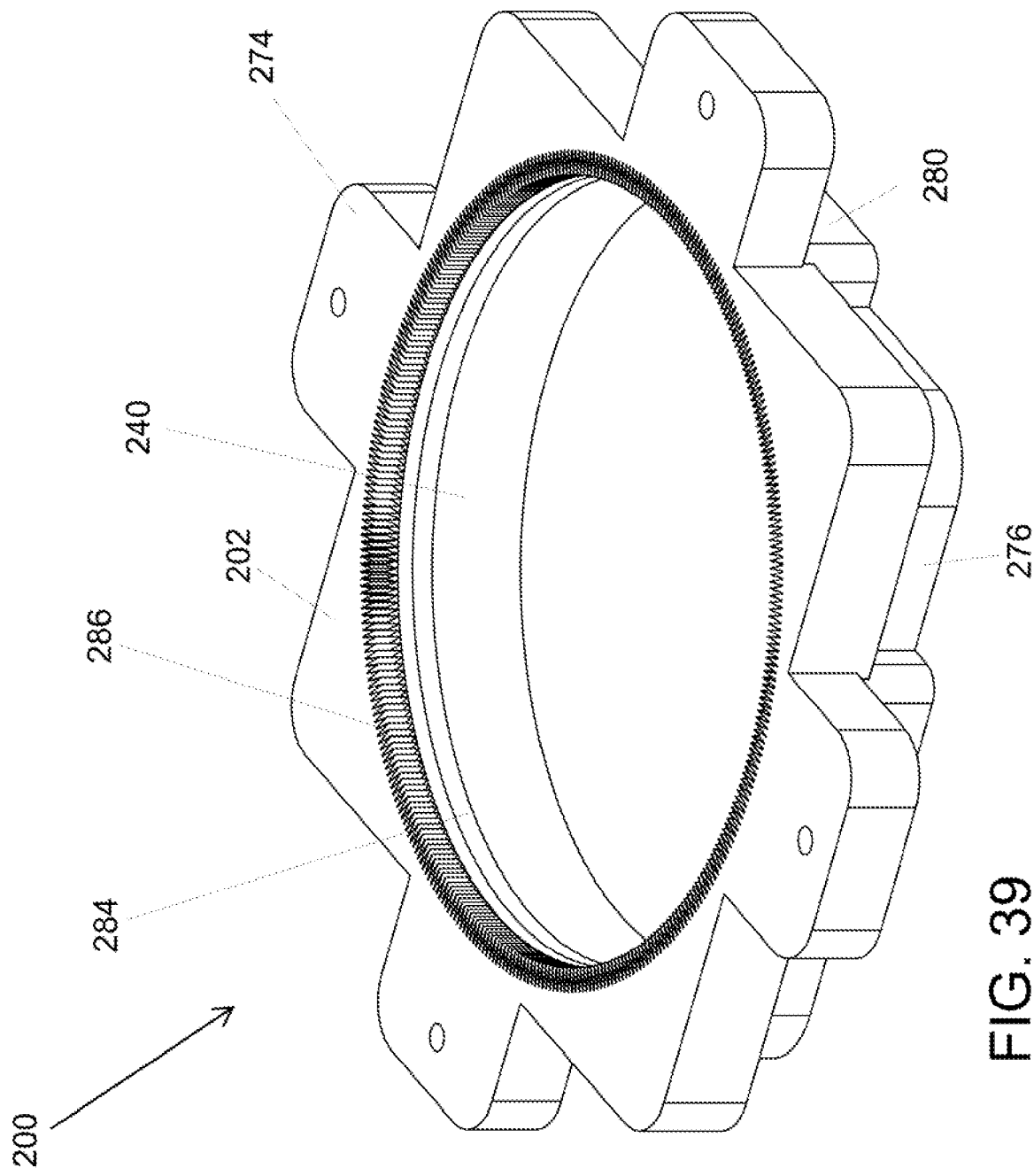
FIG. 39 is a top perspective view of an embodiment of an inset in accordance with aspects of the invention.
Figure 40:
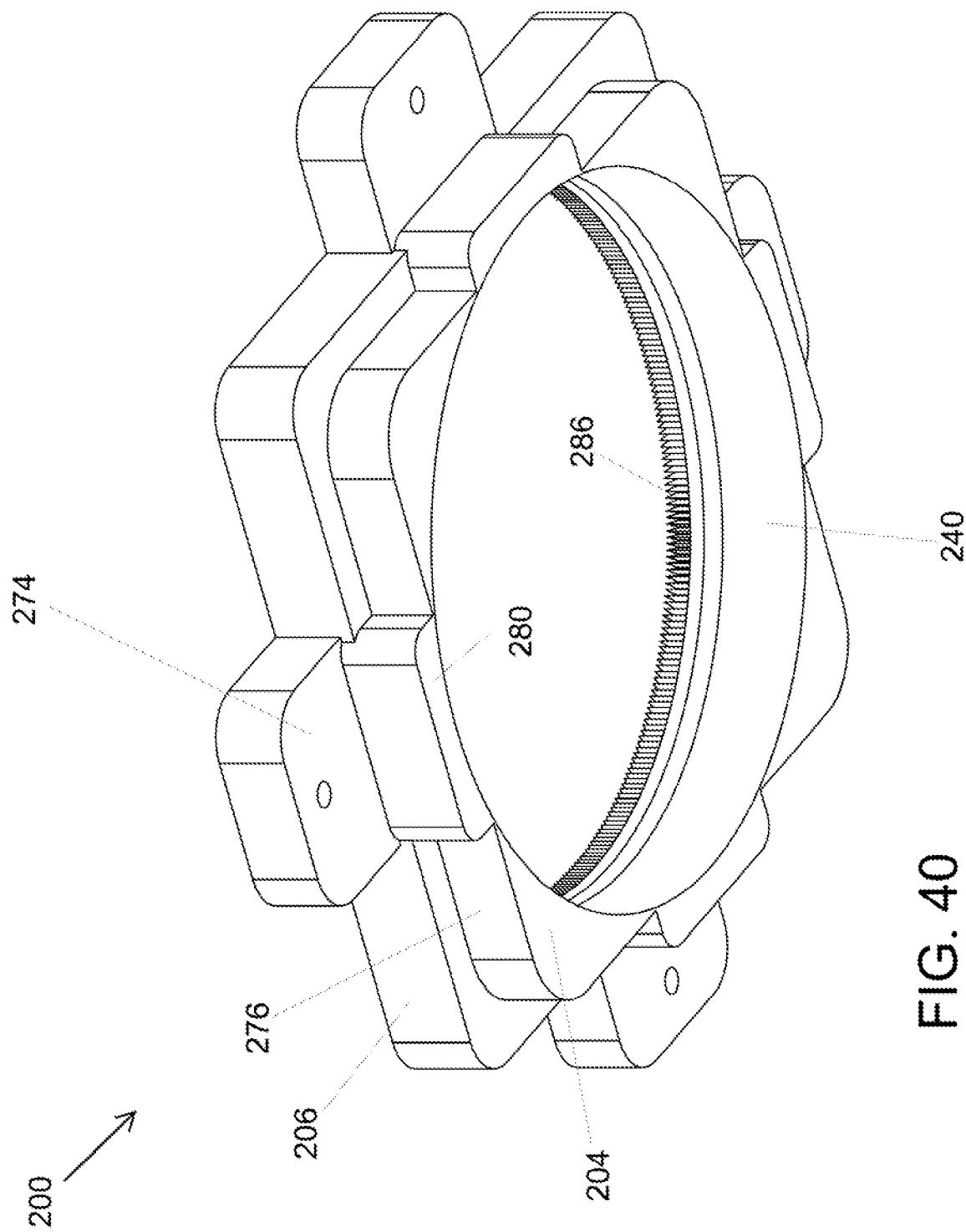
FIG. 40 is a bottom perspective view of an embodiment of an inset in accordance with aspects of the invention.
Figure 41:
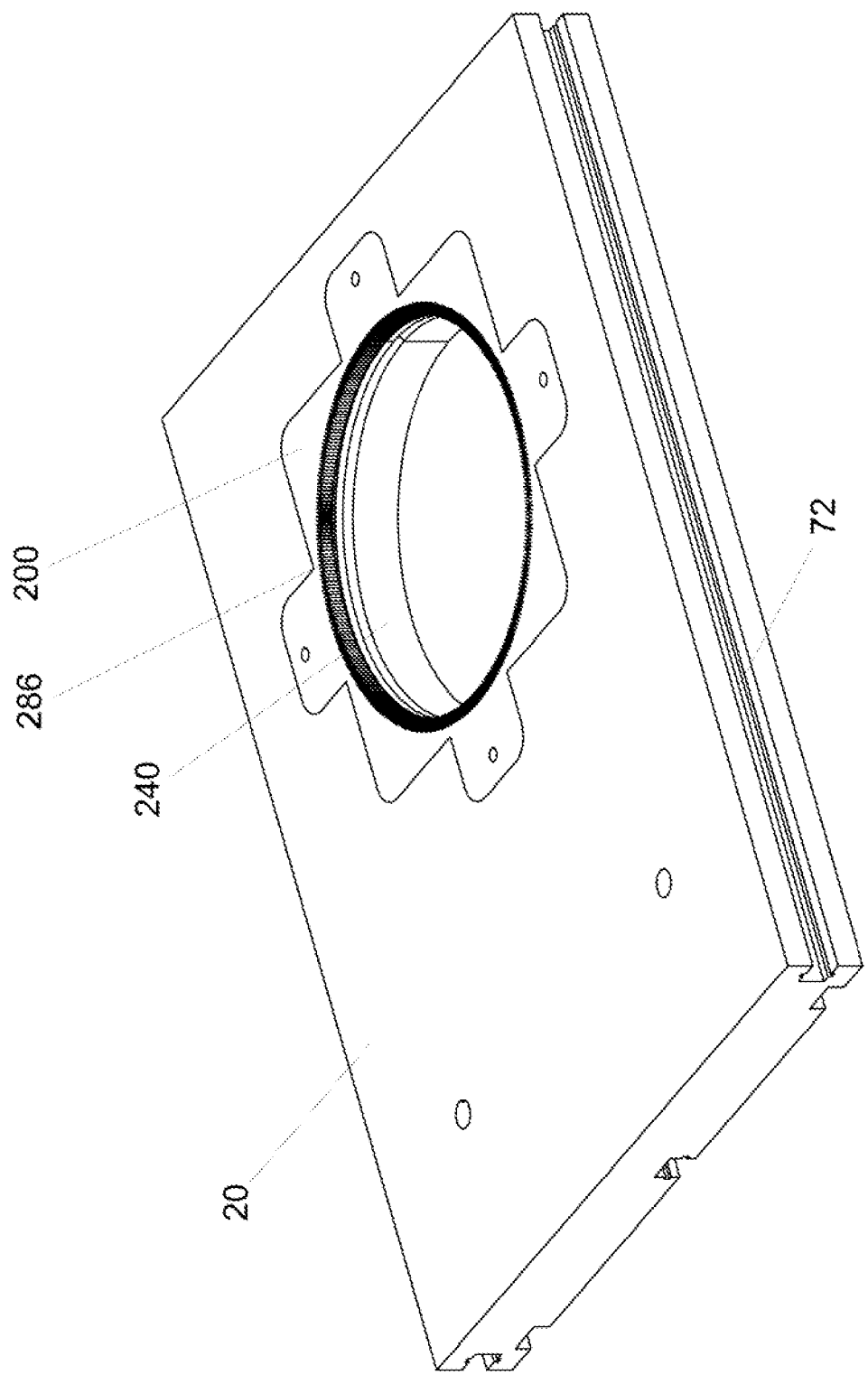
FIG. 41 is a top perspective view of an embodiment of a top plate in combination with an embodiment of an inset in accordance with aspects of the invention.
Figure 42:
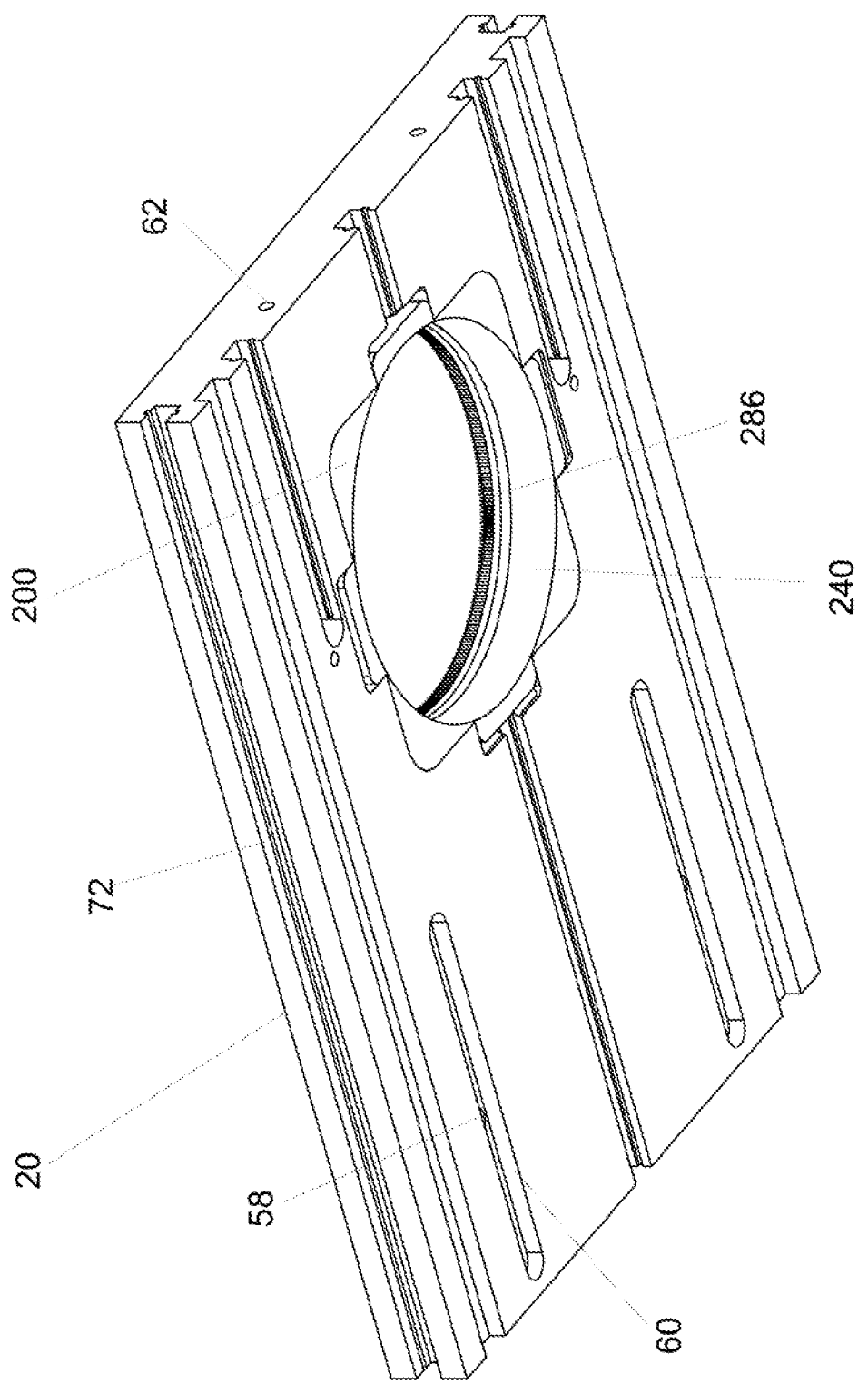
FIG. 42 is a bottom perspective view of an embodiment of a top plate in combination with an inset in accordance with aspects of the invention.

With reference to FIGS. 39-40 this embodiment of insert or inset 200 may be used in multiple 90 degree orientations and is adapted to receive a variety of removeable templates. The inset 200 includes top surface 202, bottom surface 204, and sides and ends extending between the top and bottom surface 202 and 204. Side 206 includes a tab 274 extending outward from the sidewall and is adapted to engage alignment pocket 42. The other side and ends likewise have tabs extending from the sidewalls for engagement with the alignment pocket. A subpocket sidewall is 276 is adapted for insertion into pocket inset pocket 40 and includes subpocket tabs 280 for aligning engagement in recess pockets 46. Extending through the inset 200 is a guide bushing router channel or adapter cavity 240. The sidewall of cavity 240 includes a template ledge 284 (on which removeable templates rest) and a rotational alignment member 286 that is formed in the sidewall of the cavity all the way around the cavity. As illustrated in FIGS. 41 and 42, the inset 200 drops into inset pocket 40 of the top plate 20 and the tabs 274 engage the alignment pockets 42 in multiple 90 degree orientations.

Figure 43:
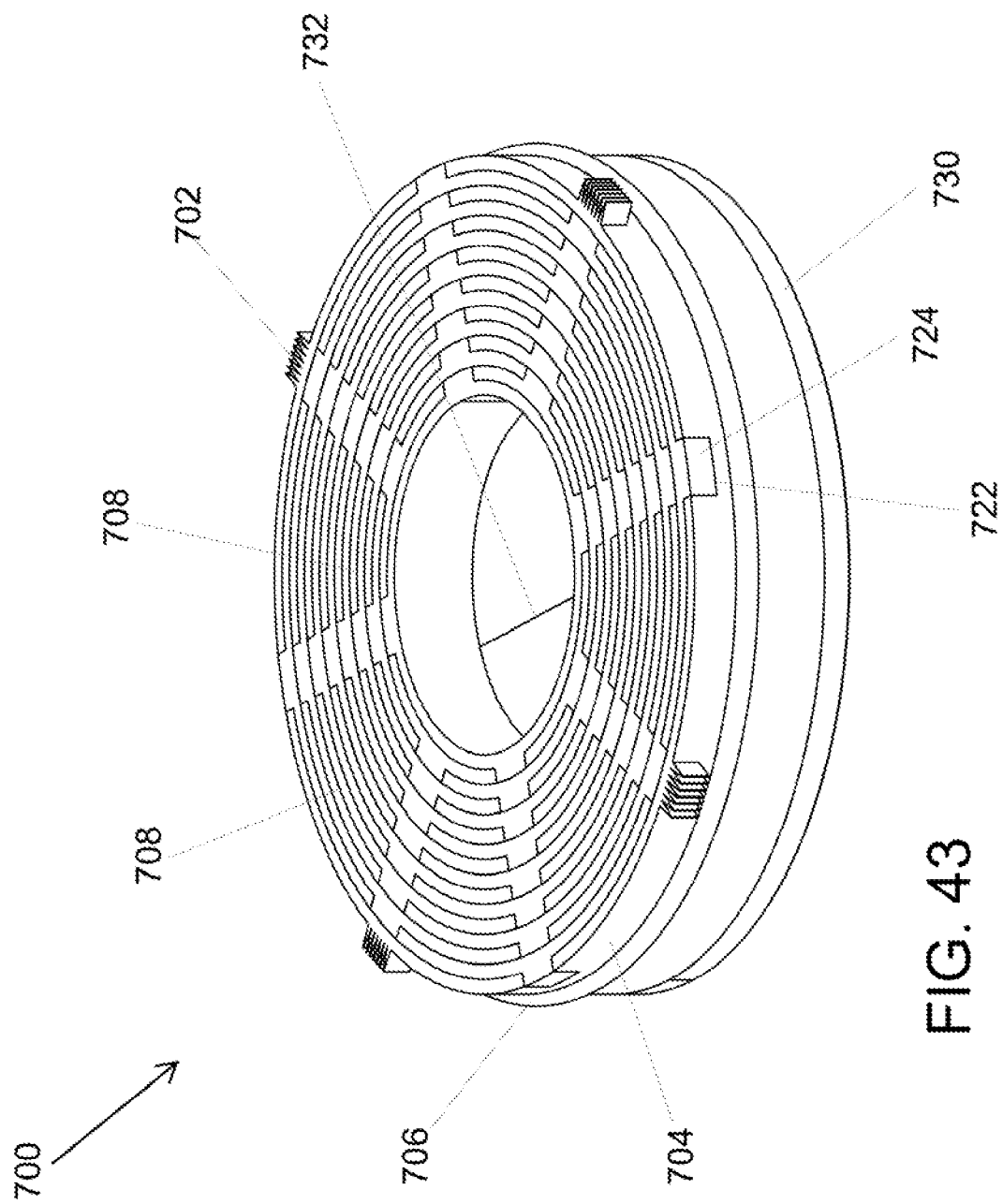
FIG. 43 is a top perspective view of an embodiment of removeable boring templates in accordance with aspects of the invention.
Figure 44:
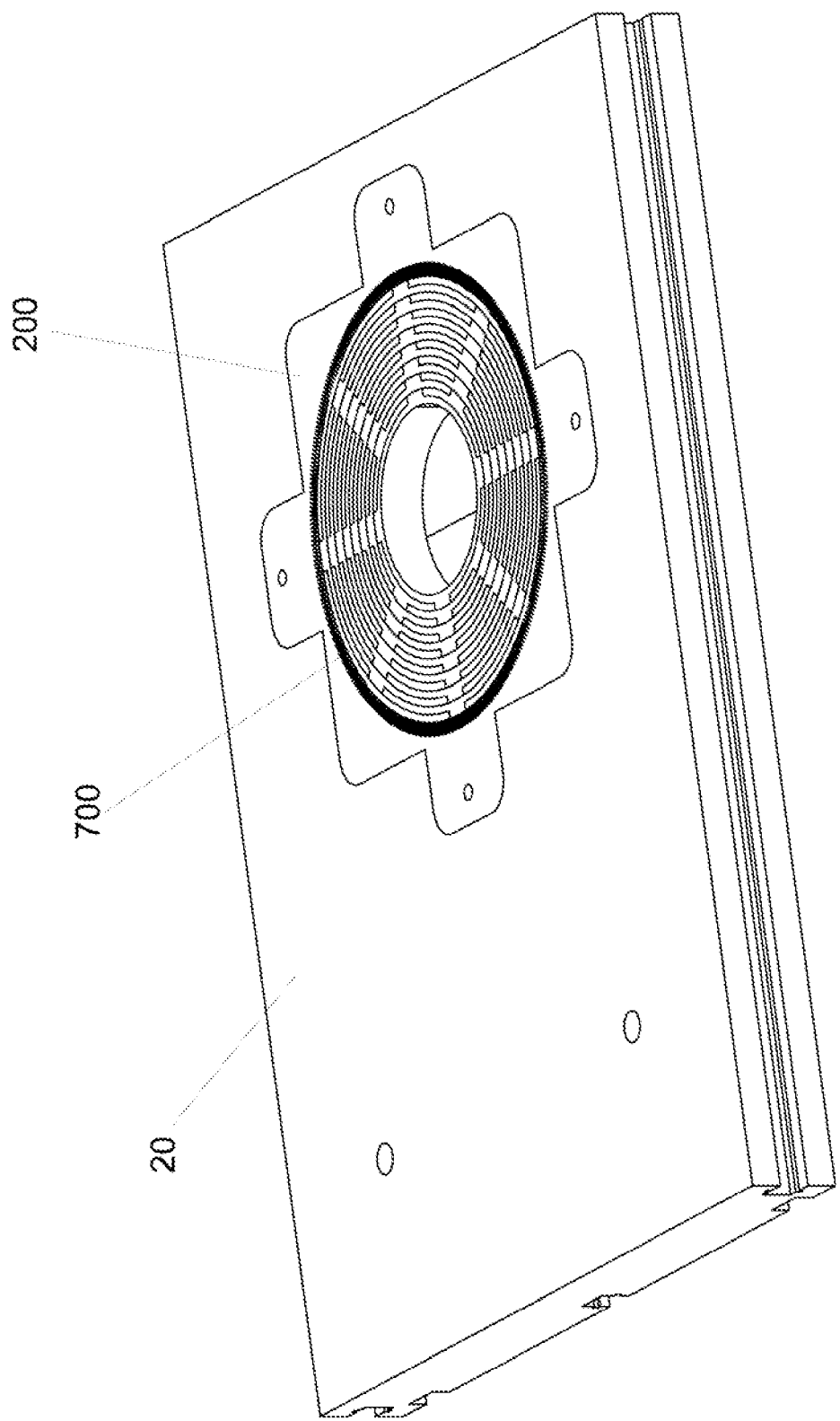
FIG. 44 is a top perspective view of an embodiment of a top plate in combination with an embodiment of an inset and removeable boring templates in accordance with aspects of the invention.
Figure 45:
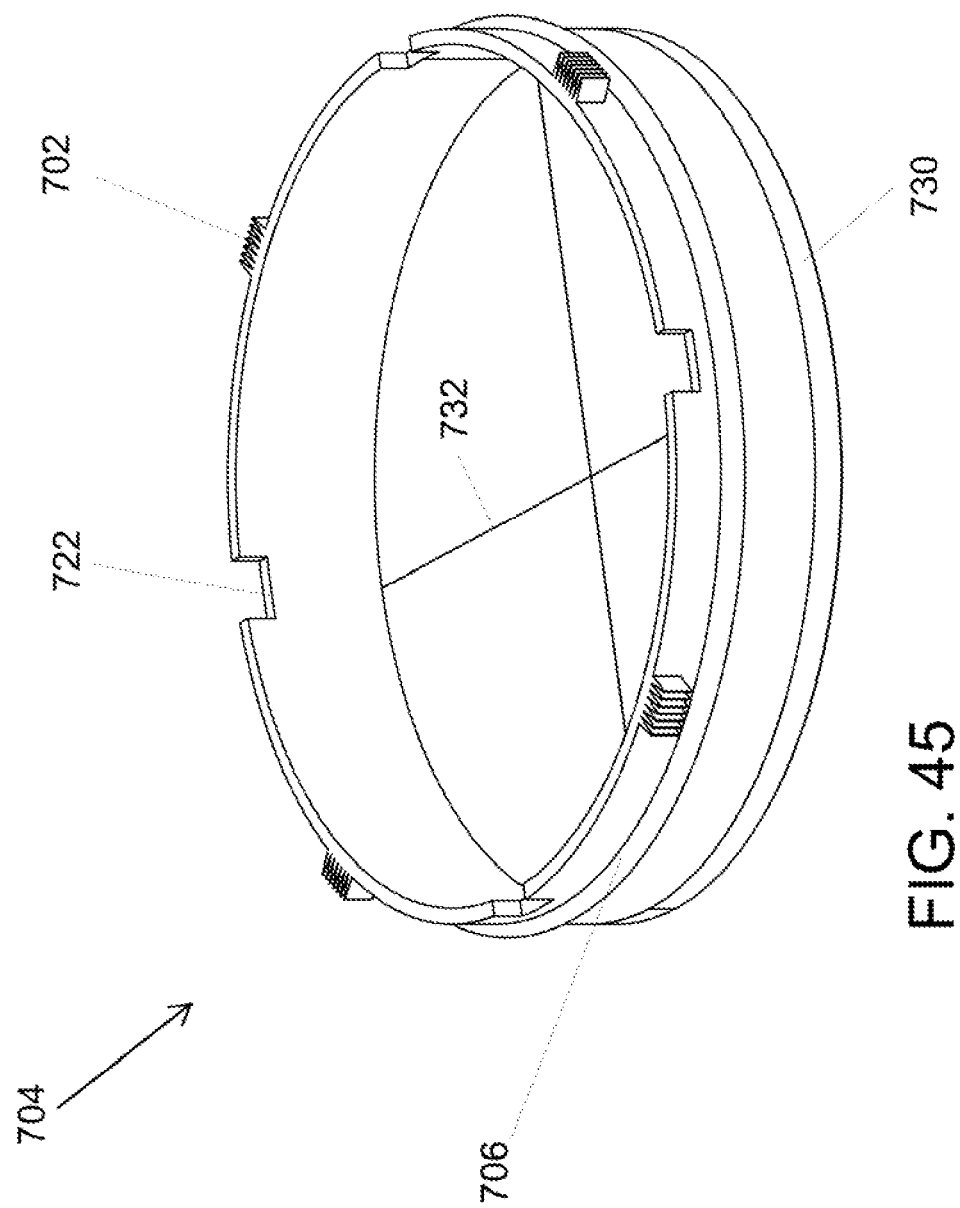
FIG. 45 is a top perspective view of an embodiment of an outer ring of a removeable boring template in accordance with aspects of the invention.
Figure 46:
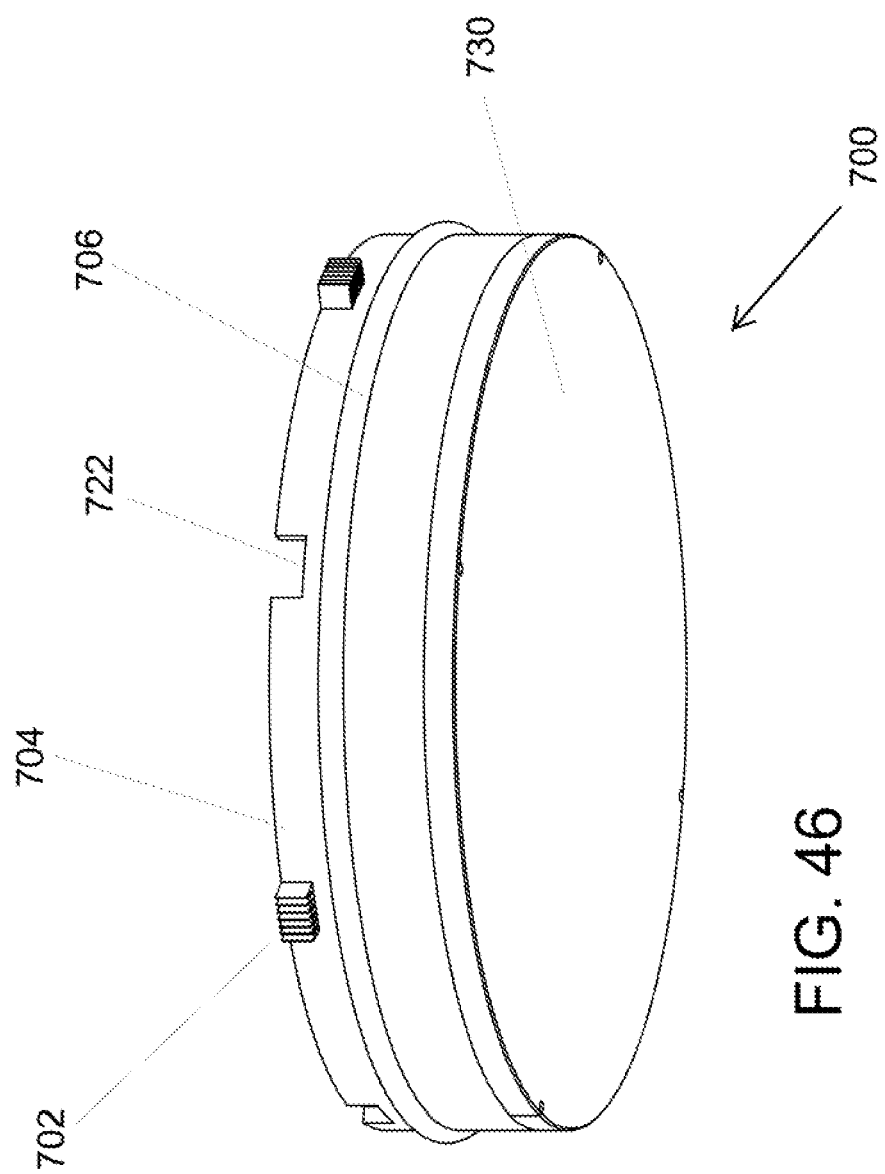
FIG. 46 is a bottom perspective view of an embodiment of an outer ring of a removeable boring template in accordance with aspects of the invention.
Figure 47:
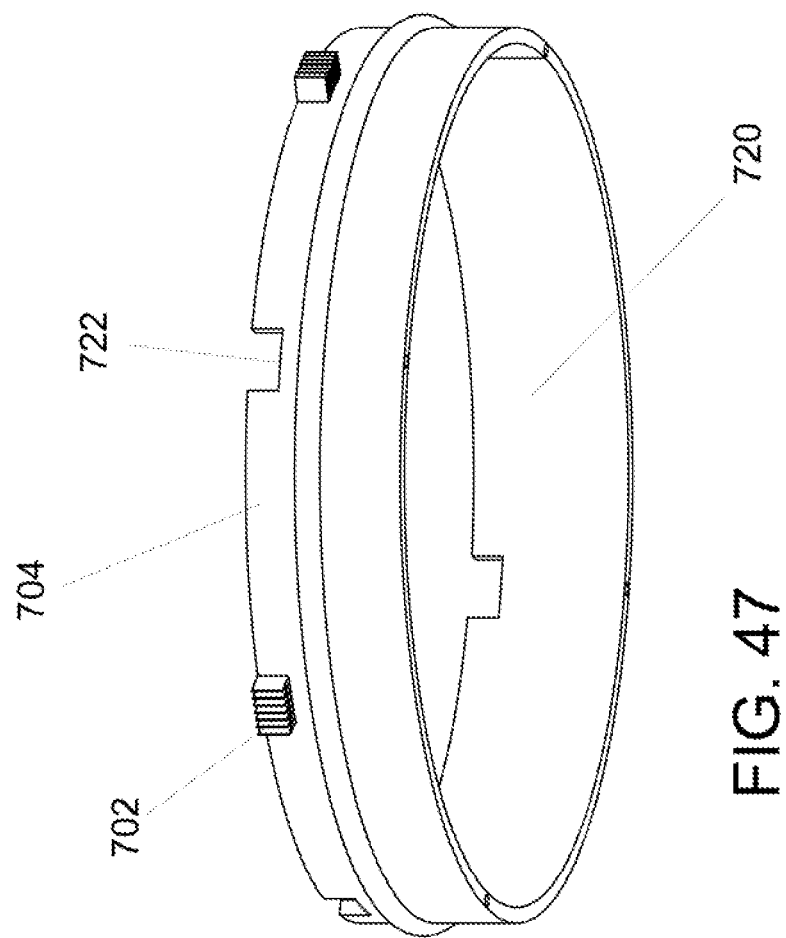
FIG. 47 is a bottom perspective view of an embodiment of an outer ring of a removeable boring template in accordance with aspects of the invention and shown having bottom alignment plate removed.
Figure 48:
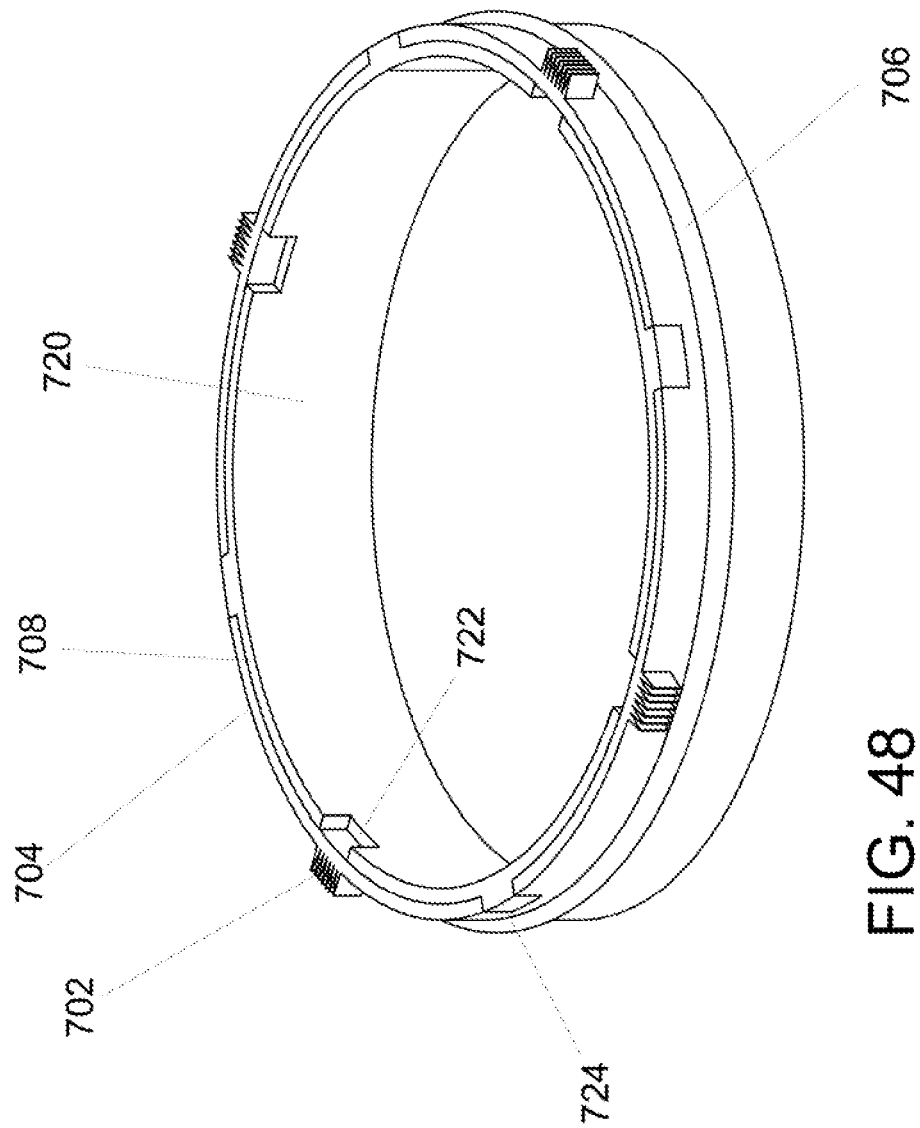
FIG. 48 is a top perspective view of an embodiment of an outer ring and one mating inner ring of a removeable boring template in accordance with aspects of the invention.
Figure 49:
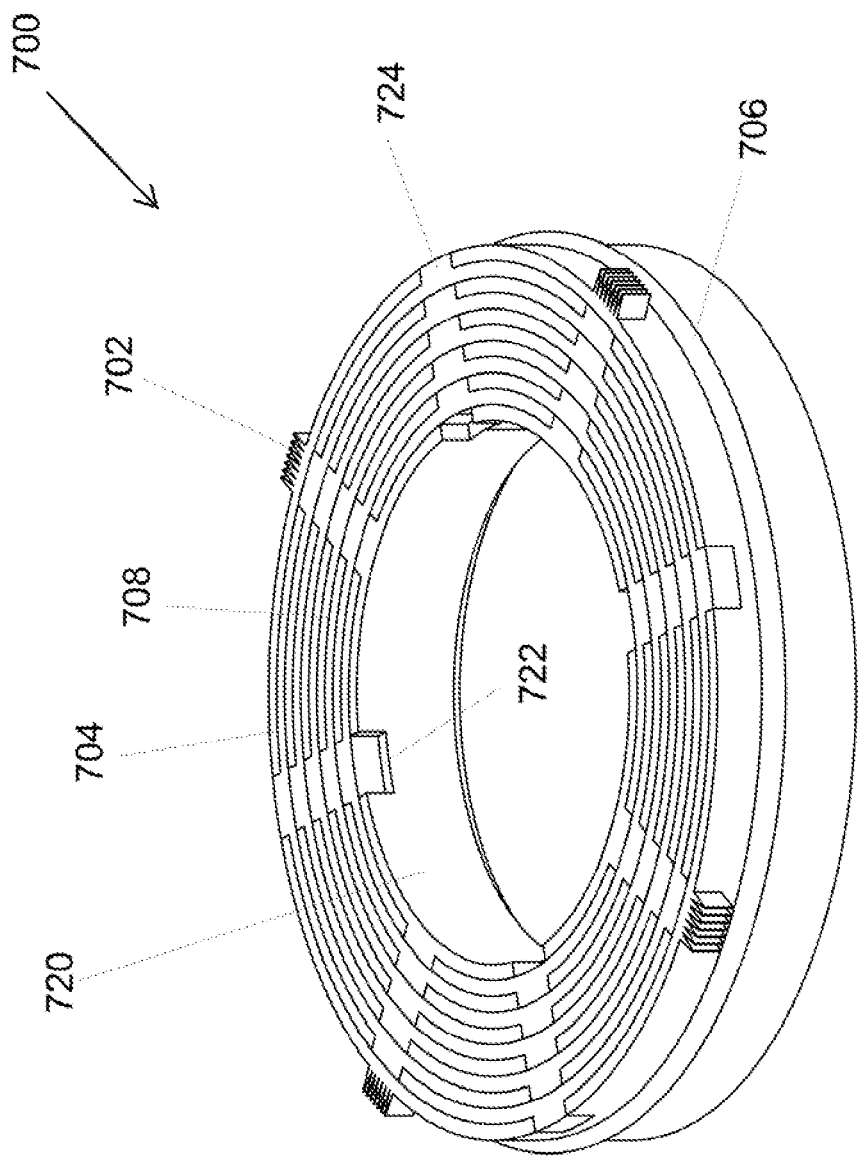
FIG. 49 is a top perspective view of an embodiment of an outer ring and ten mating inner rings of a removeable boring template in accordance with aspects of the invention.
Figure 50:
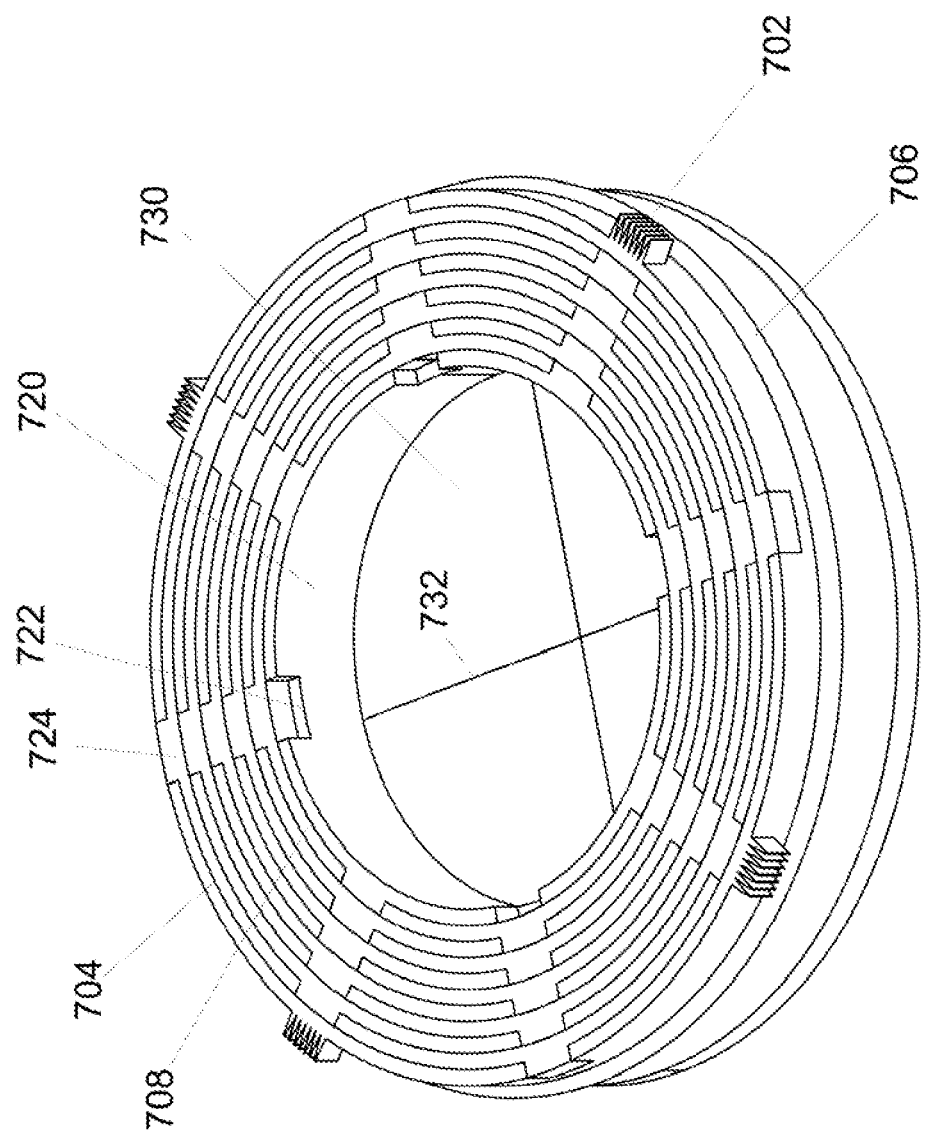
FIG. 50 is a top perspective view of an embodiment of an outer ring and one mating inner ring of a removeable boring template in accordance with aspects of the invention and shown having a bottom alignment plate.

FIG. 43 illustrates an embodiment of a removeable boring template 700. The boring template 700 has an outer ring 704 that includes an outer annular lip the engages with the template ledge 284 of inset 200. As illustrated in FIG. 44 the outer ring has an alignment segment that engages the rotation alignment member 286 formed in the cavity 240 of the inset 200. With reference to FIGS. 45-50, the outer ring includes spaced apart grooves 722 extending into the ring from a top surface of the ring. Additional mating rings 708 of varying diameters include spaced apart rooves 722 and flanges 724 that allow the multiple rings 708 to interlock together. A user may remove one or more rings to attain the desired boring diameter when the guide bushing of the router engages the guide bushing router aperture or inner sidewall 720 of the inner most ring. The boring template 700 includes a removeable alignment template 730 that has alignment markings 732 that are visible through the guide bushing router aperture 720. The orientation of the alignment markings may be varied through 360 degrees by rotating and interlocking the alignment segment 702 to the rotational alignment member 286 of the inset 200 through 360 degrees.

Figure 51:
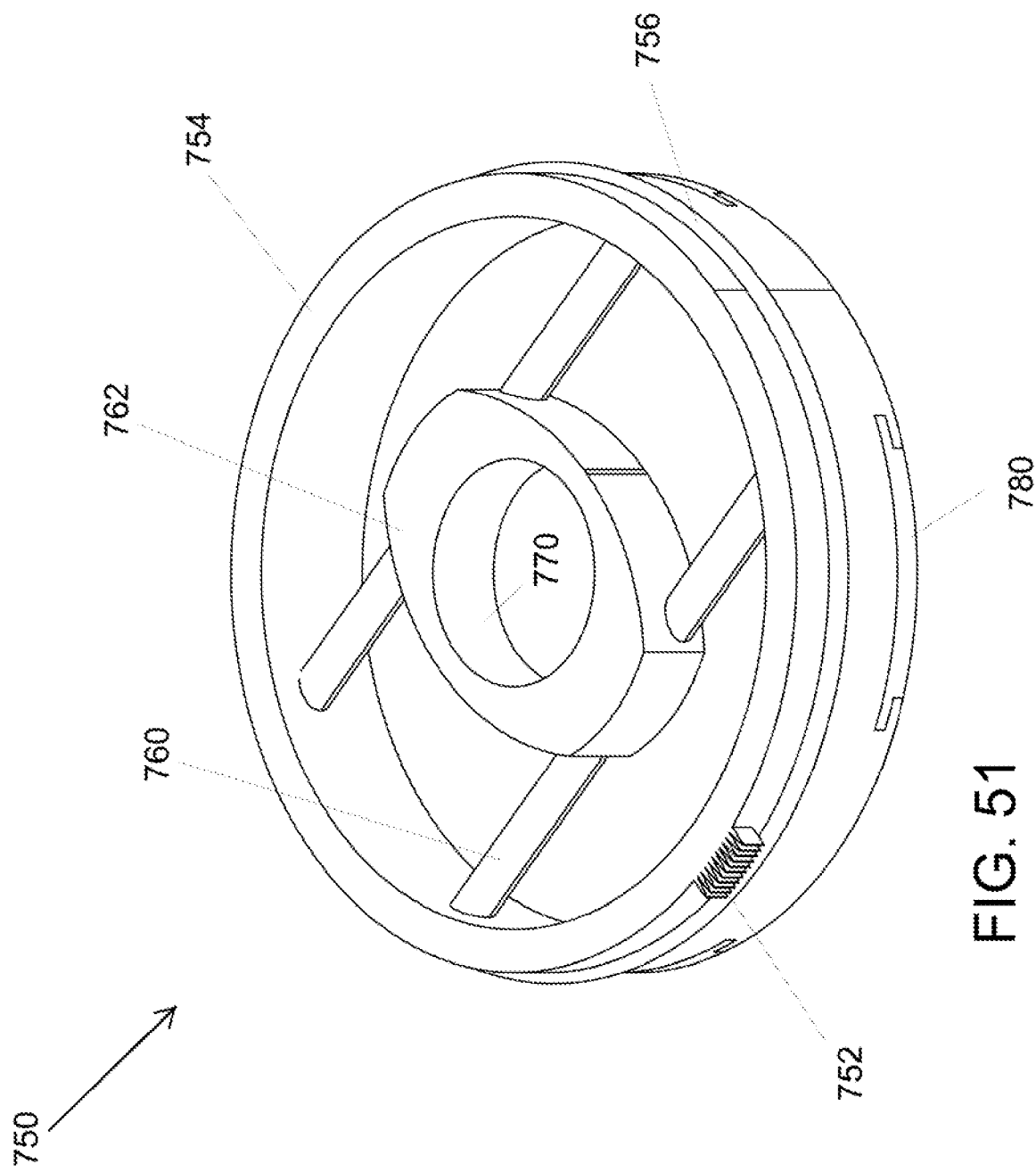
FIG. 51 is a top perspective view of an embodiment of removeable slot templates in accordance with aspects of the invention.
Figure 52:
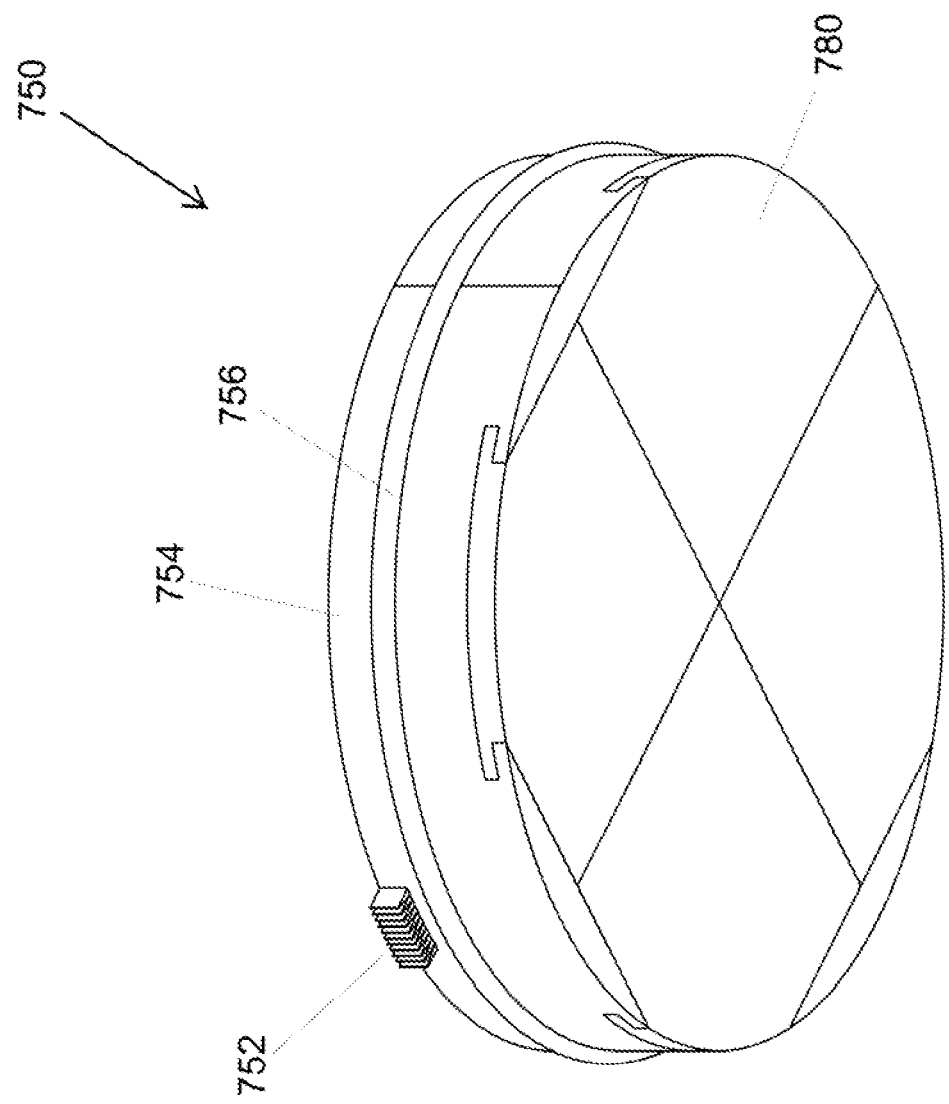
FIG. 52 is a bottom perspective view of an embodiment of removeable slot templates in accordance with aspects of the invention.
Figure 53:
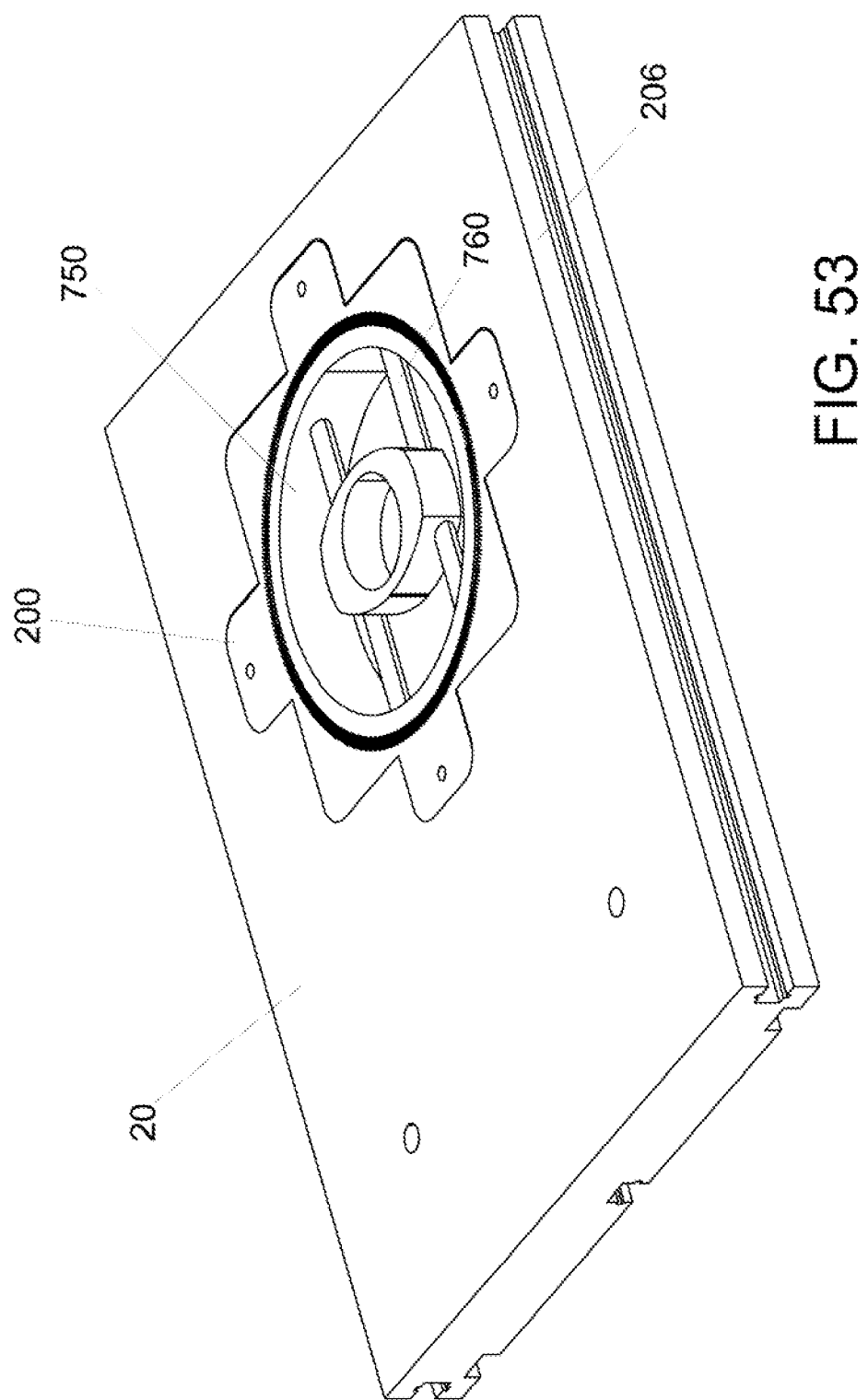
FIG. 53 is a top perspective view of an embodiment of a top plate in combination with an embodiment of an inset and removeable slot template in accordance with aspects of the invention and showing having the slot template aligned relative to the sides of the top plate.
Figure 54:
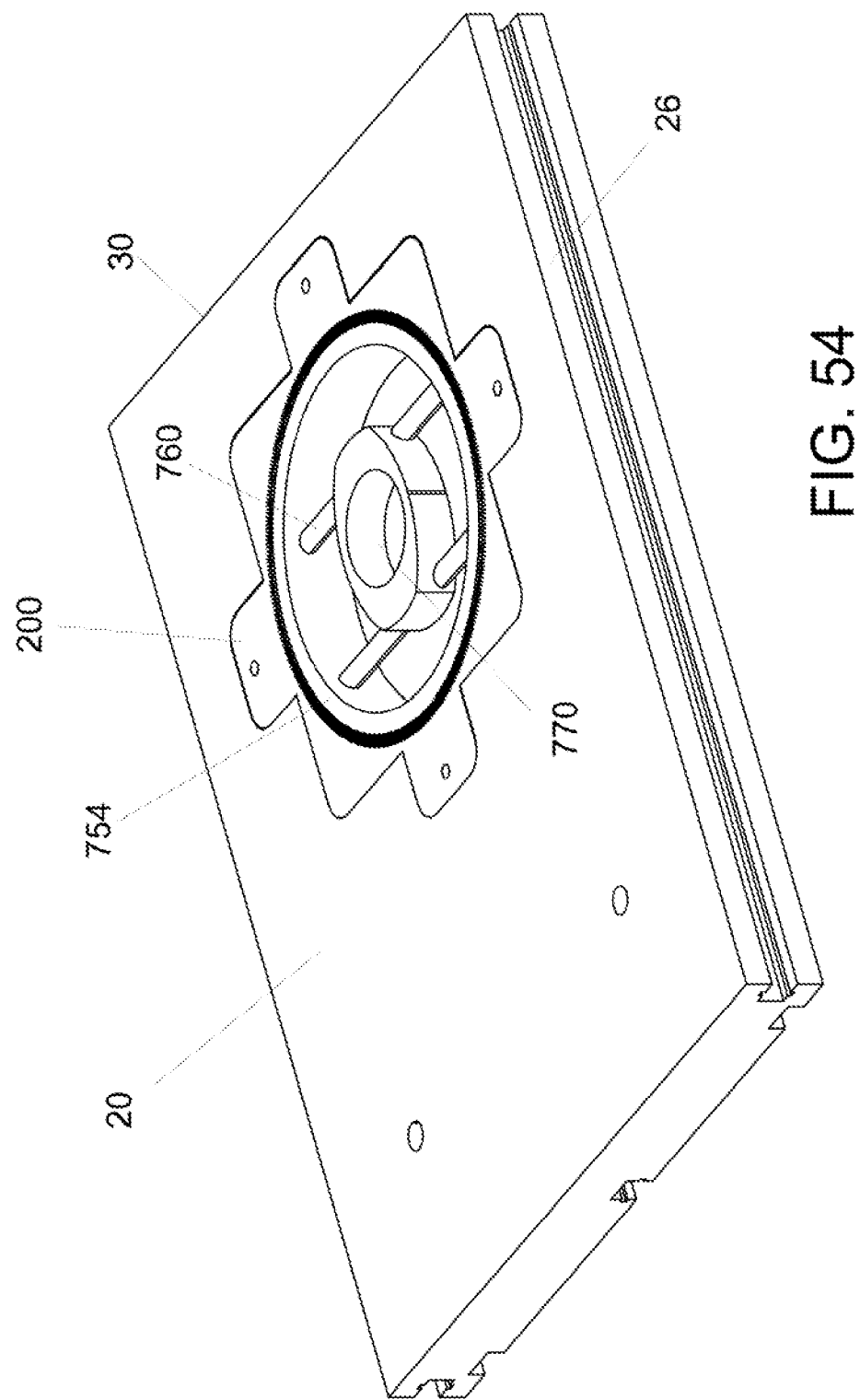
FIG. 54 is a top perspective view of an embodiment of a top plate in combination with an embodiment of an inset and removeable slot template in accordance with aspects of the invention and showing having the slot template aligned relative to the end of the top plate.

FIGS. 51-52 illustrates a removeable slot template 750 that similarly includes an alignment segment 752, outer ring 754 and annular lip 756. As illustrated in FIGS. 53-54 the slot template 750 interlocks with inset 200 that is interlocked in top plate 20. The slot template 750 includes slide rails 760 onto which a guide member 762 is engaged and slides. The guide bushing member includes and aperture 770 extending therethrough that is adapted for engagement with a router guide bushing. In use, the router may be guided about aperture 770 to cut a bore in the workpiece and the guide member 762 may be slid along the rails 760 to cut an oblong bore or slot into the workpiece. The slot template 750 may also include a removable alignment bottom 780 with markings to assist the user in aligning the slot as desired on the workpiece. The slot template 750 may be disengaged from the inset 200 and rotated through any of a desired 360 degrees and then re-engaged such that the orientation of the length axis of slide rails may be adjusted relative to a length axis of the top plate 20. In this manner a length axis of a slot may be cut into a workpiece at any of 360 degrees relative to a length axis of the top plate (including a parallel alignment or perpendicular alignment as illustrated in FIGS. 53-54).

Figure 55:
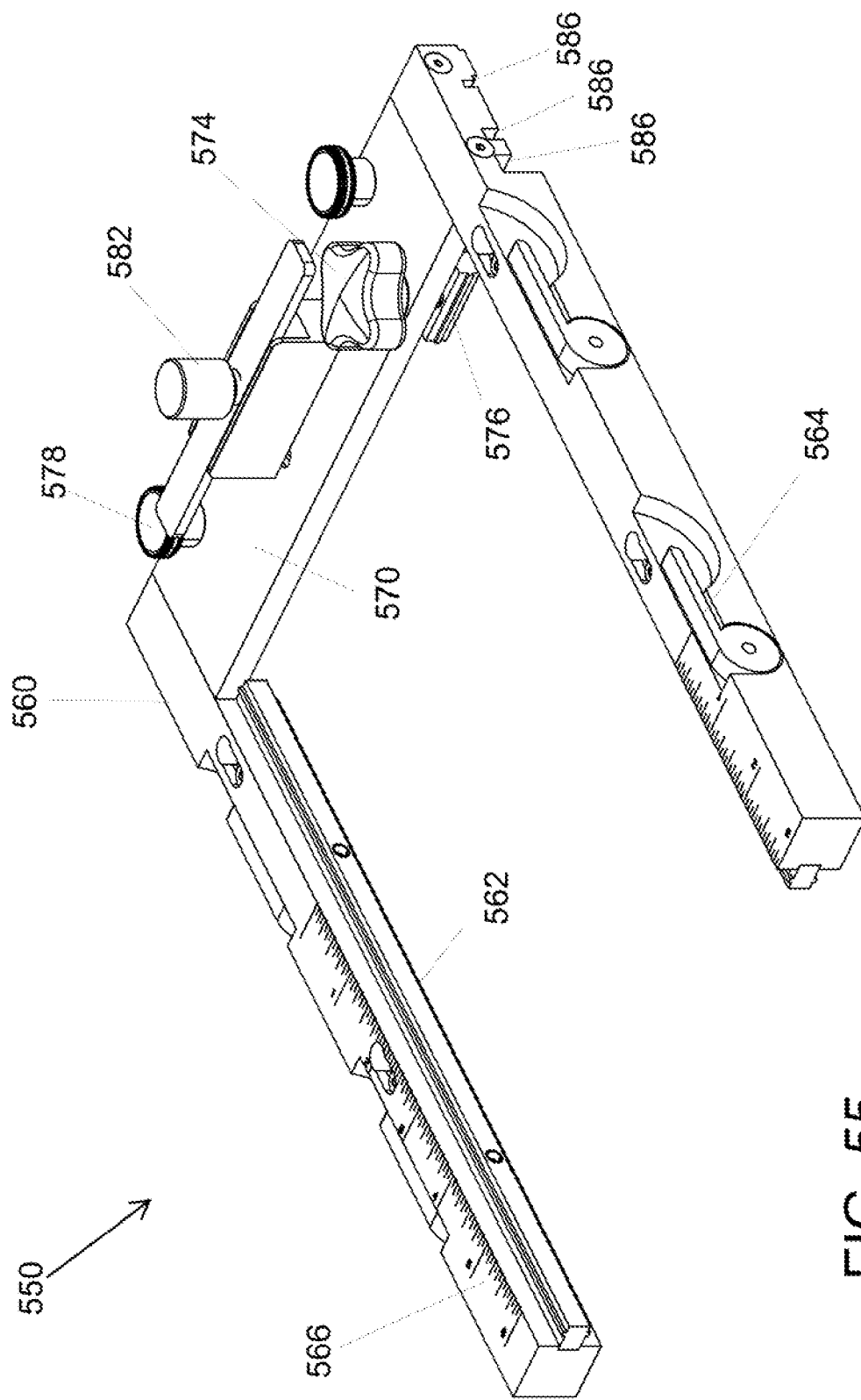
FIG. 55 is a top perspective view of an embodiment of a guide fence adapter in accordance with aspects of the invention.
Figure 56:
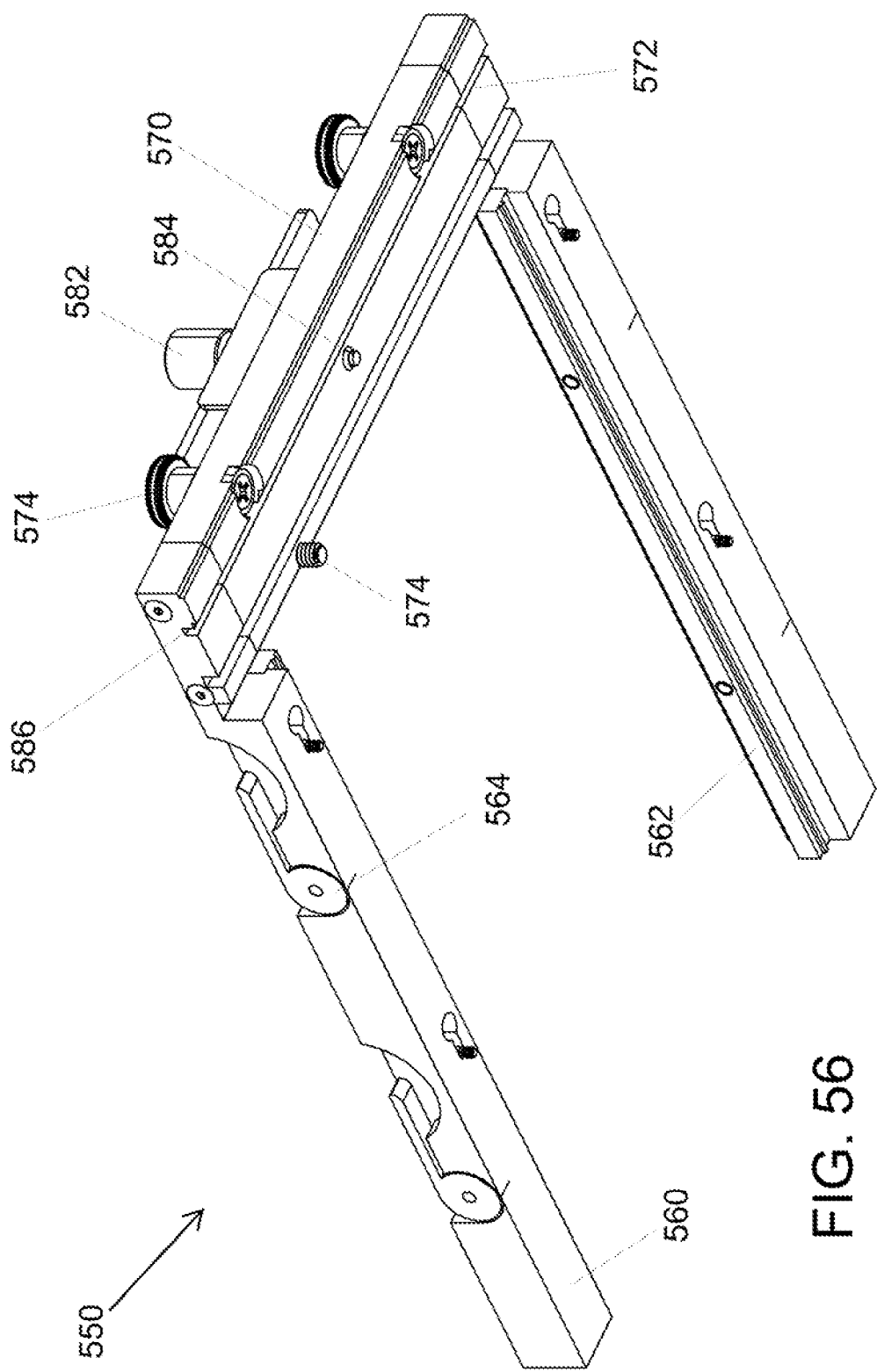
FIG. 56 is a bottom perspective view of an embodiment of a guide fence adapter in accordance with aspects of the invention.
Figure 57:
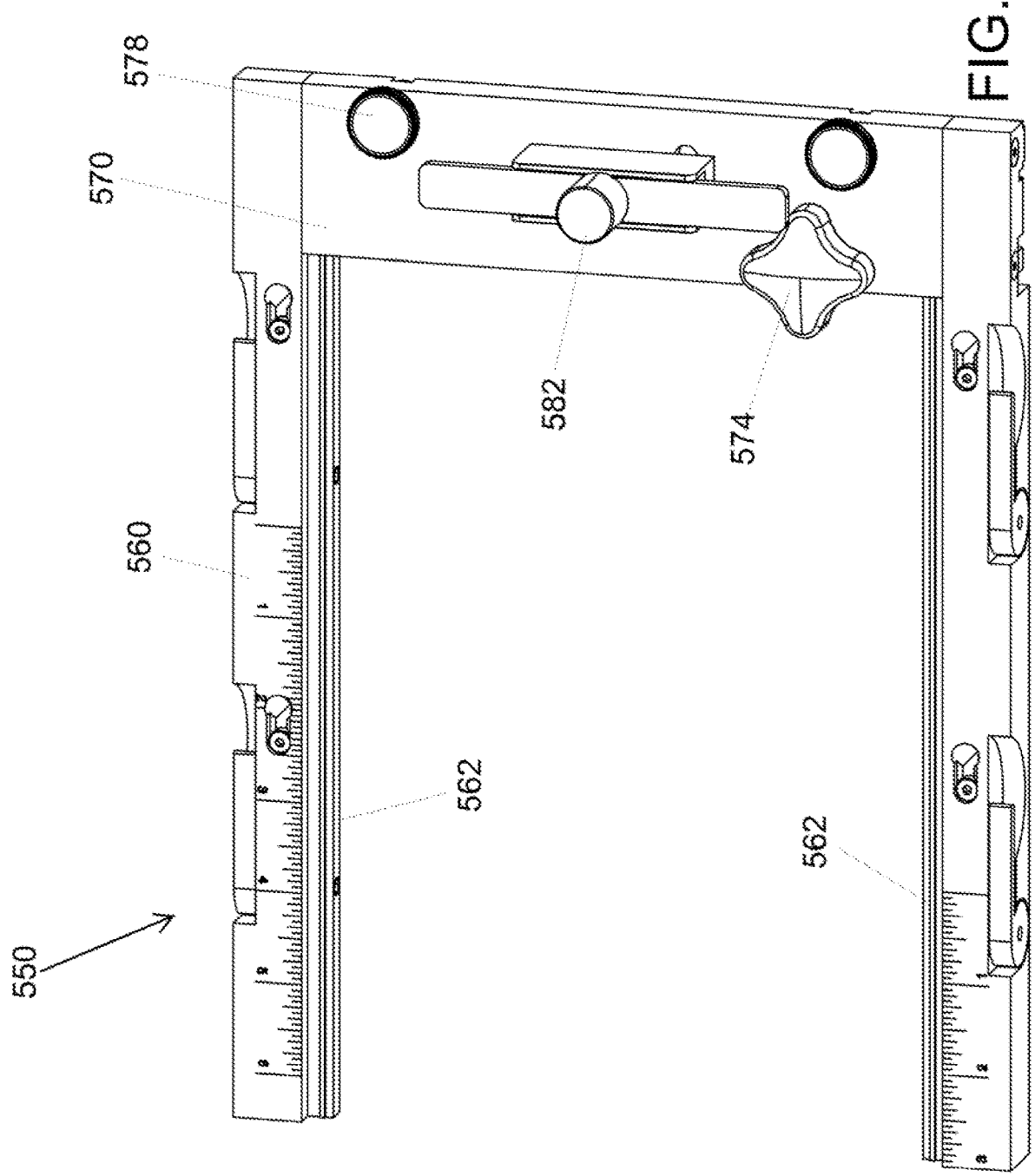
FIG. 57 is a top end perspective view of an embodiment of a guide fence adapter in accordance with aspects of the invention.
Figure 58:
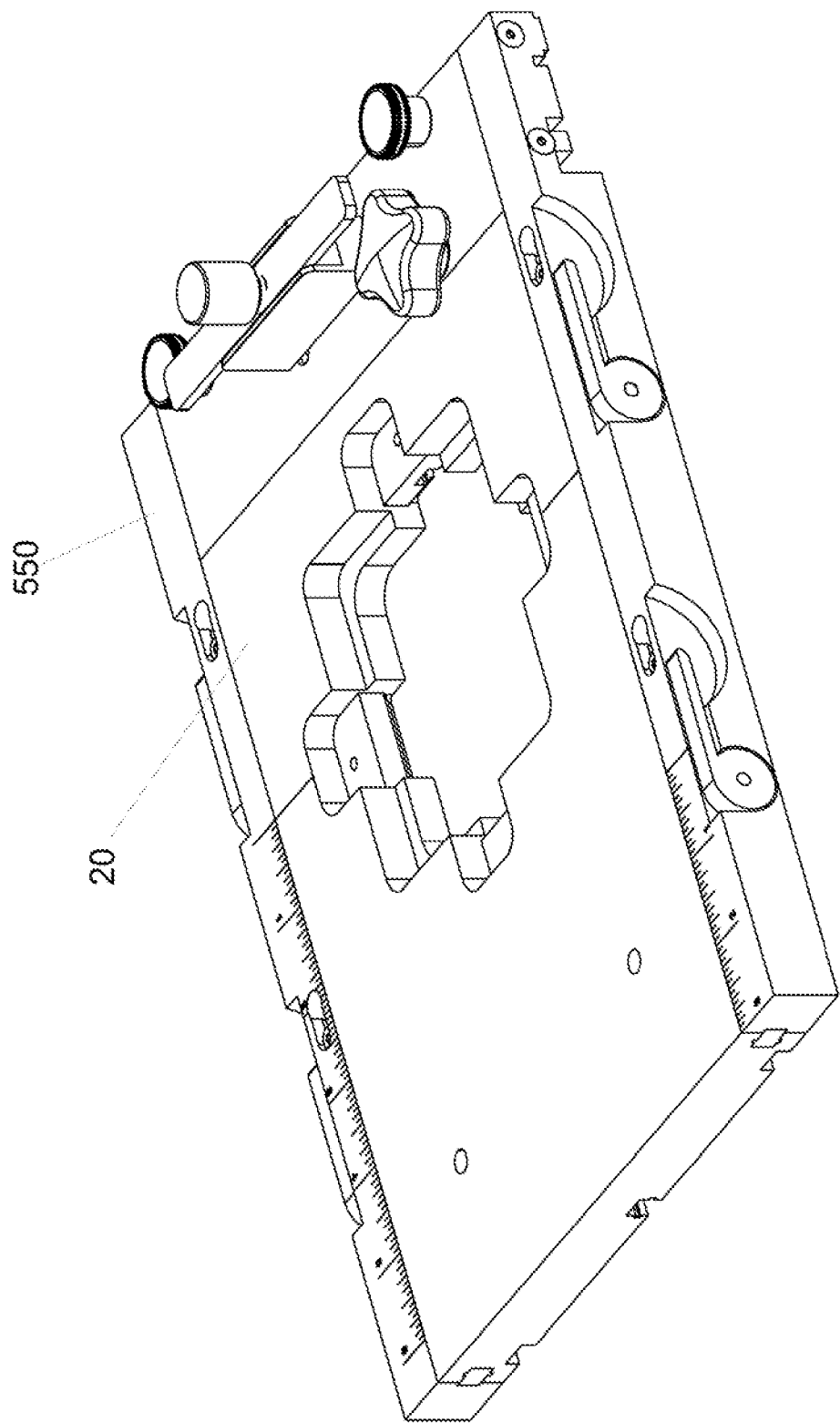
FIG. 58 is a top perspective view of an embodiment of a top plate engaged with an embodiment of the guide fence adapter in accordance with aspects of the invention.
Figure 59:
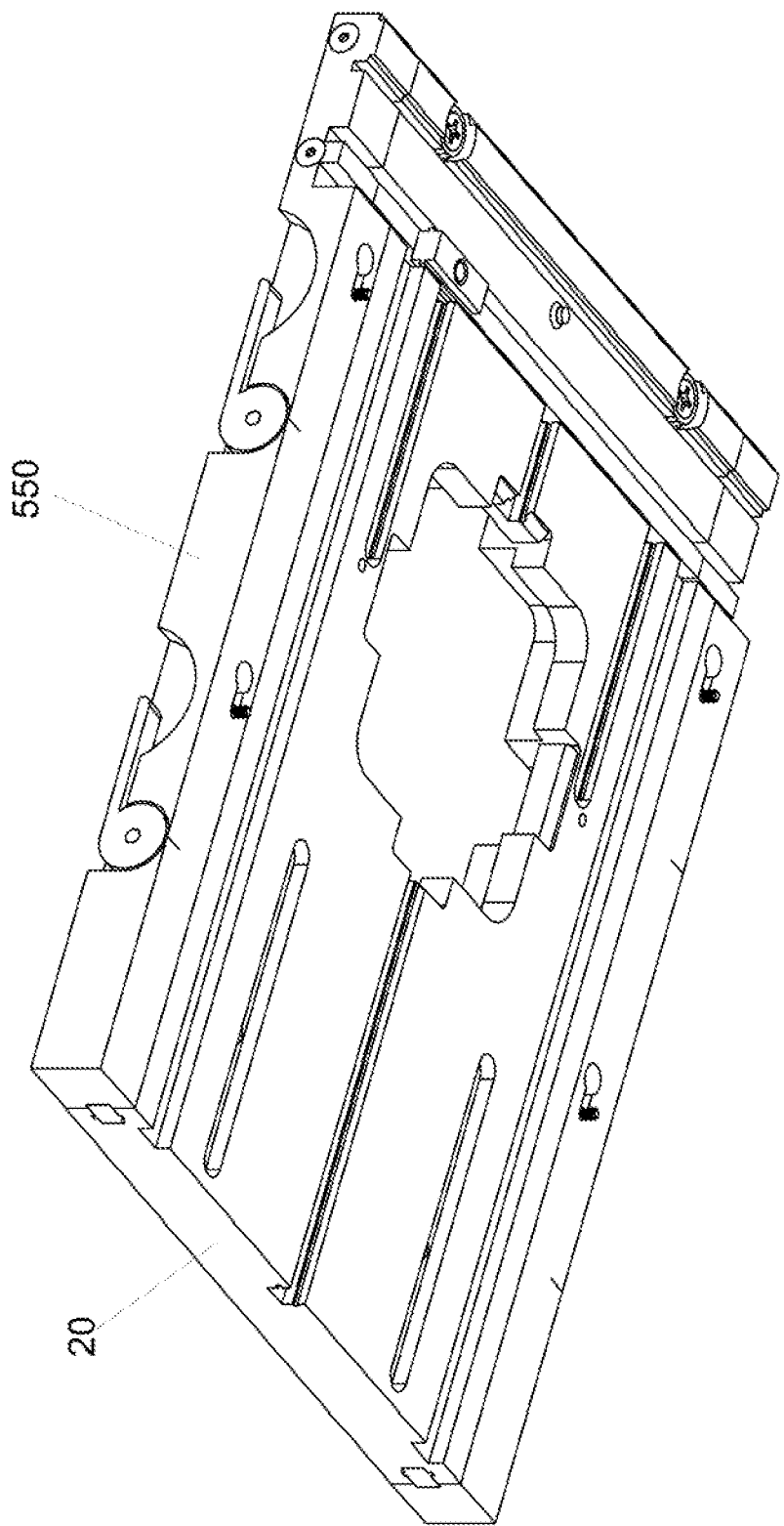
FIG. 59 is a bottom perspective view of an embodiment of a top plate engaged with an embodiment of the guide fence adapter in accordance with aspects of the invention.
Figure 60:
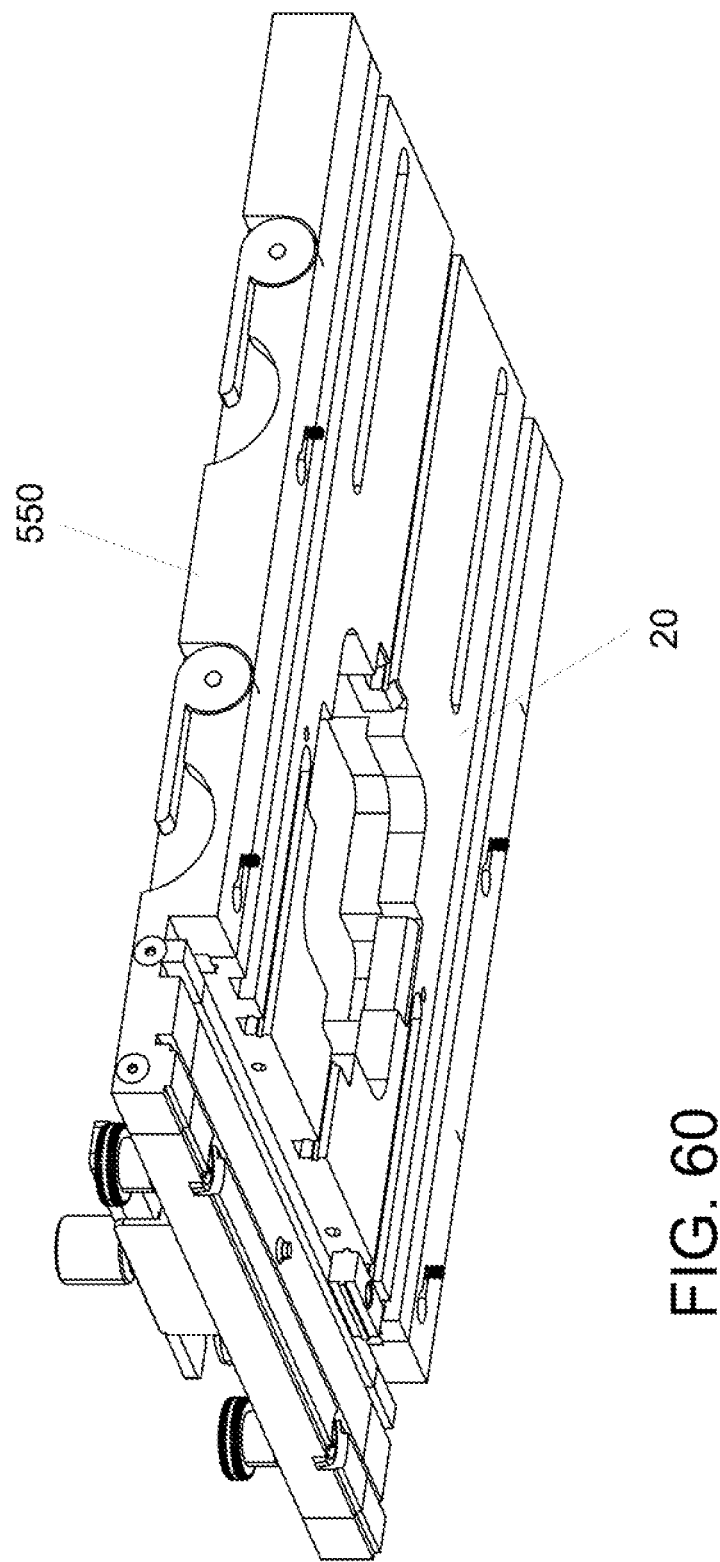
FIG. 60 is a bottom front end perspective view of an embodiment of a top plate engaged with an embodiment of the guide fence adapter in accordance with aspects of the invention.
Figure 61:
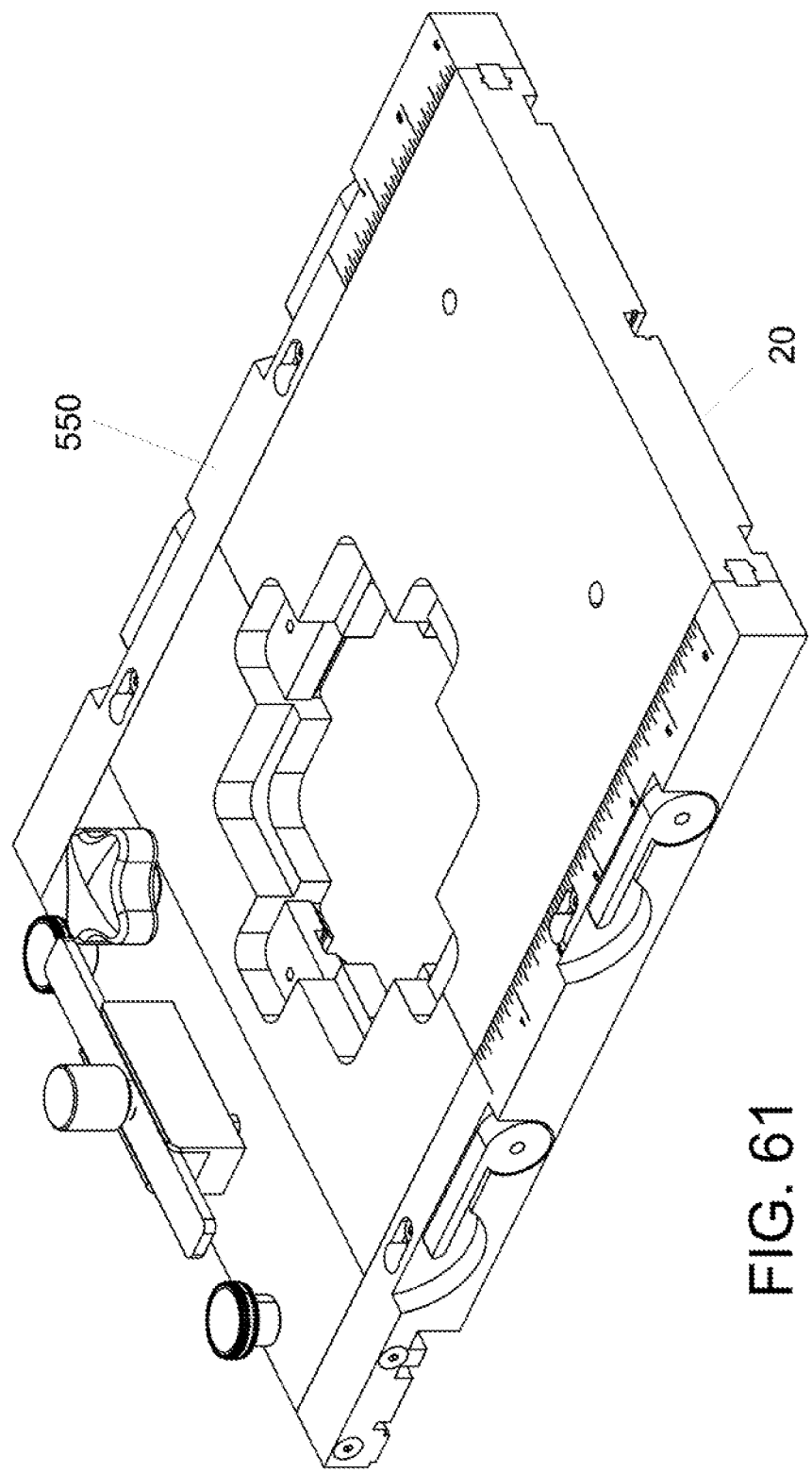
FIG. 61 is a top back end perspective view of an embodiment of a top plate engaged with an embodiment of the guide fence adapter in accordance with aspects of the invention.

Referring to FIGS. 55-57 a guide fence adapter 550 of the present invention is illustrated. The adapter 550 includes top plate arms 560 and fence 570 interconnecting the arms. The top plate arms 560 include t-rails 562 formed into sides of the arms and are adapted for sliding engagement with the t-slots 72 of the top plate 20. Table locks 564 and scale or ruler 566 are further incorporated into the top plate arms 560. Fence 570 has a bottom 572 and a knob 574 that rotationally engages with a t-rail insert 576 under the bottom 572. The t-rail insert is adapted for engagement with a guide track of known suitable construction. Slots 586 are further formed on the bottom 572 of fence 570 and are suitable for engagement with rails of a guide track. Quick release lever 582 includes a pin 584 extending through fence 570 and out the bottom. The pin may be used to align and engage one of a series of holes formed in the guide track such that shelving holes may be quickly and precisely routed into a workpiece. Additional knobs 578 may be used to tighten the fence to a table or track. The guide fence adapter 550 engages with the top plate 20 as illustrated in FIGS. 58-61. The adapter 550 provides added versatility and options for engaging the top plate 20 to the workpiece, to a table, to a guide track, a bottom plate 100 or other support.

Figure 62:
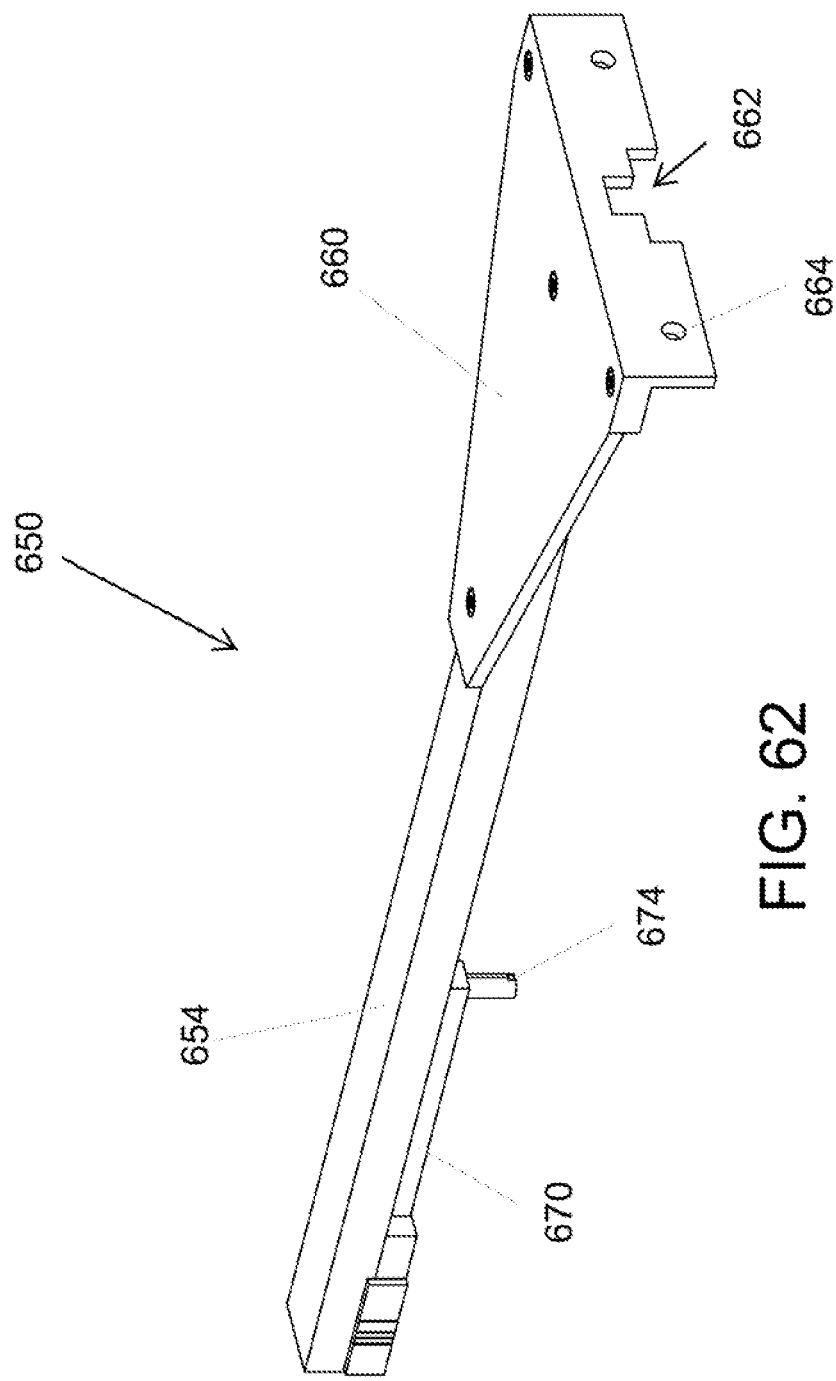
FIG. 62 is a top perspective view of an embodiment of a circle cut adapter in accordance with aspects of the invention.
Figure 63:
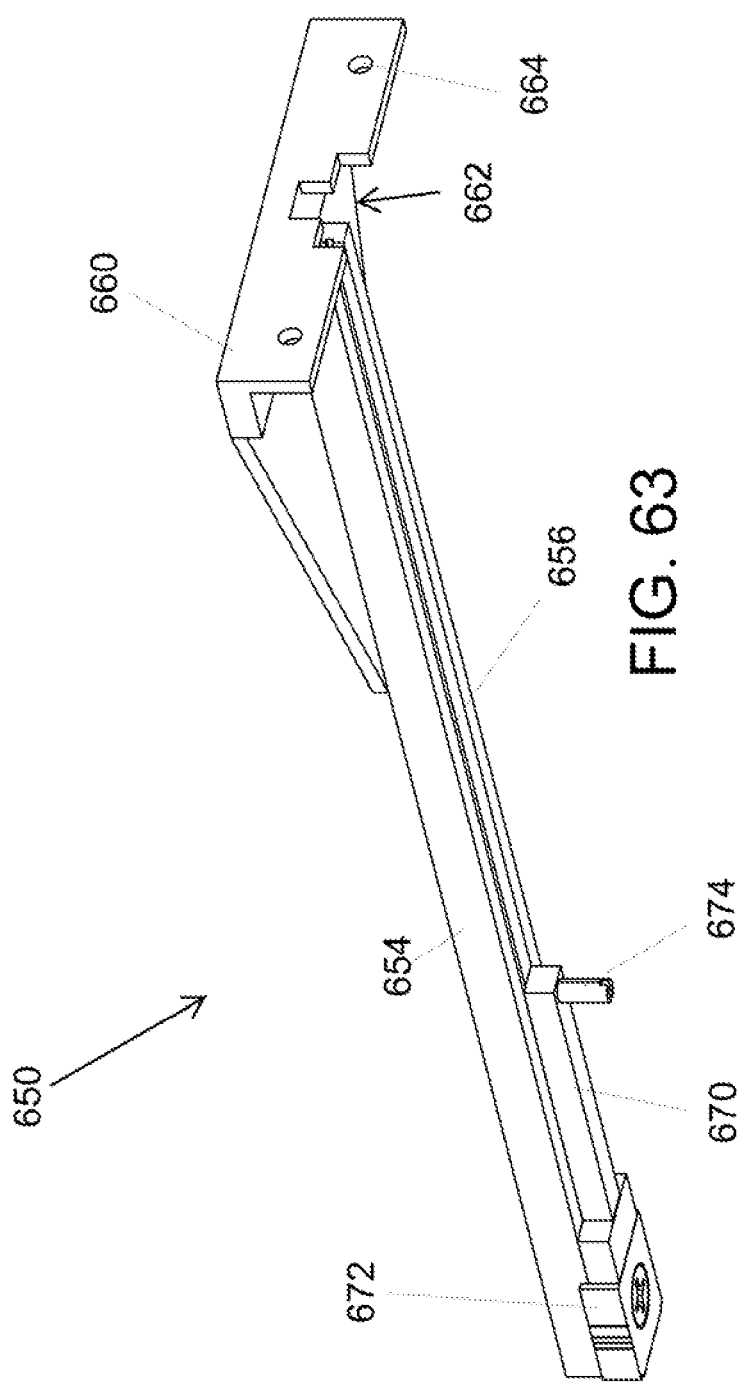
FIG. 63 is a bottom perspective view of an embodiment of a circle cut adapter in accordance with aspects of the invention.
Figure 64:
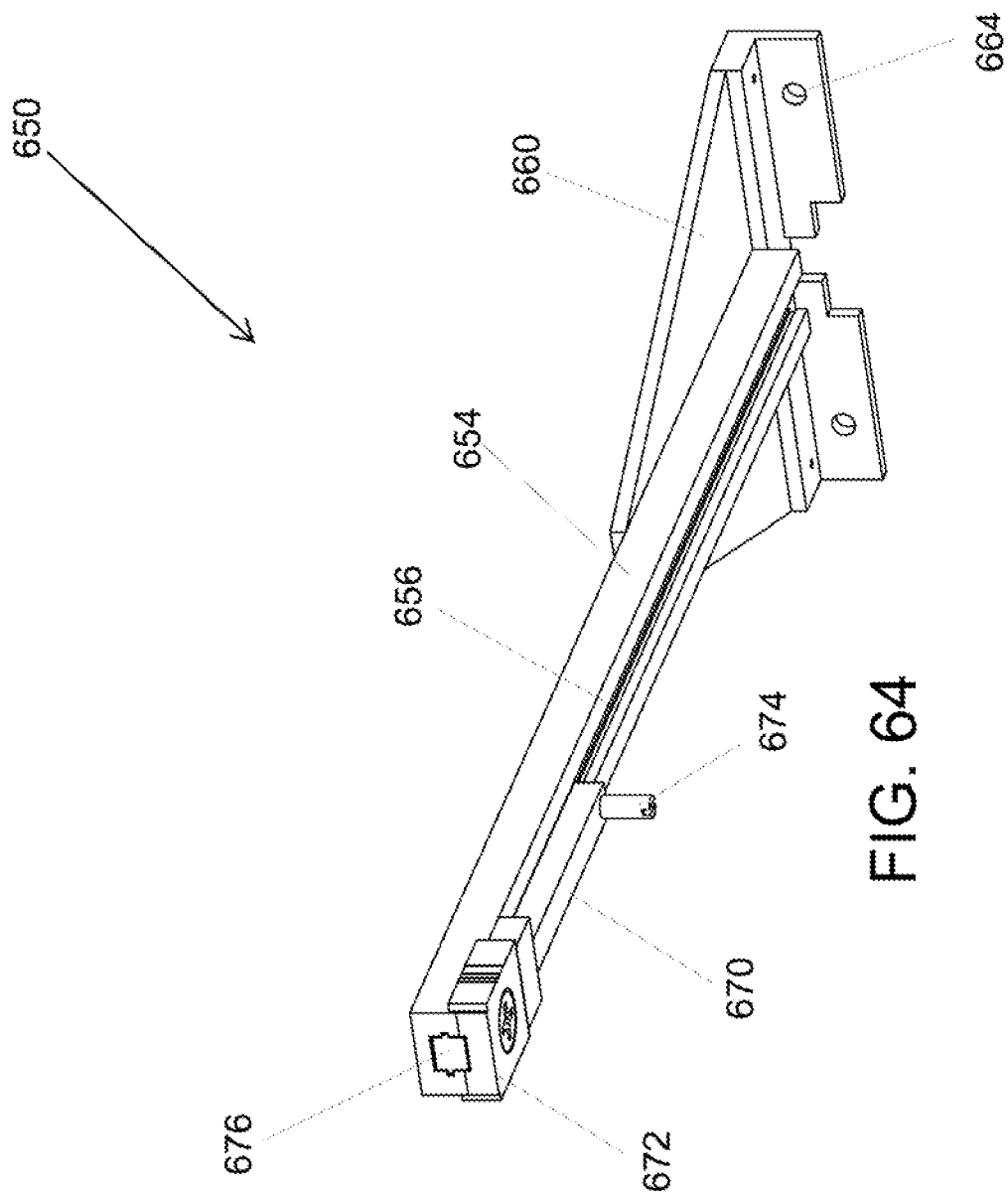
FIG. 64 is a bottom back perspective view of an embodiment of a circle cut adapter in accordance with aspects of the invention.
Figure 65:
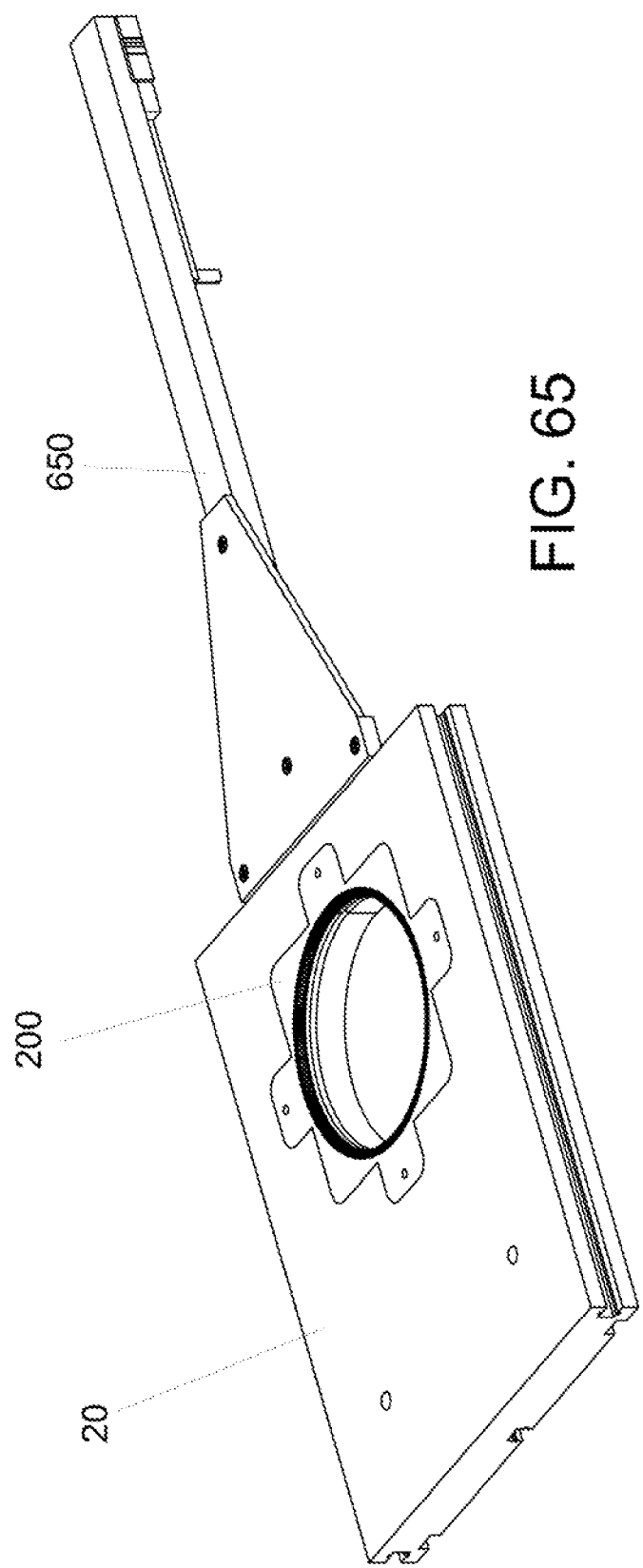
FIG. 65 is a top perspective view of an embodiment of a circle cut adapter coupled to an embodiment of a top plate in accordance with aspects of the invention.
Figure 66:
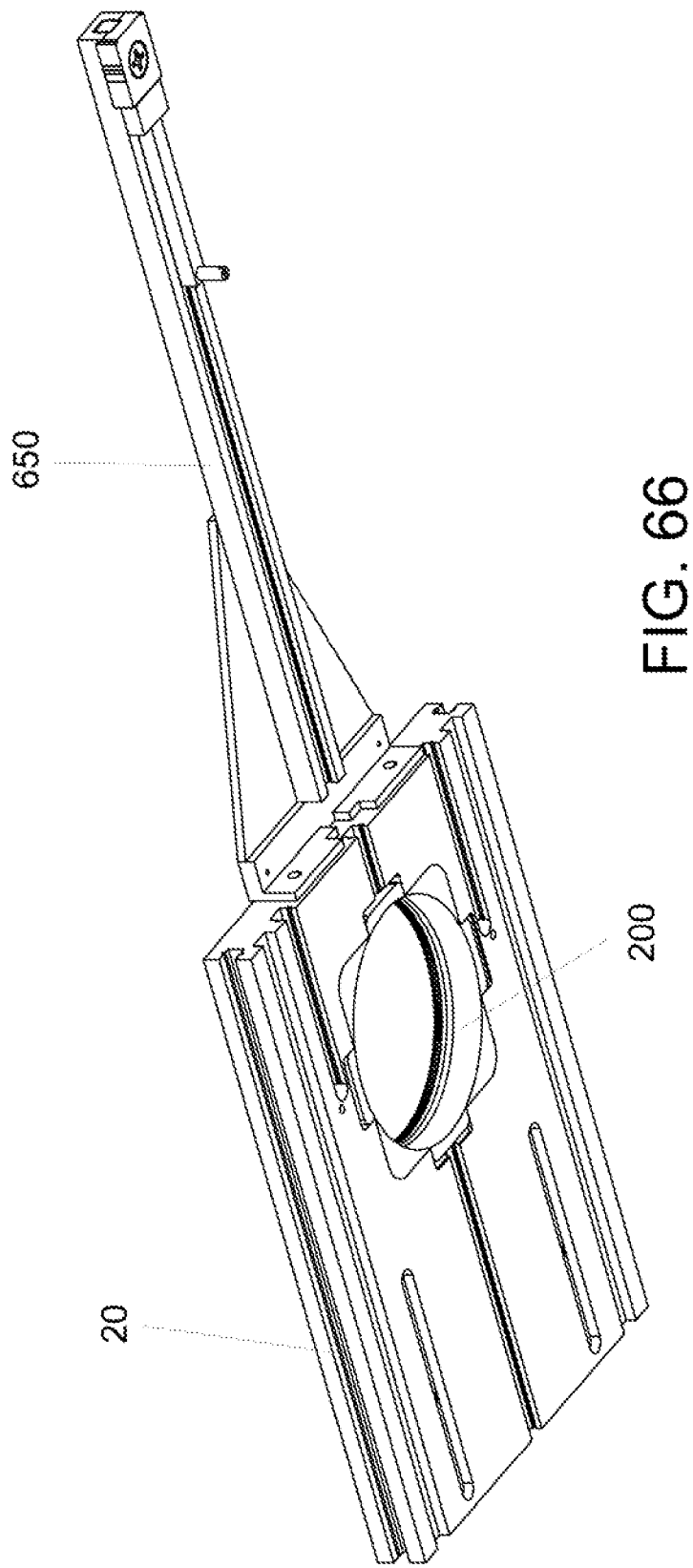
FIG. 66 is a bottom perspective view of an embodiment of a circle cut adapter coupled to an embodiment of a top plate in accordance with aspects of the invention.
Figure 67:
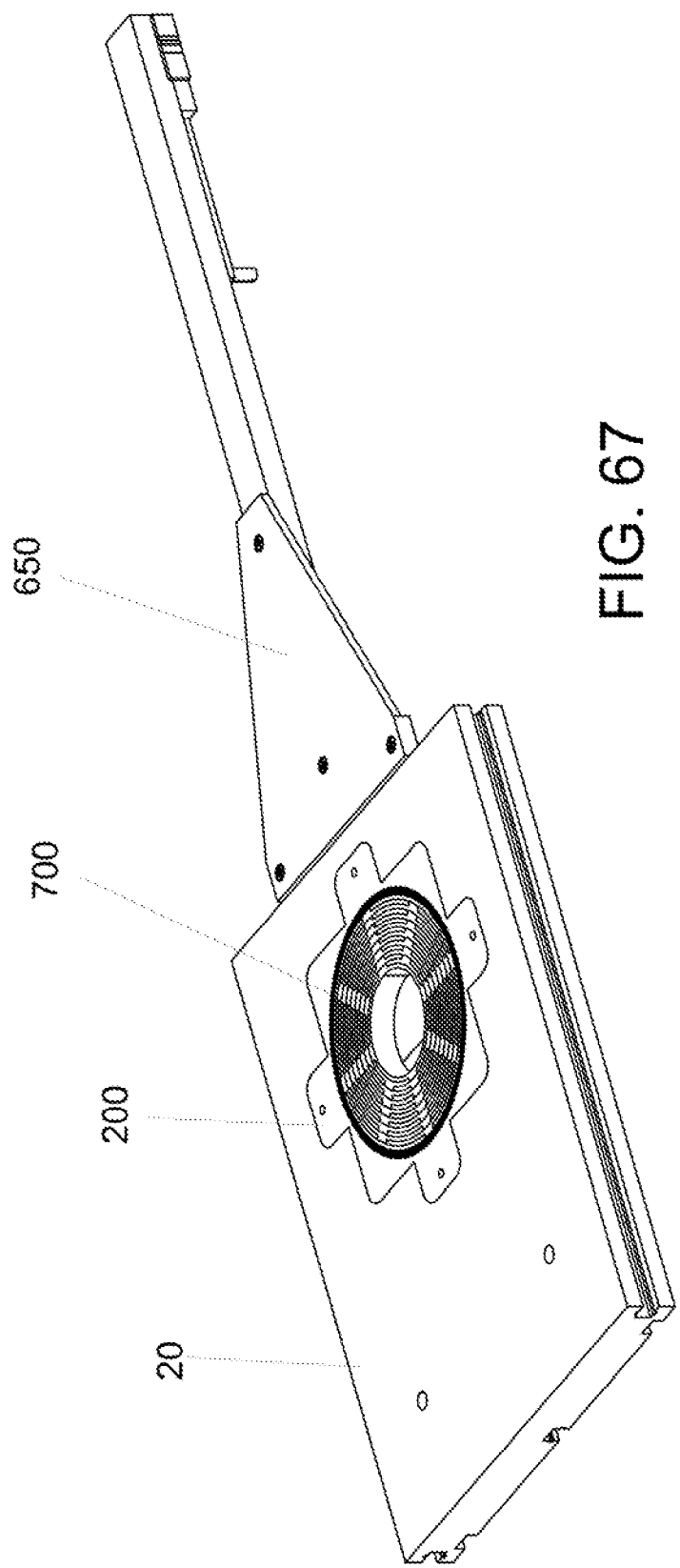
FIG. 67 is a top perspective view of an embodiment of a circle cut adapter coupled to an embodiment of a top plate in combination with an embodiment of an inset and removeable boring templates in accordance with aspects of the invention.

FIGS. 62-64 illustrates an embodiment of a circle cut adapter 650 of the present invention. The circle cut adapter 650 includes a bar 654, slide 670, and fence 660. The bar 654 includes a t-slot 656 through which a t-rail 676 of the slide 670 engages and slides through a length of the bar 654. The slide 670 further includes an alignment pin 674 extending from the slide. A lock member 672 allows a user to lock the slide 670 in a desired position along the bar 654. Fence 660 includes a relief slot 662 formed in the fence to allow the slide 670 and pin 674 to slide through at least a portion of the fence. Mounting holes 664 align with mounting holes 58 extending into an end of the top plate 20 and allow the circle cut adapter 650 to be engaged and fixed to an end of the top plate 20 as illustrated in FIGS. 65-67. The circle cut adapter 650 may be used to, for example without limitation intended, cut a large round hole through a sheet of plywood. A user marks out on the sheet of plywood the center of the desired hole and then drills a pilot hole having a diameter slightly larger than the diameter of pin 674. Pin 674 is then inserted into the drilled hole. The top plate 20 may be slid towards or away from the pilot hole such that the distance from a router bit of a router mounted to the top plate 20 to the pilot hole equals the radius of the desired circle to be cut into the plywood. Those skilled in the art will appreciate that the circle cut adapter 650 in combination with the boring template 700 or slot template 750 fixed in the inset 200 of top plate 20 may be used to cut a variety of bores or slots spaced apart about a common center of a workpiece.

Further, the circle cut adapter 650 in combination with the top plate 20 and fence 550 (in addition to using the boring template 700 or slot template 750) may be used for an even greater range of cuts including a greater range of radius dimensions cut into the workpiece. By way of example, without limitation intended, the fence 550 may be coupled to a fence track or guide track and slid along the track. In addition the top plate 20 may be slid along slide 670 by desired increments such that parallel rows of spaced apart holes or slots (having an axis aligned through 360 degrees relative to the lengthwise axis of the guide track) may easily be cut into a sheet material. Additionally, circumferential arrays of linear spaced apart holes or slots may easily be cut in a sheet material.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

The following claims are incorporated into this description.

The invention claimed is:

1. An apparatus to create a variety of joints in a woodworking piece, the apparatus comprising:
   a top plate having a perimeter defined by an outer sidewall and having a router opening extending through the top plate from a top surface of the top plate to a bottom surface of the top plate, wherein the router opening includes inner sidewalls extending between the top surface and bottom surface of the top plate and further extending about a perimeter of the router opening, the top plate further including spaced apart pockets extending into the top plate from the sidewalls of the router opening;
   an inset having an outer sidewall of the inset extending between a top surface and bottom surface of the inset, the inset further having protrusions extending outward from the sidewall of the inset, wherein the router opening of the top plate is adapted for receiving the inset within the router opening, and wherein the protrusions interlock within the spaced apart pockets formed in the top plate; and
   wherein the inset includes a guide bushing router channel extending through the inset from the top surface to the bottom surface of the inset.

2. The apparatus as recited in claim 1, wherein the inset is bi-directional in 90 degree increments and interlocks with the router opening of the top plate in multiple orientations.

3. The apparatus as recited in claim 1, further including a rotational alignment member fixed to the inset in cooperation with the guide bushing router channel of the inset.

4. The apparatus as recited in claim 3, further including a removable template mounted to the inset and adapted for rotation within the guide bushing router channel, wherein the removable template includes an alignment segment that interlocks with the rotational alignment member fixed to the inset.

5. The apparatus as recited in claim 4, wherein the removeable template has a guide bushing router aperture extending through the removeable template, wherein the guide bushing router aperture is adapted for receiving interlocking rings having varying inner and outer diameters.

6. The apparatus as recited in claim 4, wherein the removeable template has a bore extending through the removable template wherein slide rails are fixed within the bore and a guide bushing router member is slidingly coupled to the rails.

7. The apparatus as recited in claim 4, wherein the alignment segment interlocks with the rotational alignment member in adjustable increments in relation to 360 degrees.

8. The apparatus as recited in claim 1, further including a guide fence adapter couplable to the outer sidewall of the top plate.

9. The apparatus as recited in claim 1, further including a circle cut adapter couplable to the outer sidewall of the top plate.

10. The apparatus as recited in claim 1, wherein the inset includes compressible locking guides that interlock within the router opening of the top plate.

11. An apparatus to create a variety of joints in a woodworking piece, the apparatus comprising:
   a top plate having a perimeter defined by outer sidewalls and having a router opening extending through the top plate from a top surface of the top plate to a bottom surface of the top plate, wherein the router opening includes inner sidewalls extending between the top surface and bottom surface of the top plate and further extending about a perimeter of the router opening, the top plate further including spaced apart pockets extending into the top plate from the sidewalls of the router opening;
   an inset having outer sidewalls extending between a top surface and bottom surface of the inset, the inset further having protrusions extending outward from the sidewalls of the inset, wherein the router opening of the top plate is adapted for receiving the inset within the router opening, and wherein the protrusions interlock within the spaced apart pockets formed in the top plate;
   wherein the inset includes a guide bushing router channel extending through the inset from the top surface to the bottom surface of the inset;
   wherein the inset has a rotational alignment member fixed to the inset in cooperation with the guide bushing router channel of the inset; and
   a removable template mounted to the inset and adapted for rotation within the guide bushing router channel, wherein the removable template includes an alignment segment that interlocks with the rotational alignment member fixed to the inset.

12. The apparatus as recited in claim 11, wherein the inset is bi-directional in 90 degree increments and interlocks with the router opening of the top plate in multiple orientations.

13. The apparatus as recited in claim 11, wherein the removeable template has a guide bushing router aperture extending through the removeable template, wherein the guide bushing router aperture is adapted for receiving interlocking rings having varying inner and outer diameters.

14. The apparatus as recited in claim 11, wherein the removeable template has a bore extending through the removable template wherein slide rails are fixed within the bore and a guide bushing router member is slidingly coupled to the rails.

15. The apparatus as recited in claim 11, wherein the alignment segment interlocks with the rotational alignment member in adjustable increments in relation to 360 degrees.

16. The apparatus as recited in claim 11, further including a guide fence adapter couplable to the sidewalls of the top plate.

17. The apparatus as recited in claim 11, further including a circle cut adapter couplable to the sidewalls of the top plate.

18. The apparatus as recited in claim 11, wherein the inset includes compressible locking guides that interlock within the router opening of the top plate.

19. An apparatus to create a variety of joints in a woodworking piece, the apparatus comprising:
   a top plate that interlocks and slidingly engages with a guide fence adapter; the top plate having a cavity formed in the top plate and wherein the cavity has sidewalls extending from a top surface of the top plate to a bottom surface of the top plate;
   an inset adapted to fit within the cavity of the top plate, the inset having at least two orientation tabs extending from the inset, wherein the orientation tabs engage with a portion of the sidewall of the cavity to interlock the inset within the cavity; the inset having an aperture extending through the inset from a top surface to a bottom surface of the inset, such that a center of the aperture of the inset aligns with a center of the cavity when the inset interlocks within the cavity; and
   wherein the inset interlocks with the cavity of the top plate in multiple 90 degree incremented orientations.

20. The apparatus as recited in claim 19, wherein the inset has an adapter cavity formed in the inset from the top surface wherein the adapter cavity is adapted for receiving a removable router template.

* * * * *